(12) United States Patent
Mori et al.

(10) Patent No.: US 8,229,418 B2
(45) Date of Patent: Jul. 24, 2012

(54) WIRELESS CONTROL APPARATUS AND COMMUNICATION METHOD

(75) Inventors: Shinichi Mori, Yokosuka (JP); Narumi Umeda, Yokohama (JP); Takatoshi Sugiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1191 days.

(21) Appl. No.: 11/491,283

(22) Filed: Jul. 24, 2006

(65) Prior Publication Data

US 2007/0021151 A1   Jan. 25, 2007

(30) Foreign Application Priority Data

Jul. 25, 2005   (JP) .................... 2005-214873

(51) Int. Cl.
*H04W 24/00*   (2009.01)
(52) U.S. Cl. .............. 455/424; 455/423; 455/435.2; 455/436; 455/442; 370/331; 370/332; 370/334; 370/335
(58) Field of Classification Search .......... 370/334, 370/310, 331, 332; 455/561.1, 550.1, 63.4, 455/63.1, 422.1, 423–424, 428, 432.1, 436, 455/452.2, 453, 524–525, 67.11, 67.16
See application file for complete search history.

(56) References Cited

U.S. PATENT DOCUMENTS

| | | | | |
|---|---|---|---|---|
| 5,898,682 A * | 4/1999 | Kanai | .............. | 370/331 |
| 6,104,936 A * | 8/2000 | Kronestedt | .............. | 455/562.1 |
| 6,282,434 B1 * | 8/2001 | Johannisson et al. | ...... | 455/562.1 |
| 6,549,529 B1 * | 4/2003 | Drabeck et al. | .............. | 370/347 |
| 6,728,228 B1 * | 4/2004 | Ostman et al | .............. | 370/332 |
| 6,735,436 B1 * | 5/2004 | McCauley et al. | .............. | 455/424 |
| 7,184,709 B2 * | 2/2007 | Qiu et al. | .............. | 455/63.1 |
| 2003/0003918 A1 * | 1/2003 | Proctor et al. | .............. | 455/446 |

FOREIGN PATENT DOCUMENTS

| | | |
|---|---|---|
| CN | 1264257 A | 8/2000 |
| EP | 0 843 494 A2 | 5/1998 |
| EP | 0 843 494 A3 | 5/1998 |
| EP | 0 948 229 A1 | 10/1999 |
| GB | 2 378 858 A | 2/2003 |
| GB | 2378858 A * | 2/2003 |
| JP | 10-22912 | 1/1998 |
| JP | 2001-352287 | 12/2001 |
| JP | 2003-8494 | 1/2003 |

(Continued)

OTHER PUBLICATIONS

Teruya Fujji, "Optimum Antenna Beam Tilting for Cecullar Mobile Radio Systems", Technical Report of IEICE, Jan. 1993, pp. 91-96 (with English Abstract).

(Continued)

*Primary Examiner* — Nick Corsaro
*Assistant Examiner* — Sarwat Chughtai
(74) *Attorney, Agent, or Firm* — Oblon, Spivak, McClelland, Maier & Neustadt, L.L.P.

(57) ABSTRACT

A wireless control apparatus is disclosed that forms and controls an area of a base station according to an antenna pattern. The wireless control apparatus includes an area formation information gathering part that gathers area formation information pertaining to area formation of a neighboring base station; and an antenna pattern control part that controls and directs at least one of a main lobe, a side lobe, and a null point between the main lobe and the side lobe of the antenna pattern based on the area formation information to reduce frequency interference between a current cell formed by a current base station and a neighboring cell formed by the neighboring base station.

15 Claims, 34 Drawing Sheets

FOREIGN PATENT DOCUMENTS

JP  2003-115792  4/2003
JP  2005-109690  4/2005

OTHER PUBLICATIONS

Takahiro Hayashi, et al., "Vertical Anntena Beamwidth and Tilting Angle Optimization in Cellular Mobile Communication Systems", Technical Report of IEICE, B-5-35, 2003, p. 494 (with partial English translation).

Fujii, et al.,"Cell Design System in Mobile Communication Systems" NTT DoCoMo Technical Journal, vol. 2, No. 4, Jan. 1995, pp. 28-35, (with partial English translation).

Hiromitsu Asakura, et al., "Cell Design System using Measured Field Strength Data for Mobile Communication Systems", Technical Report of IEICE, Jan. 1996, pp. 39-46 (with English Abstract).

Extended European Search Report issued on Jun. 6, 2011 in corresponding European Application No. 06 25 3838.

* cited by examiner

INCORPORATION OF
BS1, BS2, BS3, BS4, BS5, BS6, BS8,
BS10, BS12, BS14, BS16, BS18
→ CHANGE IN ADJACENCY BETWEEN NEIGHBORING CELLS

CURRENT BASE STATION TILT ANGLE ADJUSTMENT

UPLINK INTERFERENCE POWER
INCREASE IN BS0
AND / OR
DOWNLINK TOTAL TRANSMISSION
POWER INCREASE

↓

CURRENT BASE STATION ANTENNA
VERTICAL PATTERN TILT ANGLE
ADJUSTMENT

INCORPORATION OF
BS1, BS2, BS3, BS4, BS5, BS6, BS8,
BS10, BS12, BS14, BS16, BS18
→ CHANGE IN ADJACENCY BETWEEN NEIGHBORING CELLS

DISAPPEARANCE OF
BS1, BS2, BS3, BS4, BS5, BS6, BS8,
BS10, BS12, BS14, BS16, BS18
→ CHANGE IN ADJACENCY BETWEEN NEIGHBORING CELLS

CURRENT BASE STATION TILT ANGLE ADJUSTMENT

DECREASE/DISAPPEARANCE OF ADJACENCY OF NEIGHBORING CELL PREVIOUSLY HAVING HIGH ADJACENCY WITH CELL OF BS0

↓

CURRENT BASE STATION ANTENNA VERTICAL PATTERN TILT ANGLE ADJUSTMENT

DISAPPEARANCE OF
BS1, BS2, BS3, BS4, BS5, BS6, BS8,
BS10, BS12, BS14, BS16, BS18
→ CHANGE IN ADJACENCY BETWEEN NEIGHBORING CELLS

WIRELESS CONTROL APPARATUS AND COMMUNICATION METHOD

BACKGROUND OF THE INVENTION

1. Field of the Invention

The present invention relates to a cellular mobile communication system in which a service area is divided into plural cells, and a mobile station residing within a cell and a base station that forms the cell establish communication by sharing a frequency band assigned to the system according to a multiple access scheme. The present invention particularly relates to a TDMA-FDM cellular mobile communication system that assigns to each cell a set of plural narrow band frequency channels of the frequency band assigned to the system, and adjusts the assignment of the frequency channels such that the same or adjacent frequency channel is only assigned to cells that are separately located. The present invention also relates to a wireless control apparatus and a communication method used in a CDMA cellular mobile communication system in which the frequency band assigned to the system is shared by all users of the cells according to the code division multiple access scheme.

2. Description of the Related Art

Wireless signals transmitted in space over the ground are gradually attenuated as the distance from the transmission point is increased due to energy dispersion in the propagation process, absorption by plants, and shielding by land features and land objects, for example. The extent of the attenuation may be represented as propagation loss indicating the ratio between the transmission power at the transmission point and the reception power at a measuring point.

It is generally known that in an urban environment, the propagation loss may be increased by 8 to 16 times when the propagation distance is doubled. Accordingly, considering the fact that there is a physical lower limit for a thermal noise power level of a receiver and a determination of whether a wireless signal may be received is made based on the relative ratio between the reception power and the thermal noise power, it may be understood that the reception enabling distance at which reception can be realized is controlled by the maximum value of transmission power of a transmitter.

In a cellular mobile communication system, a relatively wide service area is divided into cells corresponding to relatively small areas, and a base station assigned to each cell is configured to establish communication with a mobile station residing within the relevant cell. Since the reception enabling distance of a wireless signal is controlled by the maximum transmission power of a transmitter, if a wide service area were not divided into cells so that the service are is handled by one base station, the base station has to have a large transmission power that is impossible to realize. It is noted cells are preferably arranged to be smaller; however, the number of cells covering the service area and the number of base stations have to be increased in such a case.

In a cellular mobile communication system that is assigned a limited frequency band, the system capacity, namely, the number of users that may be simultaneously accommodated, may be increased by reducing the area of cells. For example, in a system with low interference resistance that uses narrow band signals based on the time division multiple access scheme or the frequency division multiple access scheme, the quality of communications that are established simultaneously within an electromagnetically shared space using the same frequency or adjacent frequencies may be immediately degraded due to crosstalk.

Therefore, in a mobile communication system having a service area that is realized by a high position antenna and a high power transmitter where the service area is not divided into plural cells, frequency channels are aligned at the smallest intervals for avoiding crosstalk, and the system capacity reaches its limit once narrow band signals are assigned to all the frequency channels. In this system, the system capacity of the overall service area is fixed regardless of the size of the service area.

However, even in a system using narrow band signals where crosstalk immediately leads to communication quality degradation and disconnection, if the service area is divided into plural cells using low position antennas and low power transmitters to realize a cellular mobile communication system, frequencies may be repetitively used within the service area without causing crosstalk. For example, in a cellular mobile communication system, adjustments may be made to avoid using the same frequency or adjacent frequencies in neighboring cells of a current cell (e.g., adjacent cells and cells positioned one cell apart from the current cell) that share an electromagnetic space with the current cell to a great extent and use the same frequency or the adjacent frequencies in other cells that do not share an electromagnetic space with the current cell to such a great extent.

Thus, by increasing the number of cells into which a service area is divided in accordance with the enlargement of the service area, the overall system capacity of the service area may be increased.

For example, in a cellular mobile communication system that uses narrow band signals based on PDC (FDMA-TDM), for example, a set of narrow band frequency channels is assigned to each cell, and adjustments are made so that the same frequency or adjacent frequencies are only assigned to cells that are adequately spaced apart from each other.

In the multiple access scheme, a wide band signal may be used to secure resistance to crosstalk and prevent immediate degradation in communication quality even when the same frequency band is shared by users in adjacent cells upon establishing communication. In the following the code division multiple access scheme (CDMA) is described to illustrate that even in a mobile communication system based on a multiple access scheme, the overall system capacity of the service area may be increased through cell division as with the system using narrow band signals.

In the code division multiple access scheme, individual communication waves may be detected, and the same frequency band may be shared by plural communication waves through frequency spreading using spreading codes (unique sequence codes) to enable mutual distinction between the communication waves.

For example, in the downlink (uplink) of a W-CDMA cellular system, even when one base station (mobile station) simultaneously establishes plural channels for communication, different spreading codes (channelization codes) are used to spread the channels before multiplexing the channels at the base station (mobile station) so that the channels may be distinguished at the reception side mobile station (base station).

Also, in order to enable repeated use of the limited number of channelization codes within the system among different base stations (mobile stations), a different spreading code (scrambling code) is used for each base station (mobile station) to spread the multiplexed signal further upon transmitting the signal. In this case, plural channels from plural base stations (mobile stations) are simultaneously received within the same frequency band at the mobile station (base station) corresponding to the reception side of the downlink (uplink).

However, under predetermined conditions, the mobile station (base station) may identify a group of channels addressed to itself and the individual channels assigned to each communication.

It is noted that the number of communication waves that may simultaneously share the same frequency band while maintaining an adequate communication quality, namely, the system capacity, is limited.

Specifically, in the downlink (uplink), adequate communication quality is required in the channels subject to demodulation in order to detect/identify in each communication the plural channels from plural base stations (mobile stations) that are simultaneously received in the same frequency band at the mobile station (base station) and accurately demodulate the received channels.

In a case where the wireless propagation environment is fixed, the communication quality of a channel may be determined by the signal-to-interference ratio (SIR) that takes into account the reception signal power and the processing gain of the channel subject to demodulation. An interference noise power is a total power of interference from a delay wave of the channel subject to demodulation that has reached the receiver, interference from other channels, and the receiver thermal noise. The interference noise power may be reduced to a fraction of the spreading code length per information bit by the processing gain after an inverse spreading process for recovering the spread channel is performed.

The interference from other channels includes interference from the cell transmitting the channel to be demodulated and interference from cells other than the cell transmitting the channel to be demodulated.

It is noted that the channel to be demodulated may similarly correspond to interference when viewed from the other channels. Accordingly, the base station (mobile station) may not transmit a channel with needlessly high transmission power to increase the reception signal power at the mobile station (base station) and obtain a communication quality that is higher than the required communication quality. In other words, the mobile station (base station) controls the transmission power of the base station (mobile station) at high speed (high speed transmission power control) so that communication may be established with the minimum required transmission power to obtain adequate communication quality with respect to the wireless propagation environment.

As the number of communications that are simultaneously established within the same frequency band is increased, the total reception power level in the mobile station (base station) receiver increases. This owes to the fact that as the number of communication channels is increased, the interference noise power increases, and the base station (mobile station) performing high speed transmission power control increases the transmission power to secure the required SIR for each channel. This in turn leads to further increase in the interference noise power.

In a case where the maximum transmission power of the base station (mobile station) is sufficiently high, appropriate measures may be implemented in response to the increase in the interference noise power. Thus, in a case where the transmission power may be limitlessly increased, the number of simultaneous communication channels may be increased up to a number close to a logically obtained marginal capacity (pole capacity). However, in practice, limits are imposed with respect to the total transmission power of the base station (mobile station) and the transmission power that may be assigned to each channel.

Therefore, in the downlink, transmission powers reach the upper limit starting from channels established with respect to mobile stations with relatively large propagation loss from the base station so that adequate communication quality may not be obtained. As a result, channels in communication may be forcedly disconnected, and adequate transmission power may not be assigned to a channel newly established with respect to a mobile station with which communication is desired.

Also, in the uplink, transmission powers to be assigned to channels reach the upper limit starting from mobile stations with large propagation loss from the base station so that adequate communication quality may not be obtained. As a result, channels in communication may be forcedly disconnected, and a connection request of a mobile station with which communication is desired may not reach the base station with adequate communication quality.

The above described phenomenon is also referred to as cell breathing since it brings about effects of virtually reducing the cell coverage. In a system such as the cellular system where a planar service area is required, cells need to be successively arranged to adequately overlap each other. Accordingly, when cell breathing is about to occur (e.g., when a gap is about to be created between cells), a new connection request may be rejected (call acceptance control), or a channel in communication may be forcedly disconnected (congestion control) in order to prevent the occurrence of cell breathing.

Accordingly, in the case where limits are imposed with respect to the maximum transmission powers of the base station and the mobile station, the system capacity is controlled by cell coverage. Even if limits are not imposed on the maximum transmission powers of the base station and the mobile station, it is theoretically impossible to accommodate a number of simultaneous communication channels exceeding the pole capacity. For example, the system capacity of a 5 MHz frequency band (3.84×1.22 MHz width+margins) corresponding to a basic frequency band for downlink and uplink in the W-CDMA system is about 100 at maximum for audio communication channels.

As can be appreciated, in the code division multiple access scheme, a system capacity upper limit regulated by the pole capacity may be imposed with respect to the frequency band assigned to a system. Also, in a case where a service area is not divided into cells, the overall system capacity of the service area is limited to be less than or equal to the pole capacity per cell regardless of the size of the service area.

Also, in the code division multiple access scheme, the area of cell coverage and the system capacity are in a tradeoff relationship when a limit is imposed on the transmission power of the transmitter. For example, when the cell coverage is large, the system capacity per cell is reduced. Also, in the case where the service area is not divided into cells, the system capacity of the entire service area is further limited by the transmission power of the transmitter.

On the other hand, as the area of cells of a service area is reduced, the system capacity may be gradually freed from restrictions imposed by the transmission power of the transmitter. As a result, the system capacity of a cell may be closer to the pole capacity, and the overall system capacity of the service area may be increased by increasing the number of cells. In other words, by increasing the number of cells in accordance with the enlargement of the service area, the system capacity may be increased.

However, it is noted that by dividing the service area into cells, interference may be generated from other cells due to the use of the same frequency band by plural adjacent cells. Therefore, the system capacity of the service area does not correspond to the number obtained by multiplying the system capacity of each cell by the cell division number where interference of the other cells is not considered.

As can be appreciated from the above descriptions, in the time division access scheme and the frequency division access scheme where relatively narrow band signals are used, although interference resistance may be low, the same frequency or adjacent frequencies are used in segregated cells so that the system capacity of the service area may be increased in accordance with the enlargement of the service area by increasing the cell division number.

Also, in the code division access scheme, wide band signals are used so that high interference resistance may be realized, and users residing within adjacent cells may share the same frequency band so that the system capacity of the service area may be increased in accordance with the enlargement of the service area by increasing the cell division number.

In the following, an example is described in which restrictions based on the transmission power of the transmitter that are imposed on the system capacity can be disregarded by reducing the area of the cell. In a system that uses narrow band signals, the system capacity of the service area is constrained by the fact that the repeated distance of the same frequency or adjacent frequencies may not be reduced. This is because a cell in which the same frequency or adjacent frequencies is used has to be segregated from the current cell so that the cells do not share an electromagnetic space to such a great extent.

In a system that uses wide band signals, interference from other cells such as adjacent cells and neighboring cells using the same frequency band may leak into the current cell.

In this regard, by taking measures to reduce the sharing of electromagnetic space between the current cell and its neighboring cells, interference from other cells may be reduced and the system capacity in an assigned frequency band may possibly be increased. It is noted that example of such measures include narrowing the beam of a vertical pattern of a base station antenna to realize appropriate beam tilting, and appropriately directing a horizontal pattern into a beam as is described below.

In a vertical pattern that is arranged into a beam, a relatively high gain is obtained in the main lobe direction whereas the gain in the side lobe direction is relatively low. Accordingly, the main lobe of he vertical (horizontal) pattern of the base station antenna may be directed to the cell administered by the relevant base station and the side lobe may be directed to the cells administered by neighboring base stations providing service using the same frequency band (beam tilting) to thereby reduce the sharing of electromagnetic space between cells.

Consequently, the distance required between cells for adequately avoiding crosstalk may be reduced in a system using the time division multiple access scheme or the frequency division multiple access scheme, and the same frequency or adjacent frequencies may be repeatedly used in cells arranged closer to each other.

Also, in a system using the code division access scheme, beam tilting may produce an effect of reducing the interference from other cells. In this way, the system capacity of a cell in an assigned frequency band may be closer to the pole capacity.

Beam tilting using a vertical (horizontal) pattern of a base station antenna for maximizing the system capacity in an assigned frequency band may be determined by an appropriate half with and a tilt angle (orientation angle).

It is noted that the half width corresponds to an angle formed by a direction with a gain of no more than 3 dB with respect to the maximum gain of the vertical (horizontal) pattern (i.e., main lobe width) and represents the extent to which the beam is narrowed.

The tilt angle corresponds to an angle forming a horizontal direction with respect to the maximum gain direction of the vertical pattern, the tilt angle being represented by a positive number when the maximum gain direction is oriented toward the ground. The orientation angle corresponds to an angle that forms a true north direction with respect to the maximum gain direction of the horizontal pattern.

In a case where the cell arrangement or the cell boarder is fixed beforehand by the cell design, the following qualitative rules apply with respect to optimal beam tilting. Namely, adequate antenna gain may be secured in the main lobe direction (normally at cell border) in a case where the vertical half width of the antenna is small in a base station realizing a cell width a small cell radius (distance between base station and cell boarder). On the other hand, the required antenna gain may not be secured within the cell since the side lobe is oriented in the direction with an anticipated angle greater than the main lobe direction.

In contrast, an adequate antenna gain may be secured within the cell in a case where the vertical pattern half width of the antenna is large in a base station forming a cell with a large cell radius. On the other hand, the required antenna gain may not be secured in the main lobe direction (normally cell boarder).

Also, when the tilt angle of the antenna vertical pattern in the base station is small, the orientation direction of the main lobe becomes close to horizontal so that the antenna gain is increased with respect areas other than the area administered by the relevant base station (other cells) so that interference applied to the other cells is increased and interference from mobile stations residing within the other cells is increased.

In contrast, when the tilt angle of the antenna vertical pattern is large in the base station, the orientation direction of the main lobe becomes close to vertical so that the antenna gain toward the cell boarder is reduced and degradation due to thermal noise (coverage loss) occurs. It is noted that the above principles are disclosed in Fujii, "Optimization of Antenna Beam Tilting in Mobile Communication", The Technical Report of the Institute of Electronics Information and Communication Engineers of Japan, RCS-292-131, January, 1993 (document 1) in relation to a system using the PDC scheme, and Hayashi et al., "Optimization of Base Station Antenna Vertical Half Angle and Tilt Angle in Cellular Mobile Communication", The Technical Report of the Institute of Electronics Information and Communication Engineers of Japan, B-5-35, March, 2003 (document 2) in relation to a system using the W-CDMA scheme.

Also, a method of manually designing an appropriate type of base station antenna (e.g., beam tilting antenna, or beam direction antenna) by simulating and estimating the wave propagation state between base stations and locations with a cell design system employing an electronic map is disclosed in Fujii et al., "Cell Design System in Mobile Communication", NTT DoCoMo Technical Journal, Vol. 2, No. 4, January, 1995 (document 3).

Also a specific method for manually designing appropriate beam tilting based on measurement data of locations within a service area obtained through actual measurement of the locations using a measuring device is disclosed in Asakura et al., "Mobile Communication Cell Design System using Actual Propagation Data", The Technical Report of the Institute of Electronics Information and Communication Engineers of Japan, RCS95-130, January, 1996 (document 4). Document 4 discloses that the estimation simulation of the wave propagation state may be possible based on actual measurement values in the case of changing only the tilt angle without changing the half width. Document 4 also discloses that the reception level within the service are may be improved and resistance against interference from neighboring cells using the same frequency or adjacent frequencies may be increased through manual adjustment by the cell designer to find an appropriate tilt angle through the cut and try method.

Also, document 1 discloses a method for appropriately controlling the communication quality and system capacity by automatically selecting or manually designating the appropriate beam tilting based on at least one of the condition of the service area or a command issued from the outside, the beam tilting being manually designed beforehand with respect to various conditions.

Specifically, the amount of traffic may be monitored as the condition of the service area, for example. If the traffic amount is at full load, the number of vertically stacked radiation elements of the base station antenna to which a transmission signal is to be supplied may be reduced. In this way, the half width of the vertical pattern may be increased, and the tilt angle may be increased by setting the difference in the phase conversion amount between adjacent radiation elements to the maximum.

In another aspect, the number of vertically stacked radiation elements of the base station antenna to which a transmission signal is supplied may be gradually increased as the amount of traffic is decreased. In this way, the half width of the vertical pattern may be narrowed, and the tilt angle may be reduced by gradually decreasing the amount of phase conversion between adjacent radiation elements.

As can be appreciated from the above description, the vertical pattern may be formed to secure a larger system capacity in a cell with a small cell radius and small coverage as the traffic amount is increased. Also, the vertical pattern may be formed to secure a smaller system capacity in a cell with a large cell radius and large cell coverage as the traffic amount is decreased.

In this way, the system capacity and coverage as a whole may be improved in accordance with changes in the service area. However, it is noted that the optimum beam tilting for the each of the different conditions of the service area has to be manually designed by the cell designer beforehand so that the appropriate beam tilting may be suitably selected.

However, the techniques described above have the following drawbacks.

It is noted that street micro cells (with an area radius of no more than 1 km) and pico cells (with an area radius of no more than 0.5 km), which are further reduced in coverage area with respect to macro cells (with an area radius of no more than 10 km) and micro cells (with an area radius of no more than 3 km) corresponding to the current mainstream cells, are expected to be mainstream in future systems.

In such smaller cells, it is quite difficult to manually design appropriate beam tilting or beam directing by simulating and estimating the wave propagation between locations and base stations or actually taking measurements of locations within the service area with a measuring device according to the cell design systems disclosed in the above cited documents.

Specifically, in micro and macro cells, wide cell coverage is realized by arranging an antenna at a high position such as a steel tower, the top of a high rise building, or the peak of a mountain, for example. In this case, the propagation distance to the cell border is relatively long so that influences from individual buildings for each direction viewed from a site may be statistically averaged out. Therefore, an area with a smooth area edge forming a hexagonal shape around a site may be formed.

In this case, the propagation loss within a cell may be accurately estimated by a propagation estimation formula that is defined for each of generalized city structures. For example, with the aid of a cell design system that takes into account the general city structure based on an electronic map, appropriate beam tilting or beam directing may be designed by simulating and estimating wave propagation between locations and base stations.

Also, it is noted that in macro and micro cells, since the area radius is large, influence from individual buildings may be statistically averaged out. Therefore, representative data may be acquired by taking measurements of a portion of the corresponding area rather than extensively measuring all locations within the area (e.g., roads, squares) with a measuring device, and appropriate beam tilting or beam directing may be designed based on the acquired data.

On the other hand, in street micro cells or pico cells, small cell coverage is realized by arranging an antenna at a position lower than the buildings surrounding the base station. In this case, the propagation distance to an area edge is relatively short so that the cell edge with respect to each direction from the base station is easily influenced by individual buildings and land objects and a cell with a complex shape (amoeba shape) with a discontinuous area edge may be formed.

In this case, it is difficult to accurately estimate the wave propagation within the area based on a propagation estimation formula defined for each of generalized city structures. In other words, it is difficult to accurately design beam tilting and beam directing using a cell design system.

It is noted that a cell design system that estimates propagation loss through ray tracing allows large-scale calculation, and may thereby be capable of taking into account individual buildings and land objects upon estimation of the wave propagation. However, an electronic map cannot completely describe the actual environment such as detailed features of buildings, and information of the electronic map cannot represent the actual environment in real time since the actual environment is subject to change over time. Therefore, estimations based on the electronic map may not be adequately accurate.

Also, in a system that designs beam tilting and beam directing based on actual measurements obtained using a measuring device, accurate beam tilting and beam directing may not be designed unless a large portion of the service area (e.g., roads, squares) has to be measured in detail owing to the complexity of the area configuration.

Further, the number of base stations to be stationed may be significantly increased in accordance with the reduction in size of the cells, and in turn, design procedures to be executed by the cell designer for designing beam tilting and beam directing may be increased and more complicated.

SUMMARY OF THE INVENTION

According to one aspect of the present invention, a wireless control apparatus and a communication method are provided for reducing frequency interference and automatically updating an antenna pattern in accordance with changes in the service area.

According to a specific embodiment of the present invention, a wireless control apparatus is provided that includes:

an area formation information gathering part that gathers area formation information pertaining to area formation of a neighboring base station; and an antenna pattern control part that controls and directs at least one of a main lobe, a side lobe, and a null point between the main lobe and the side lobe of the antenna pattern based on the area formation information to reduce frequency interference between a current cell formed by a current base station and a neighboring cell formed by the neighboring base station.

According to another specific embodiment of the present invention, a communication method is provided that is used in a mobile communication system that forms and controls an area of a base station according to an antenna pattern, the method including the steps of:

receiving an uplink wireless channel from a mobile station;
gathering area formation information pertaining to area formation of a neighboring base station;
controlling and directing at least one of a main lobe, a side lobe, and a null point between the main lobe and the side lobe of the antenna pattern to reduce frequency interference between a current cell formed by a current base station and a neighboring cell formed by the neighboring base station.

In one aspect of the present invention, based on measurement reports transmitted from mobile stations residing within cells formed by a current base station and/or neighboring base stations, the antenna pattern of a base station may be automatically adjusted to reduce frequency interference between cells using the same frequency or adjacent frequencies and enable efficient use of wireless resources.

DETAILED DESCRIPTION OF THE PREFERRED EMBODIMENTS

Figure 1:
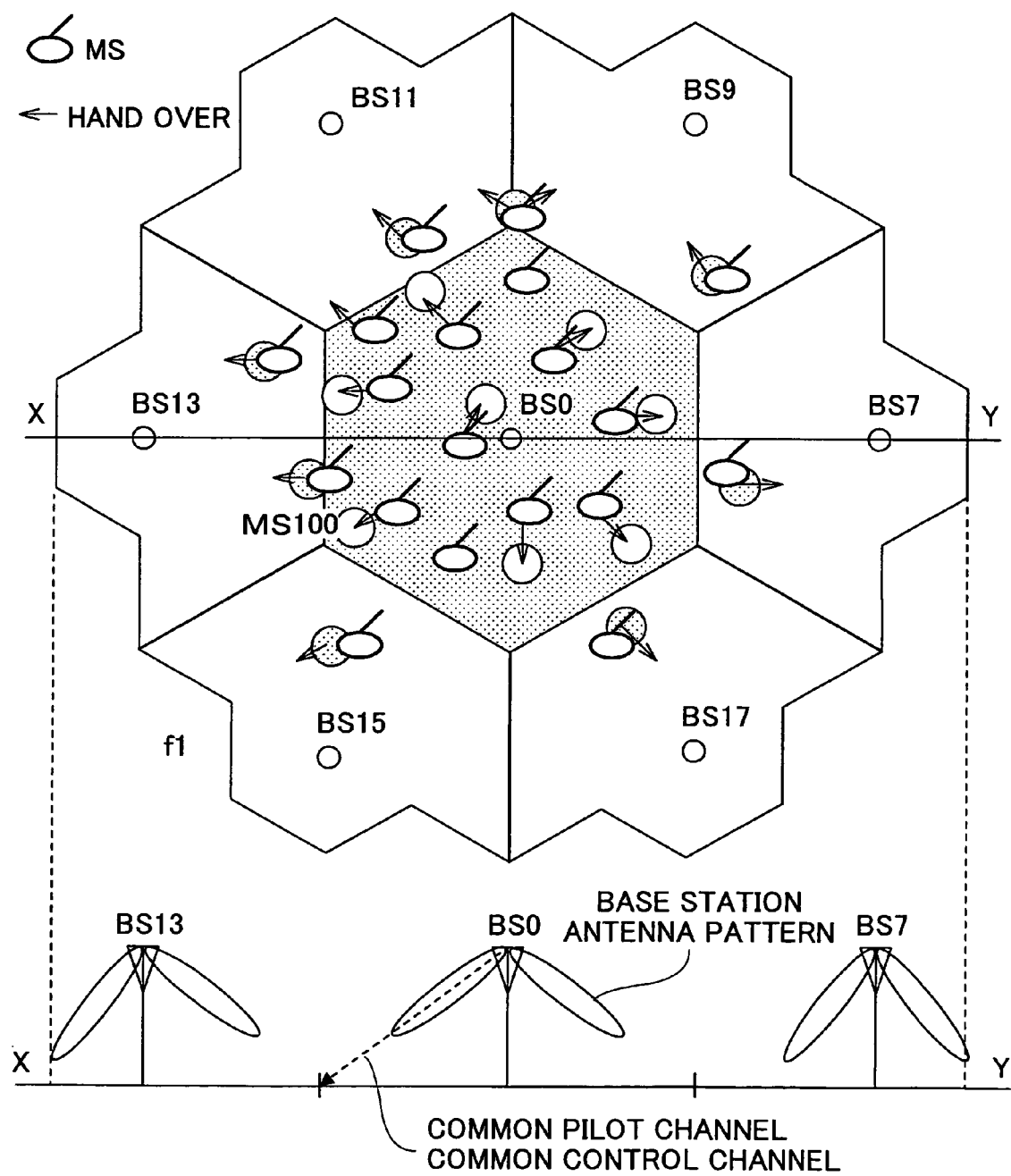
FIG. 1 is a diagram illustrating a communication method according to an embodiment of the present invention.

In the following, preferred embodiments of the present invention are described with reference to the accompanying drawings. It is noted that in these drawings, component elements having the same function are given the same reference numerals.

In a cellular mobile communication system, upon moving from one cell to another cell, a mobile station performs handover for changing the base station to which it is connected. Upon performing the handover, the mobile station transmits to the handover origin base station reception level measurement results such as the Ec/Io (chip energy-to-interference noise power density ratio), the CIR (signal power-to-interference noise power ratio), the RSCP (reception power) of a common pilot channel or a common control channel that are transmitted by a base station corresponding to a handover destination candidate.

Based on such a report, a wireless control function within a network determines the base station to which the mobile station is to be handed over and notifies the mobile station of the determination. In the following, a set of the base stations forming the cells corresponding to the handover destination candidates for which base stations the reception levels are measured by the mobile station is referred to as a monitored set.

In the code division multiple access scheme, for example, when the monitored set includes a base station transmitting the common pilot channel or common control channel with the highest reception level (main branch) and base stations transmitting the common pilot channel or common control channel at a reception level within a predetermined threshold value, a certain number of the base stations with the smallest level difference from the highest level are selected as diversity handover destinations (major branch).

It is noted that the base stations of the monitored set that correspond to neither the main branch nor the major branch are referred to as minor branch, and the main branch and the major branch are collectively referred to as an active set.

The base stations designated as diversity handover destinations simultaneously establish communication with the mobile station in parallel with the handover origin base station to thereby prevent instant disconnection and increase the handover success rate. Also, the base stations corresponding to the diversity handover destinations produce the so-called side diversity effect particularly in the uplink so that the transmission power required for sustaining communication may be reduced and the system capacity for uplink may be increased.

It is noted that common pilot channels and common control channels of plural base stations being received at different levels within a threshold value during diversity handover signifies that plural cell coverages are overlapping at cell borders.

When beam tilting or beam directing are appropriately adjusted, the sharing of electromagnetic space between a current cell and its neighboring cells may be reduced. In this way, interference from other cells may be reduced and a minimum required amount of cell coverage overlap may be obtained with respect to adjacent cells.

It is noted that adjacent cells correspond to cells formed by base stations of a monitored set that may transmit the common pilot channel or common control channel with the highest reception level, that is, the adjacent cells represent a set of cells formed by base stations corresponding to the main branch and the major branch. It is noted that the number of adjacent cells does not necessarily have to be two; for example, more than two cells may be adjacent to each other with respect to a point. It is noted that reception level measurement by the mobile station and notification of the measurement result to the base station as is described above may also be applied in the time division multiple access scheme and the frequency division multiple access scheme; however, diversity handover is not performed in these schemes.

In the following, a communication method according to an embodiment of the present invention is described with reference to FIG. 1.

In the following descriptions of the preferred embodiments, the horizontal pattern of the base station antenna is assumed to be an omnidirectional pattern in order to simplify the descriptions. Also, in the following descriptions, it is assumed that the base station includes the wireless control function. Further, it is noted that in one embodiment, the wireless control function may be embodied as a wireless control apparatus as is described below. However, the present invention is in no way limited to such embodiments.

A mobile communication system that implements a communication method according to an embodiment of the present invention includes one or more mobile stations and plural base stations, and is adapted to optimize beam tilting, beam directing, and/or area formation upon narrowing a beam width of a vertical pattern of a base station antenna, for example. In this way, frequency interference between cells due to use of the same frequency or adjacent frequencies may be reduced, and the vertical pattern half width and tilt angle for efficiently using wireless resources may be automatically generated without requiring manual designing by the cell designer so that automatic updating if the antenna pattern may be realized in accordance with state changes in the service area.

For example, in FIG. 1, a service area includes seven base stations, BS0, BS7, BS9, BS11, BS13, BS15, and BS17, each of the base stations forming a cell and establishing communication (including communication for control) with plural mobile stations residing within its cell.

It is noted that the hatched area of FIG. 1 corresponds to a cell formed by base station BS0, namely, an area where the common pilot channel or common control channel (collectively referred to as common pilot channels hereinafter) transmitted by the base station BS0 is strongest.

Due to the irregularity of wave propagation, an area close to the base station BS0 may not necessarily correspond to an area of the cell formed by the base station BS0. Also, an area at an isolated location from the base station BS0 may be a part of the cell of the base station BS0 in some cases.

The arrows in FIG. 1 represent handover from the cell of the base station BS0 to a neighboring cell. Specifically, the arrows represent exemplary timings at which a mobile station transmits a report of its measurements of the reception level of the common pilot channels transmitted from a base station to the base station BS0 corresponding to the handover origin base station, the report including the reception level measurements associated with a corresponding cell identifier.

For example, the mobile station ms100 is being handed over from the base station BS0 to the base station BS13, and the mobile station ms100 transmits the monitored set including the reception level measurements pertaining to base stations BS0 and BS13 to the base station BS0. That is, the mobile station ms100 measures the reception levels of the common channels of plural base stations as handover destination candidates, associates corresponding cell identifiers to the reception level measurements, and transmits the set of reception level measurements and identifiers to the base station BS0.

The base station BS0 accumulates plural measurement results of monitored sets transmitted from plural mobile stations and makes a determination based on the accumulated measurement results.

Based on the determination, the base station BS0 controls at least one of a main lobe, a side lobe, or a null point between the main lobe and the side lobe of an antenna pattern to a direction for reducing identical frequency interference between the cell formed by the relevant base station and the cell formed by an adjacent base station.

In this way, the base station BS0 may be able to grasp the state of the service area, and automatically set the optimum antenna vertical pattern and antenna horizontal pattern for the system.

Figure 2A:
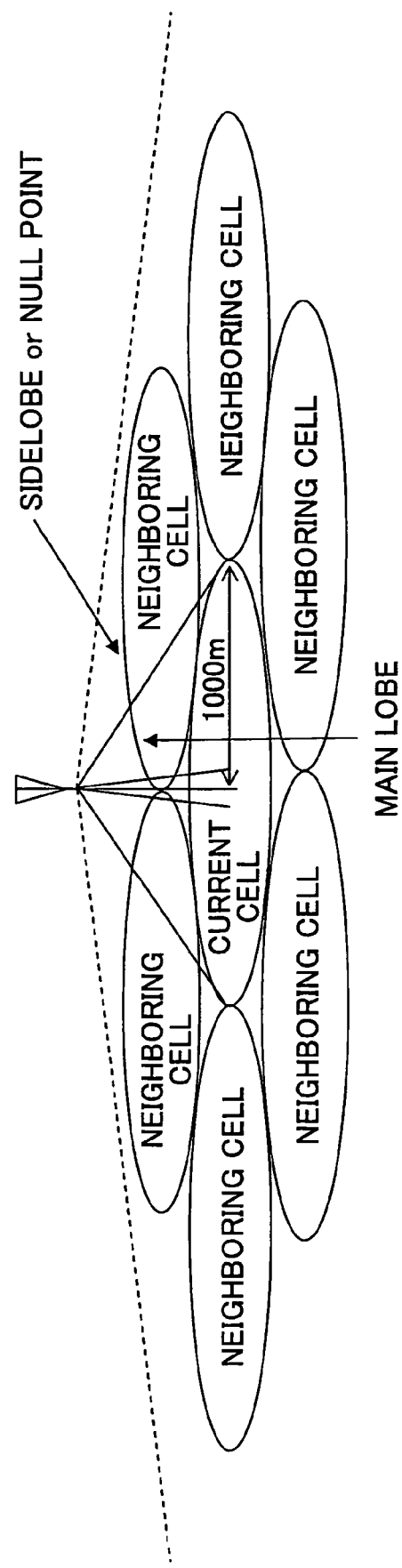
FIGS. 2A-2C are diagrams illustrating a communication method according to another embodiment of the present invention.
Figure 2B:
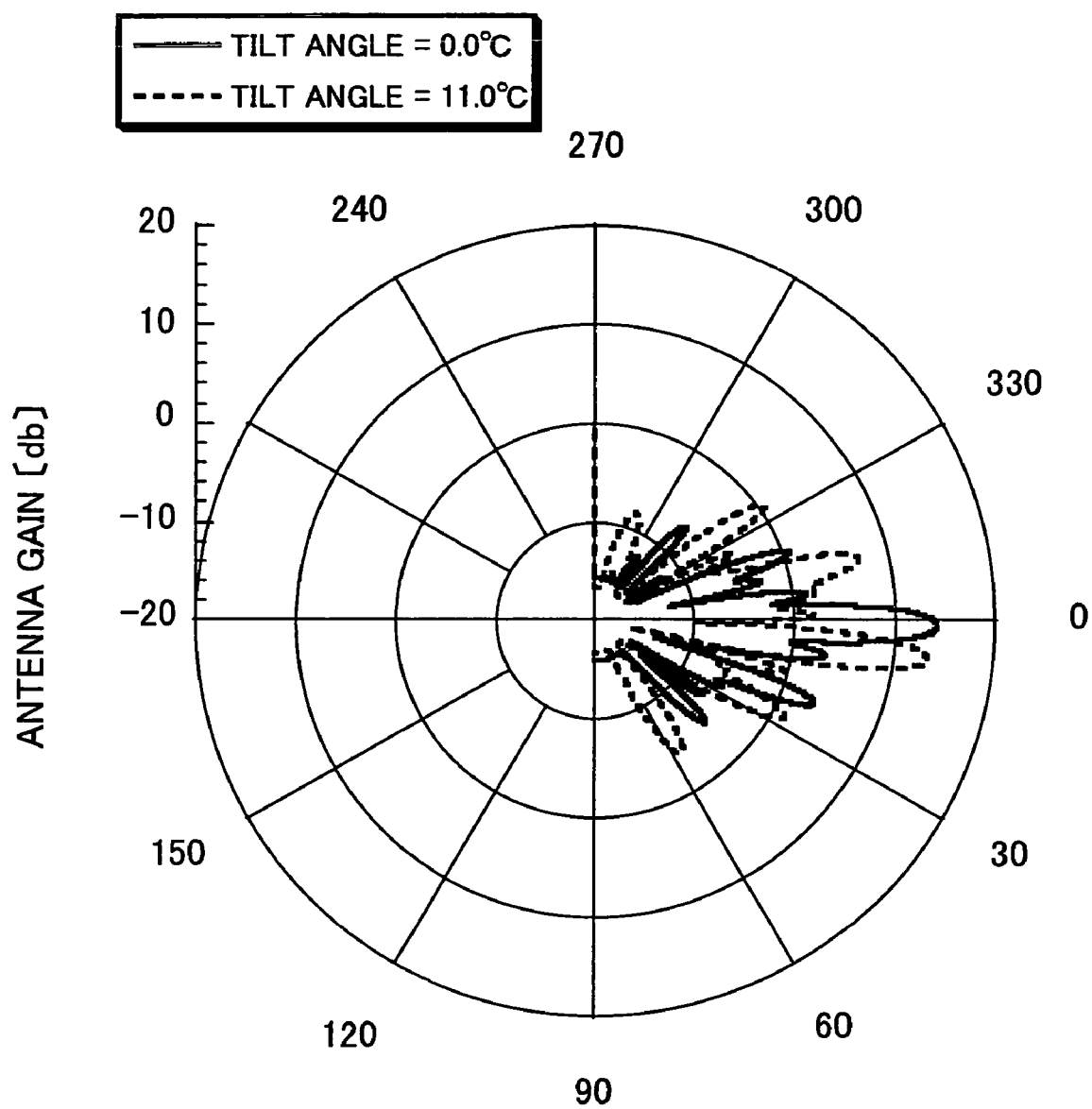

FIG. 2A is a diagram showing an antenna vertical pattern directing the main lobe toward an area administered by a current base station by beam tilting, and directing the side lobe and the null point to areas administered by neighboring base stations. FIG. 2B is a diagram showing antenna patterns in a case where the tilt angle is 0.0 degrees (i.e., no beam tilting) and in a case where the tilt angle is 1.0 degrees (i.e., beam tilting where the main lobe is directed within the area administered by the current base station and the null point between the main lobe and the side lobe is directed toward an area administered by a neighboring base station) FIG. 2C is a diagram showing propagation loss in consideration of the antenna gain according to the distance from the base station of FIG. 2B.

Figure 2C:
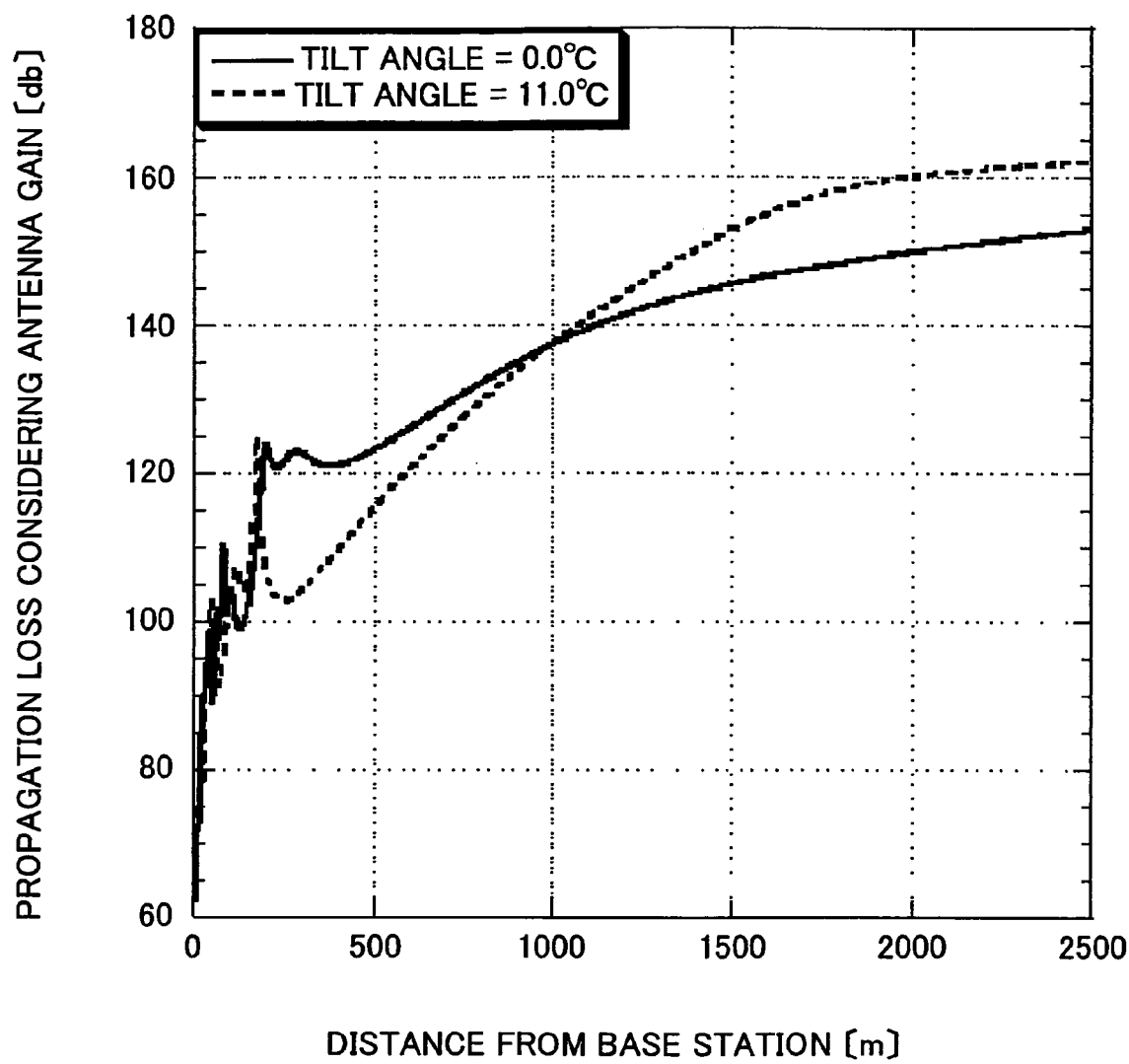

According to FIG. 2C, when the cell radius is 1000 m and the tilt angle is 11.0 degrees, propagation loss within the cell may be reduced and propagation loss of the neighboring cells may be increased compared to the case in which the tilt angle is 0.0 degrees. In other words, cell coverage may be improved in the cell administered by the relevant base station, and interference from other cells may be reduced.

It is noted that in the above example, only the tilt angle is changed. However, in another example, based on the measurement report from the mobile station, the half width of the vertical pattern of the base station antenna may be widened by reducing the number of vertically stacked radiation elements of the base station antenna while enlarging the tilt angle by setting the difference in the phase conversion amount between adjacent radiation elements to a maximum value so that the tilt angle as well as the half width of the base station antenna vertical pattern may be adjusted.

In another example, based on the measurement report from the mobile station, the half width of the vertical pattern may be narrowed by gradually increasing the number of vertically stacked radiation elements of the base station antenna while reducing the tilt angle by gradually decreasing the difference in the phase conversion amount between adjacent radiation elements so that the tilt angle as well as the half width of the base station antenna vertical pattern may be adjusted.

Also, with respect to an antenna horizontal pattern, by directing the main lobe toward an area administered by the current base station and directing the side lobe and the null point toward an area administered by a neighboring base station (beam directing), cell coverage of the cell administered by the current base station may be improved and interference from other cells may be reduced as in the case of beam tilting.

In other words, by directing the main lobe of the antenna horizontal pattern toward the area administered by the current base station, propagation loss for a direction may be reduced in relativity by the antenna gain of the main lobe regardless of the distance from the base station. Also, by directing the side lobe and the null point of toward the area administered by a neighboring cell, the propagation loss for a direction may be increased in relativity by the antenna gain of the side lobe and the null point regardless of the distance from the base station.

Accordingly, based on the measurement report from the mobile station, the open angle of a reflection plate that is placed behind the radiation elements of the base station antenna and determines the half angle of the horizontal pattern, and the relative position of the radiation elements and the reflection plate may be mechanically or electromagnetically adjusted.

In the following, an example of newly establishing a base station is described.

Figure 3A:
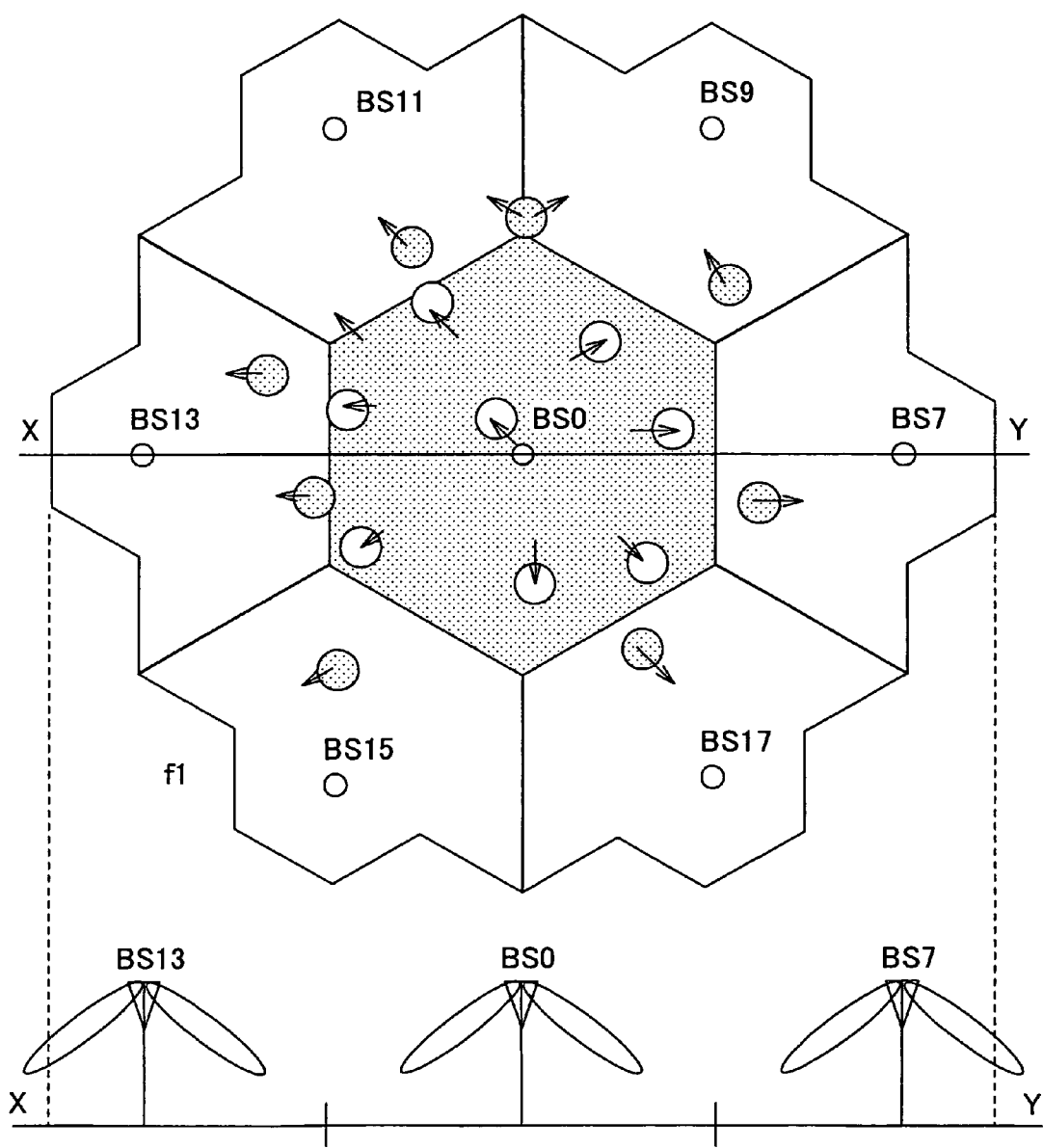
FIGS. 3A-3C are diagrams illustrating a communication method according to another embodiment of the present invention.

FIG. 3A is a diagram showing an example in which the service area is not changed for some time. The tilt angle of the base station antenna vertical pattern is converged at a substantially appropriate angle, and most of the handovers of the mobile stations residing within the cell formed by the base station BS0 occur with respect to adjacent cells such as cells formed by the base stations BS7, BS9, BS11, BS13, BS15, and BS17 as is illustrated by the arrows shown in FIG. 3A.

Figure 3B:
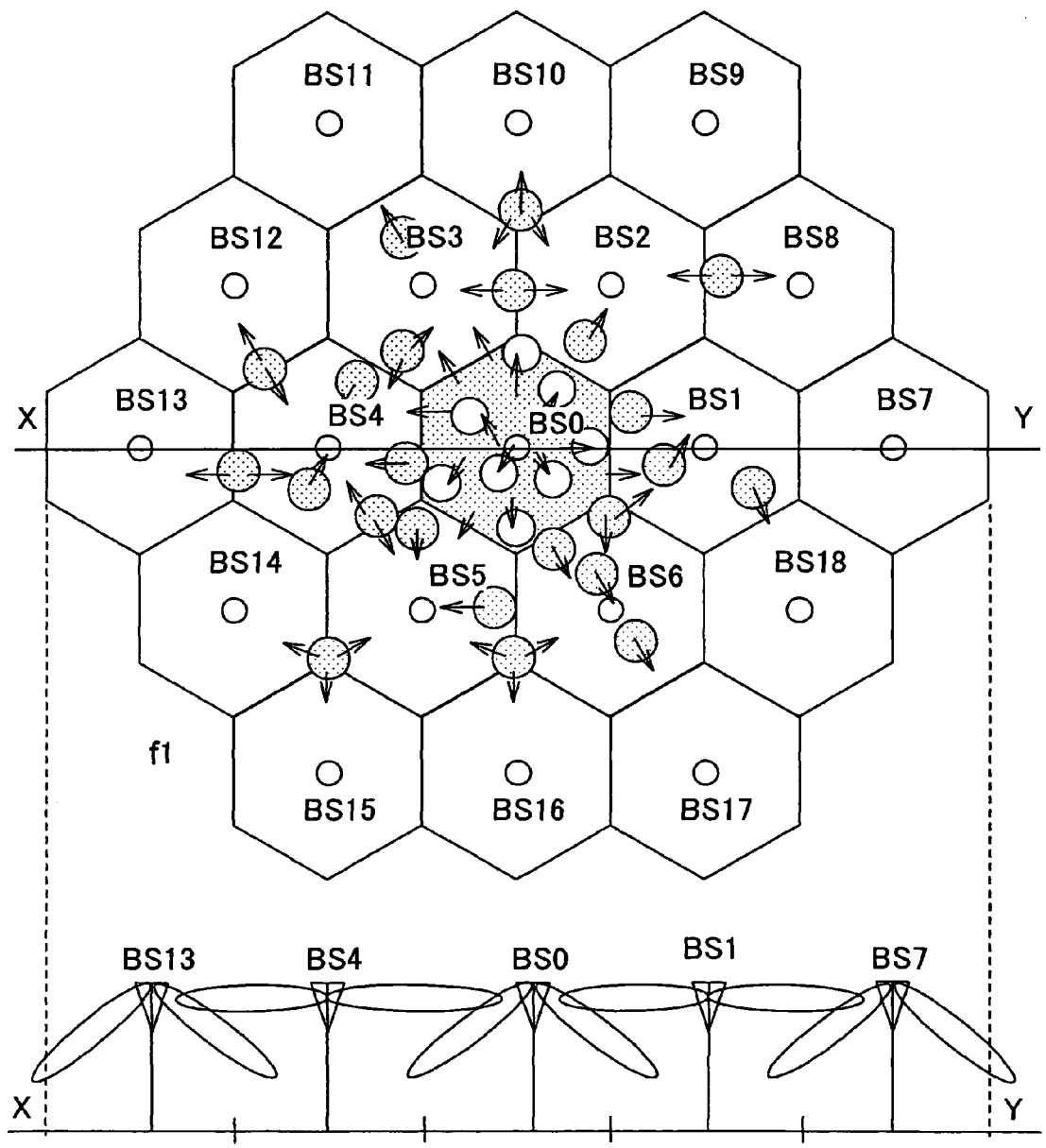

In the following, an example is described in which six base stations BS1 through BS6 as well as six base stations BS8, BS10, BS12, BS14, BS16, and BS18 are newly added to the system of FIG. 3A. In this case, the adjacent positional relationships between the cells change as is shown in FIG. 3B. Specifically, changes occur in the extent of adjacency indicating the extent of sharing an electromagnetic space between the cell of the base station BS0 and its neighboring cells. Therefore, the mobile station residing within the cell formed by the base station BS0 may generally be arranged to perform handover with respect to cells formed by the base stations BS1 through BS6.

However, since the tilt angle of the base station BS0 is set to a smaller value than the optimum value and the tilt angles of the newly established base stations are not set to their optimum values, small isolated cell areas may be generated, and handover may be performed with respect to the twelve base stations BS7 through BS18 as well.

Also, in this case, since the tilt angles are not optimally set, the extent to which an electromagnetic space is shared between the cells is increased, the amount of uplink interference is increased, the amount of downlink interference is increased, and the downlink base station total transmission power is increased.

At the base station BS0, threshold determination is performed on the wireless resources so that the state change in the service area may be detected, and attempts are made to optimize the tilt angle by increasing the tilt angle of the antenna vertical pattern of the current base station so that the adjacency between cells with low adjacency such as base stations BS7 and BS18 may be further reduced.

It is noted that the above process is repeated until the adjacency between the cells with low adjacency is reduced to less than or equal to a fixed value.

Figure 3C:
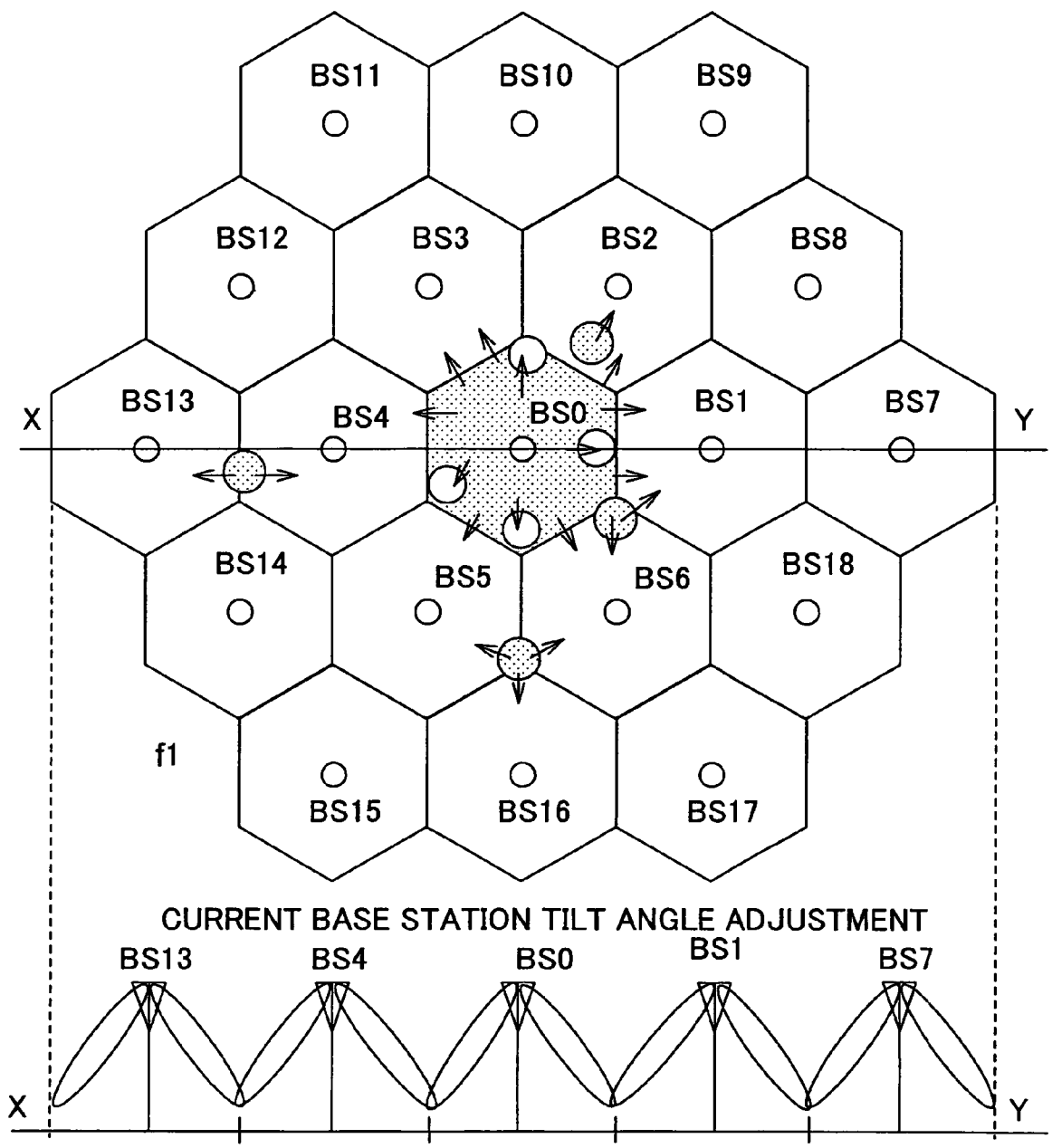

It is noted that similar processes are performed at each of the neighboring base stations as well. In the end, the antenna vertical pattern tilt angle may be optimized at the base stations of all the cells as is shown in FIG. 3C.

It is noted that in the above example, in order to control and direct at least one of the main lobe, the side lobe, or the null point between the main lobe and the side lobe of the antenna pattern toward a direction for reducing the frequency interference between the cell formed by the current base station and the cell formed by a neighboring base station using the same frequency, the antenna vertical pattern tilt angle of the current base station is widened so that the tilt angle maybe converged to an optimal value. In an alternative embodiment, the azimuth of the antenna horizontal pattern may be updated instead of the tilt angle of the antenna vertical pattern so that the antenna horizontal pattern azimuth may be optimized.

Figure 4A:
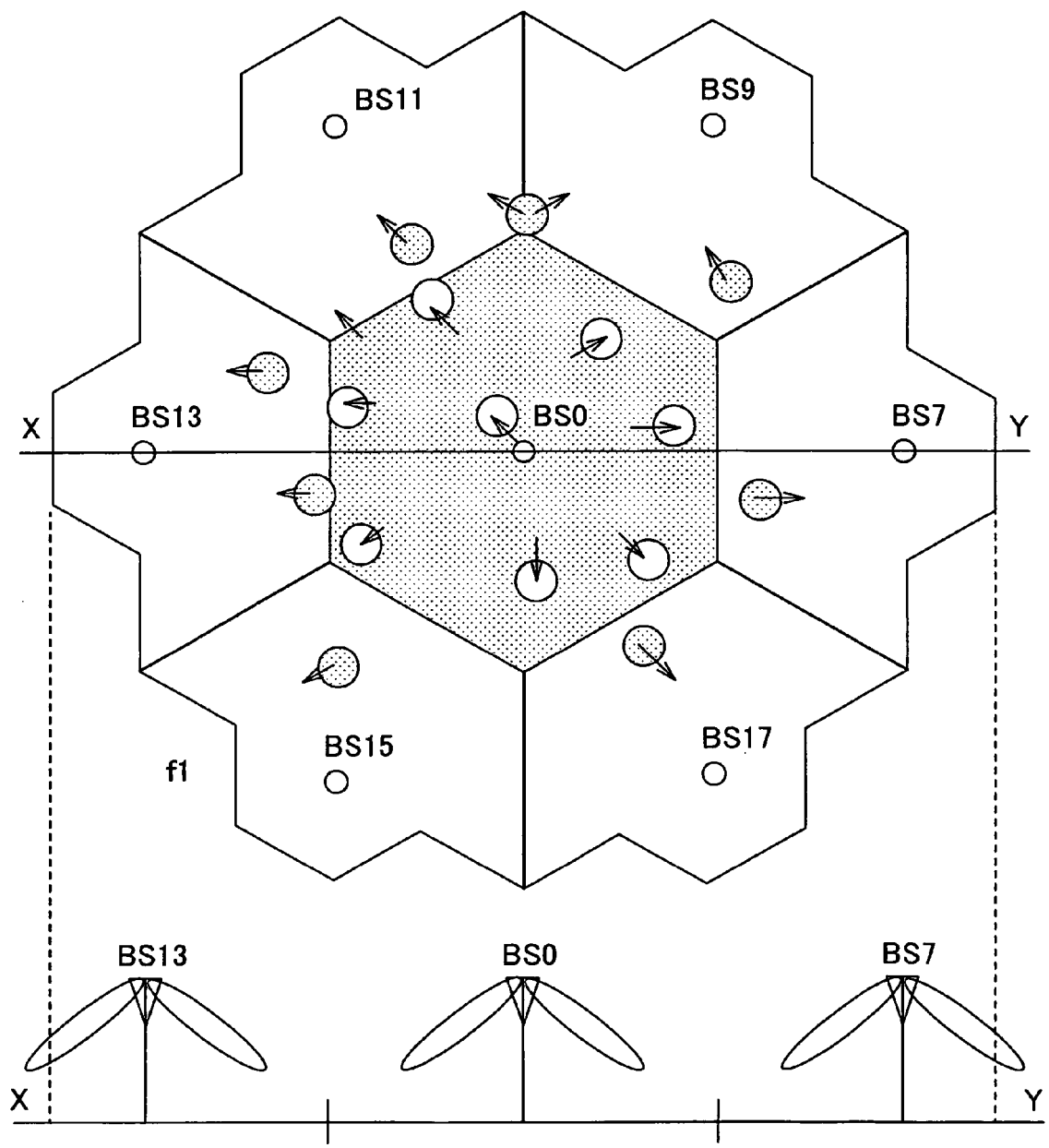
FIGS. 4A-4C are diagrams illustrating a communication method according to another embodiment of the present invention.
Figure 4B:
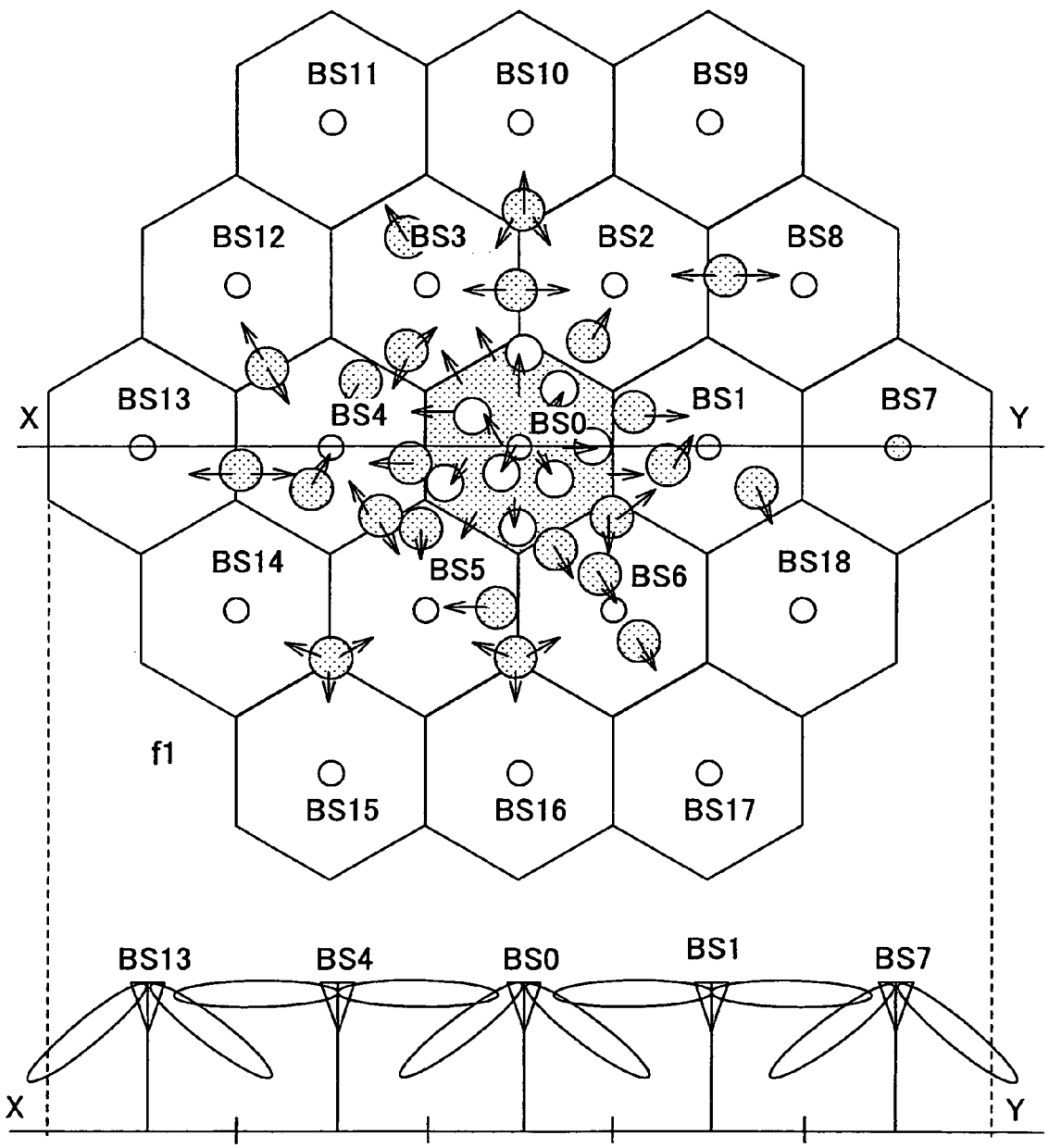
Figure 4C:
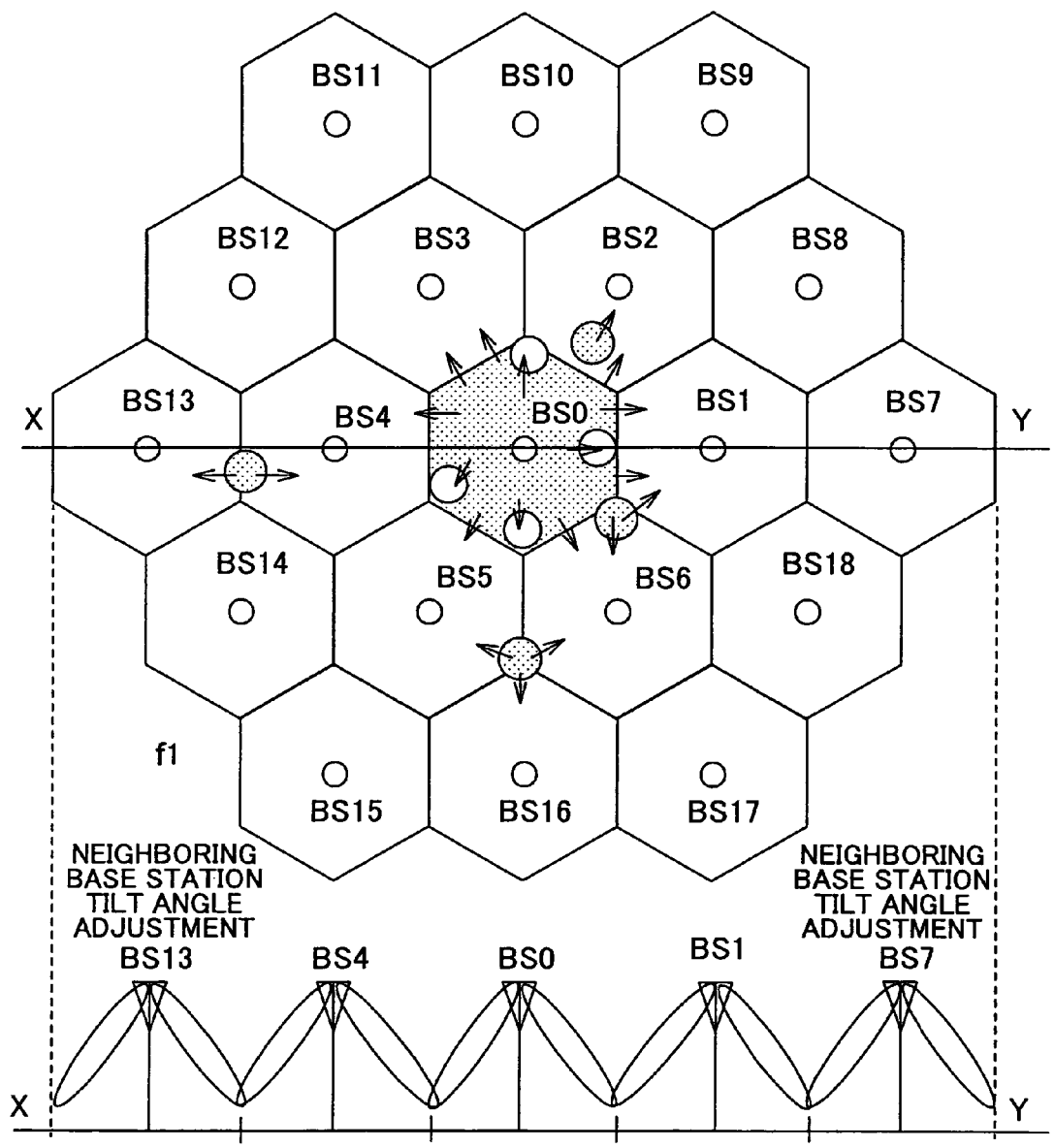

In another embodiment, instead of updating the antenna vertical pattern tilt angle of the current base station, the tilt angles of antenna vertical patterns of neighboring base stations that form cells determined to be at low adjacency may be updated as is shown in FIGS. 4A, 4B, and 4C. Also, the azimuth of the antenna horizontal pattern may be updated instead of the antenna vertical pattern tilt angle in this case to optimize the antenna horizontal pattern azimuth.

In the following, an example is described in which base stations are removed.

Figure 5A:
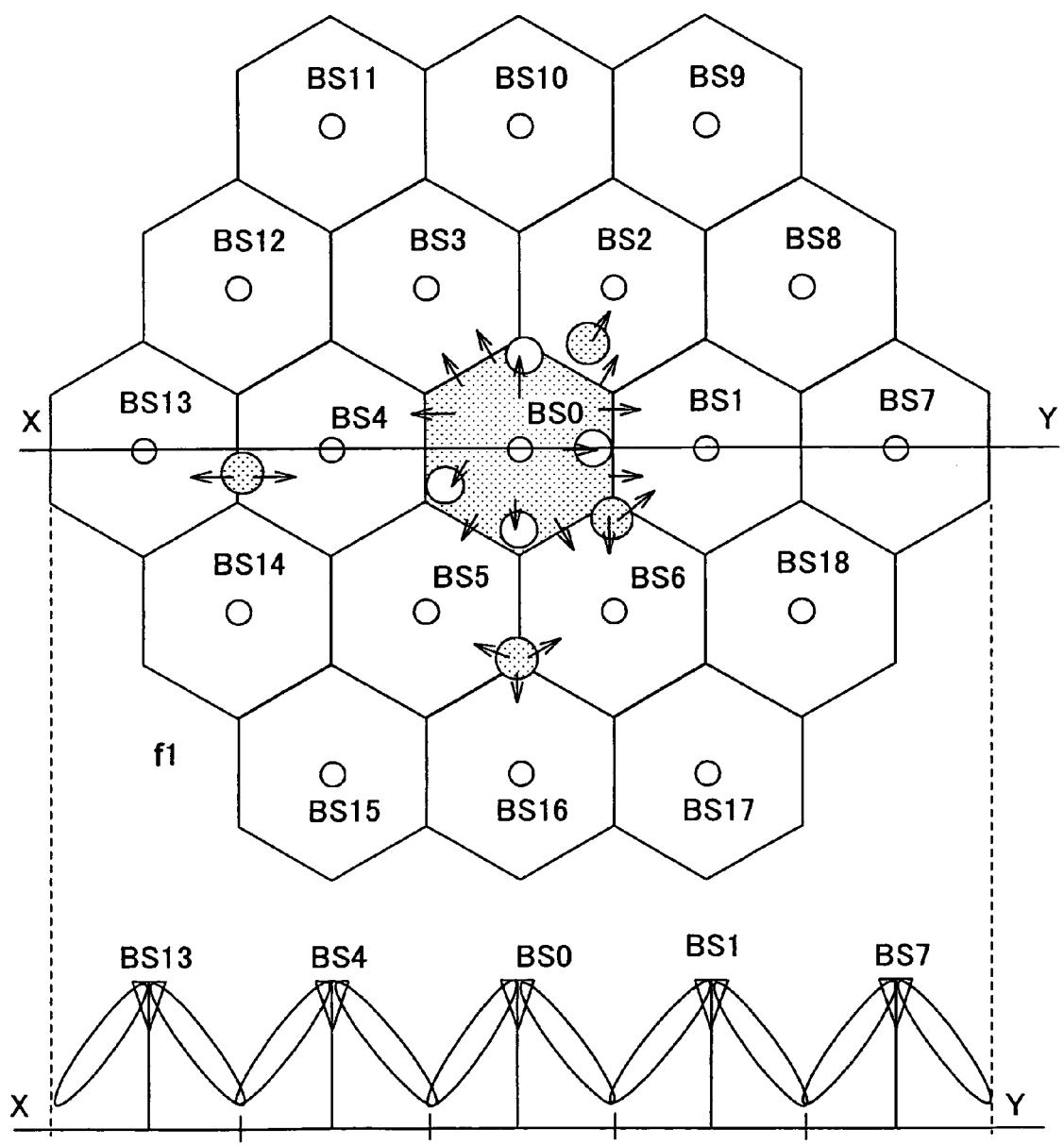
FIGS. 5A-5C are diagrams illustrating a communication method according to another embodiment of the present invention.

FIG. 5A shows an example in which the state of the service area has not changed for some time. In this case, the base station antenna vertical pattern tilt angle is set to a substantially optimal angle, and most of the handovers of the mobile stations residing within the cell formed by the base station BS0 occur between adjacent cells such as cells formed by the base stations BS1, BS2, BS3, BS4, BS5, and BS6 as is indicated by the arrows shown in FIG. 5A.

In the following example, six base stations BS1 through BS6 as well as six base stations BS8, BS10, BS12, BS14, BS16, and BS18 are removed.

Figure 5B:
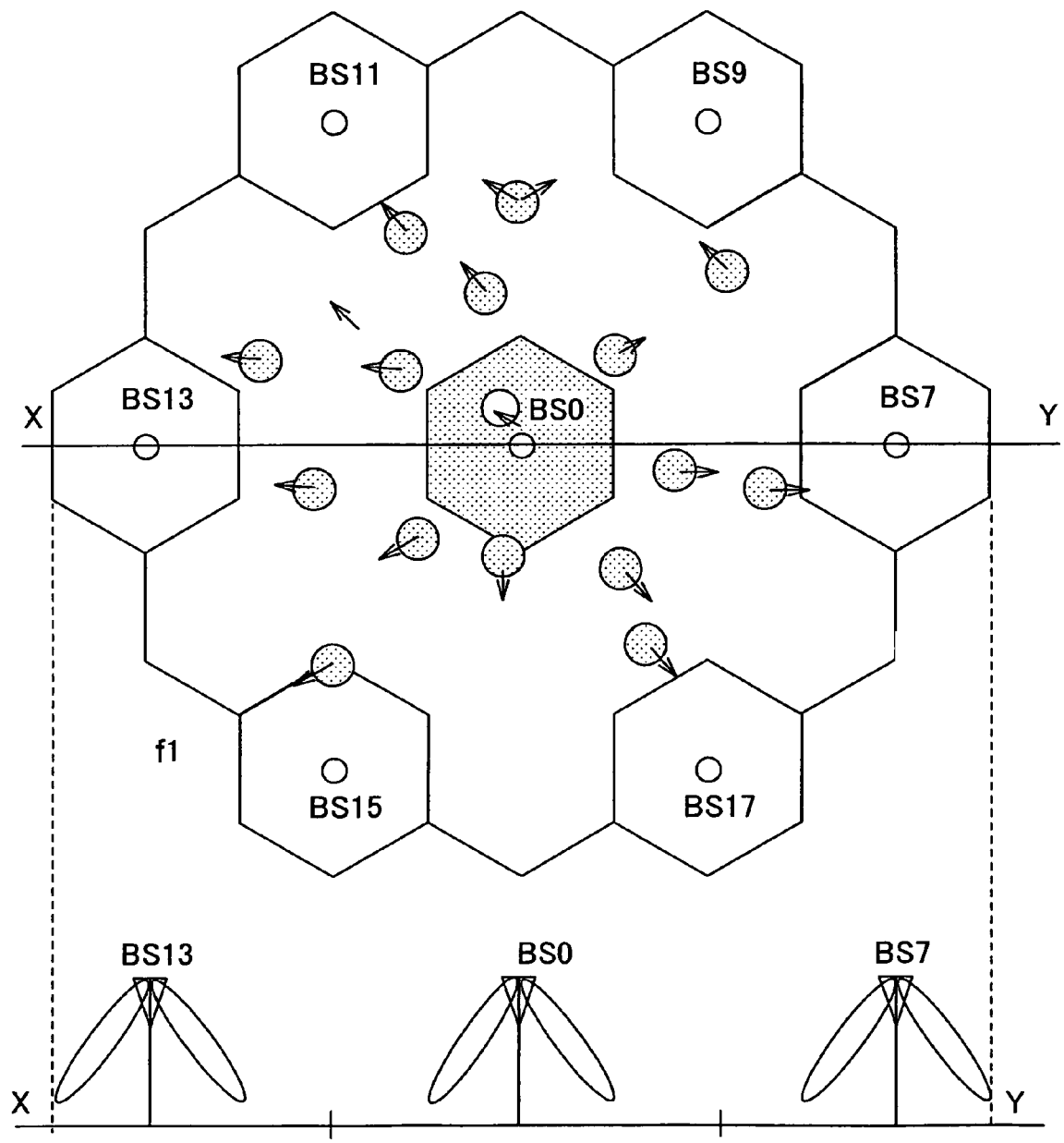

In this case, change occurs in the adjacency relation between cells, and due to the change in the adjacency of neighboring cells, the BS0 tilt angle may be larger than the optimal value. In turn, coverage hole (area in which a base station does not exist for transmitting the common pilot channels at high power) are generated that is similar to an independent cell so that a cell as a handover destination may not be found. However, it is noted that interference from other cells may be reduced, and thereby, isolated cells may be formed at sites where the reception level of the common pilot channels exceeds the thermal noise as is shown in FIG. 5B.

This change in the adjacency relation may be detected as a change in adjacency that is constantly determined at predetermined time intervals, namely, the chance may be detected as a decrease in or disappearance of adjacency between a neighboring cell that previously has high adjacency with the current cell. In this case, attempts may be made to converge the tilt angle to an optimal value by reducing the current base station antenna vertical pattern tilt angle so that the adjacency of neighboring cells with low adjacency may be increased or created.

Figure 5C:
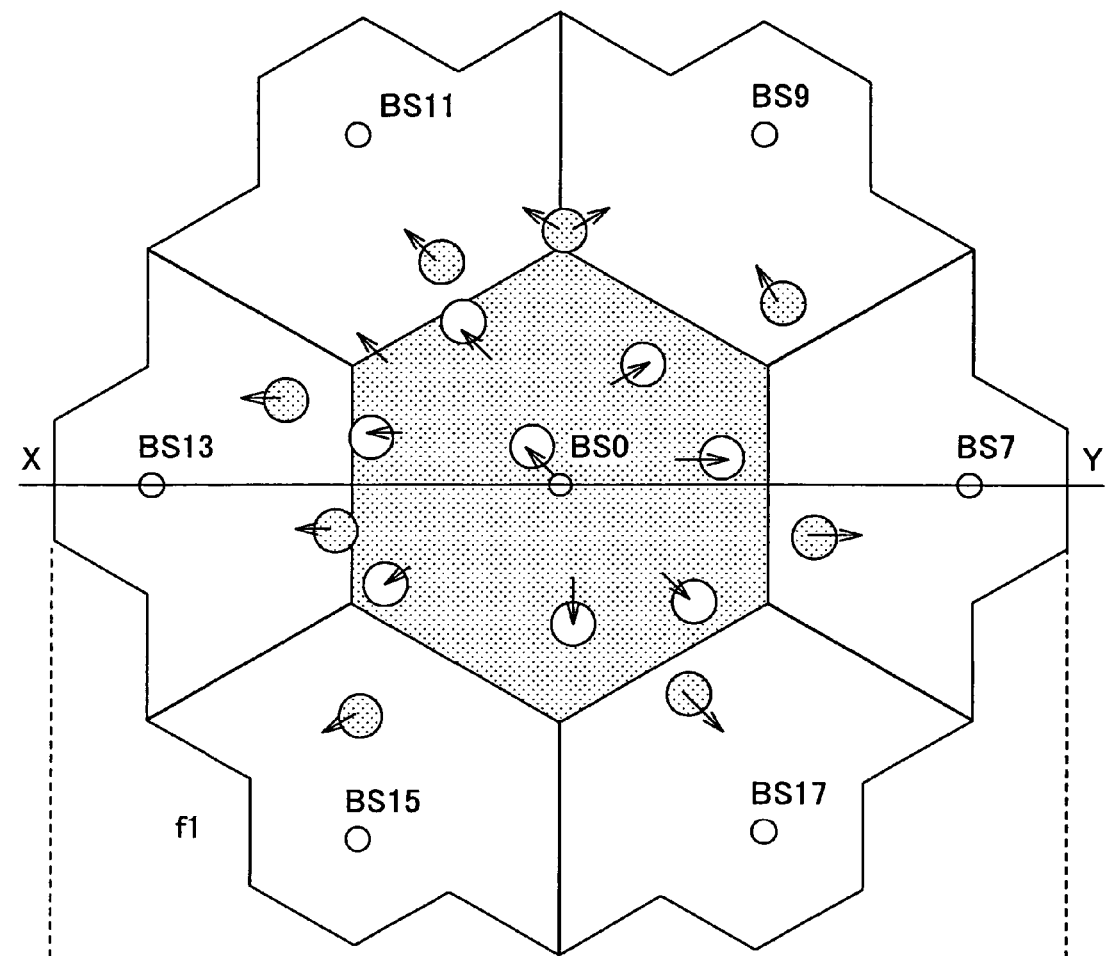
Figure 5C:
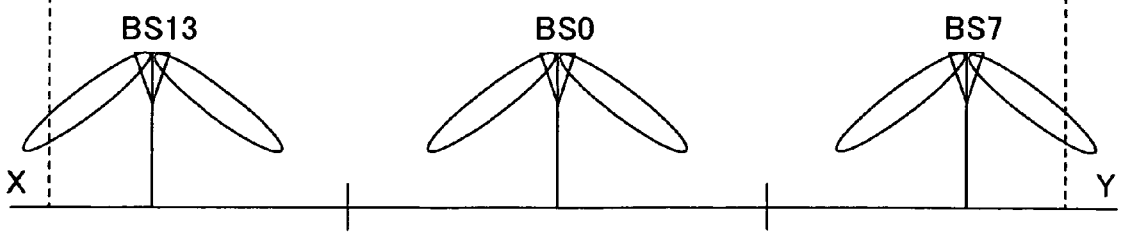

The above process may be repeated until the adjacency of the cells with low adjacency reaches a value greater than or equal to a fixed value. It is noted that similar operations are performed at the neighboring base stations as well. In the end, the tilt angles may be optimized at the base stations of all the cells as is shown in FIG. 5C.

In an alternative embodiment, the antenna horizontal pattern azimuth may be updated instead of the antenna vertical pattern tilt angle so that the antenna horizontal pattern azimuth may be optimized.

Figure 6A:
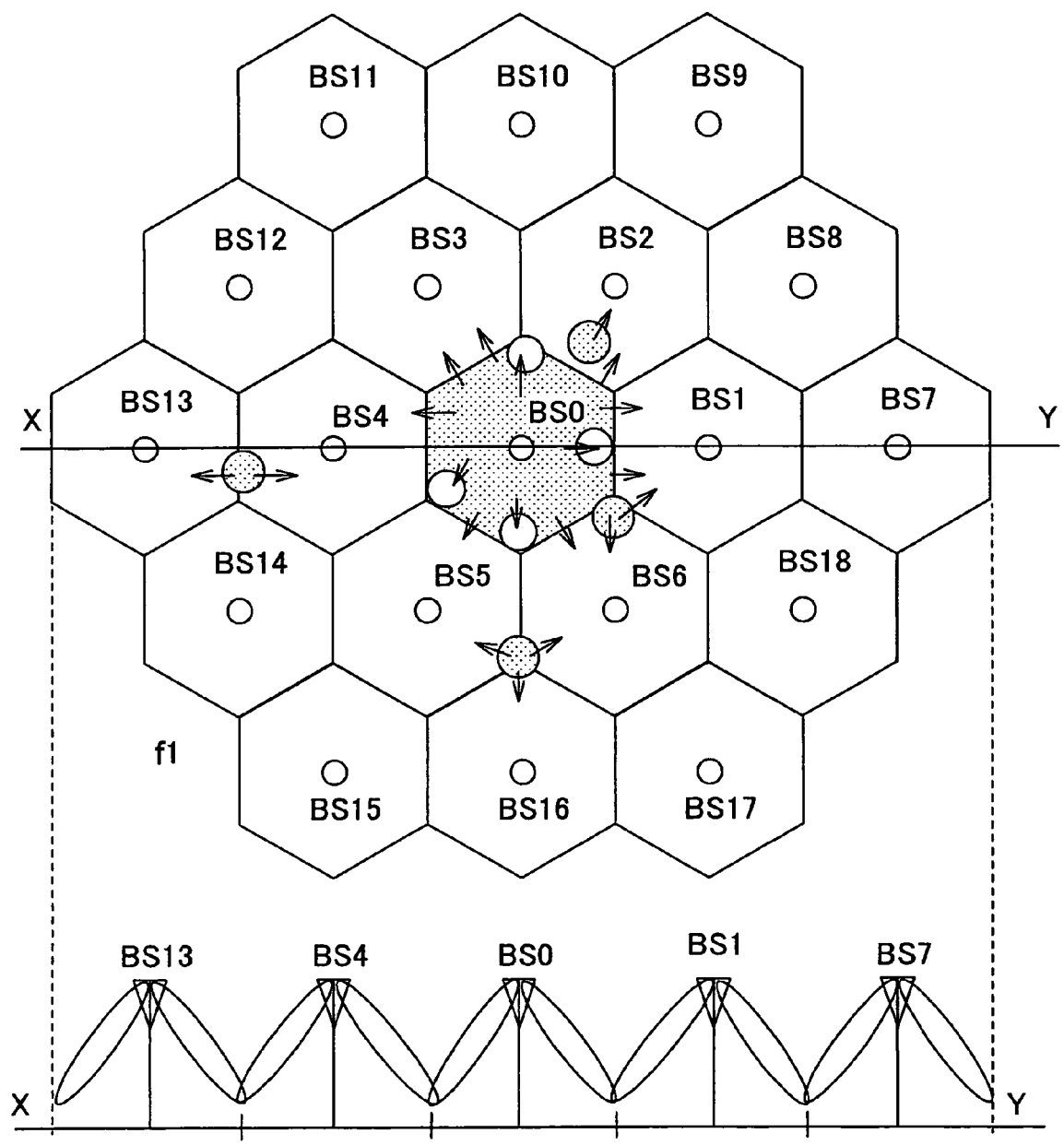
FIGS. 6A-6C are diagrams illustrating a communication method according to another embodiment of the present invention.
Figure 6B:
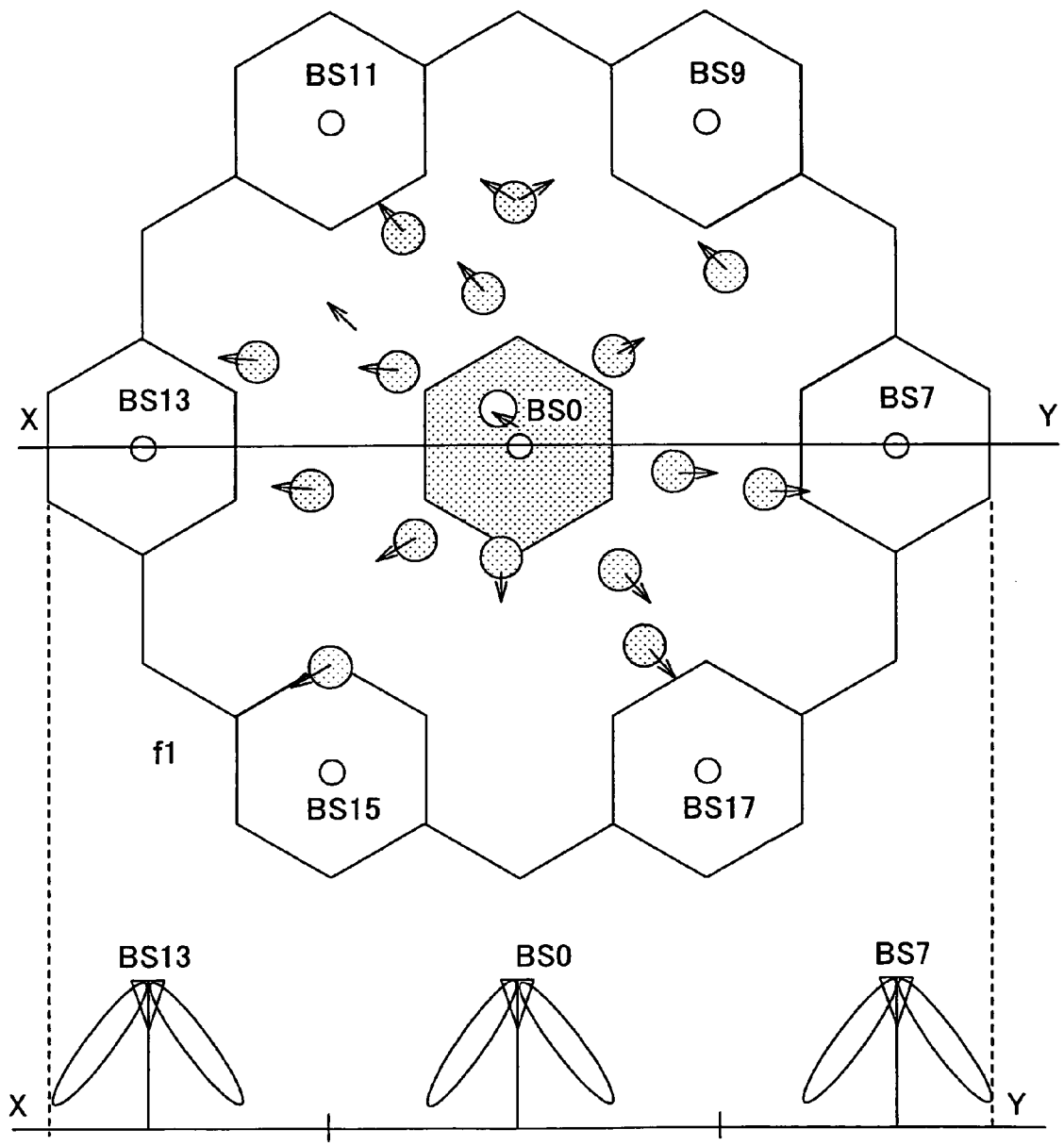
Figure 6C:
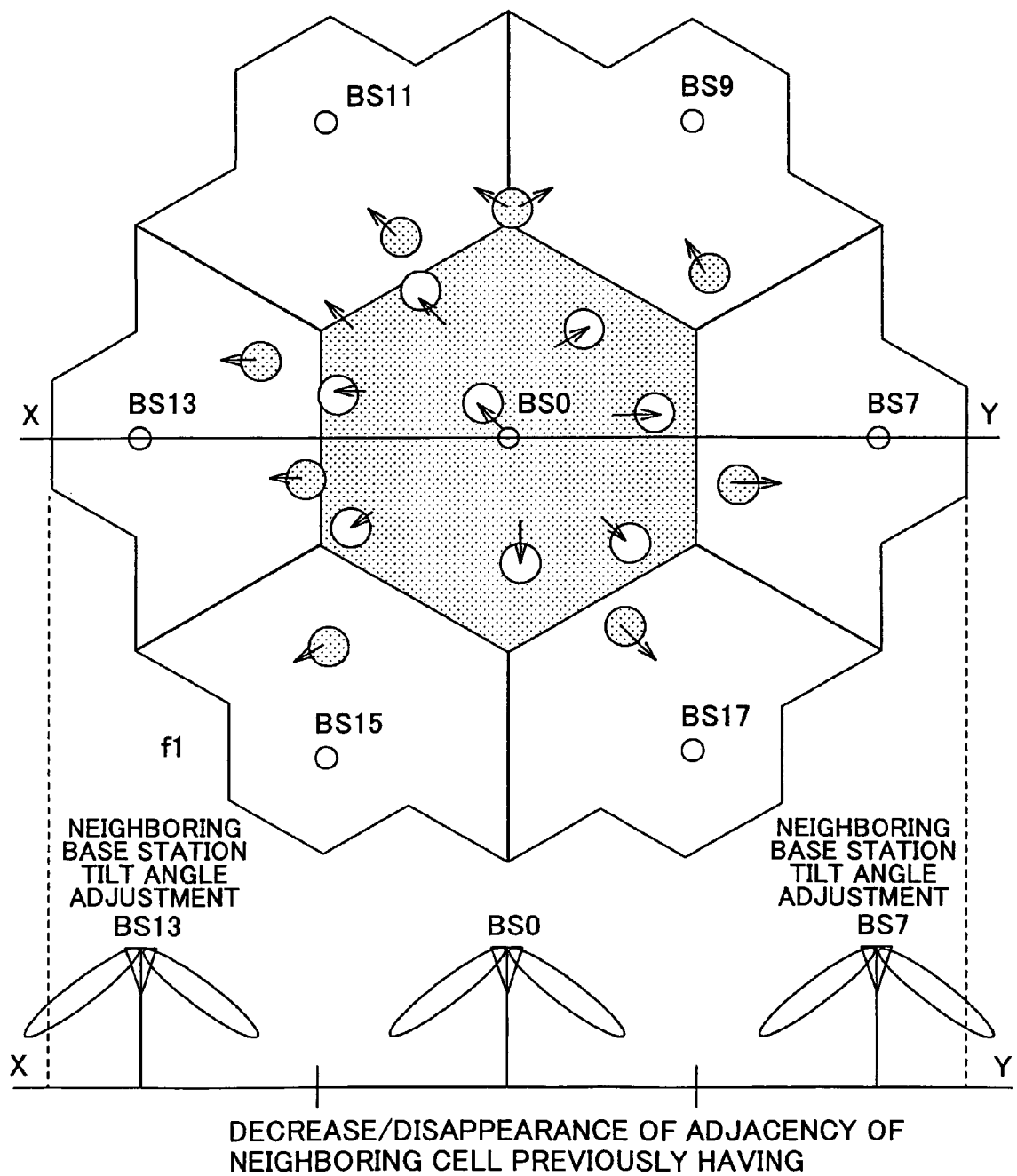

In another embodiment, instead of updating the antenna vertical pattern tilt angle of the current base station, the tilt angles of antenna vertical patterns of neighboring base stations that form cells determined to be at low adjacency may be updated as is shown in FIGS. 6A, 6B, and 6C. Also, the azimuth of the antenna horizontal pattern may be updated instead of the antenna vertical pattern tilt angle in this case as well to optimize the antenna horizontal pattern azimuth.

In the following, a method for calculating the adjacency between cells is described.

In this example, to obtain the adjacency of a neighboring cell with respect to a current cell, a base station of a neighboring cell that is to be switched to the main branch in place of the base station forming the current cell, namely, the base station of the cell corresponding to the handover destination from the current cell is determined, and an adjacency counter value indicating the adjacency of the corresponding neighboring cell that is held within the base station forming the current cell is incremented by one. Alternatively, the base station forming the cell corresponding to the handover destination from the current cell may be determined, and the adjacency counter value for the corresponding cell may be incremented by a predetermined number such as a value according to the reception level.

Figure 7:
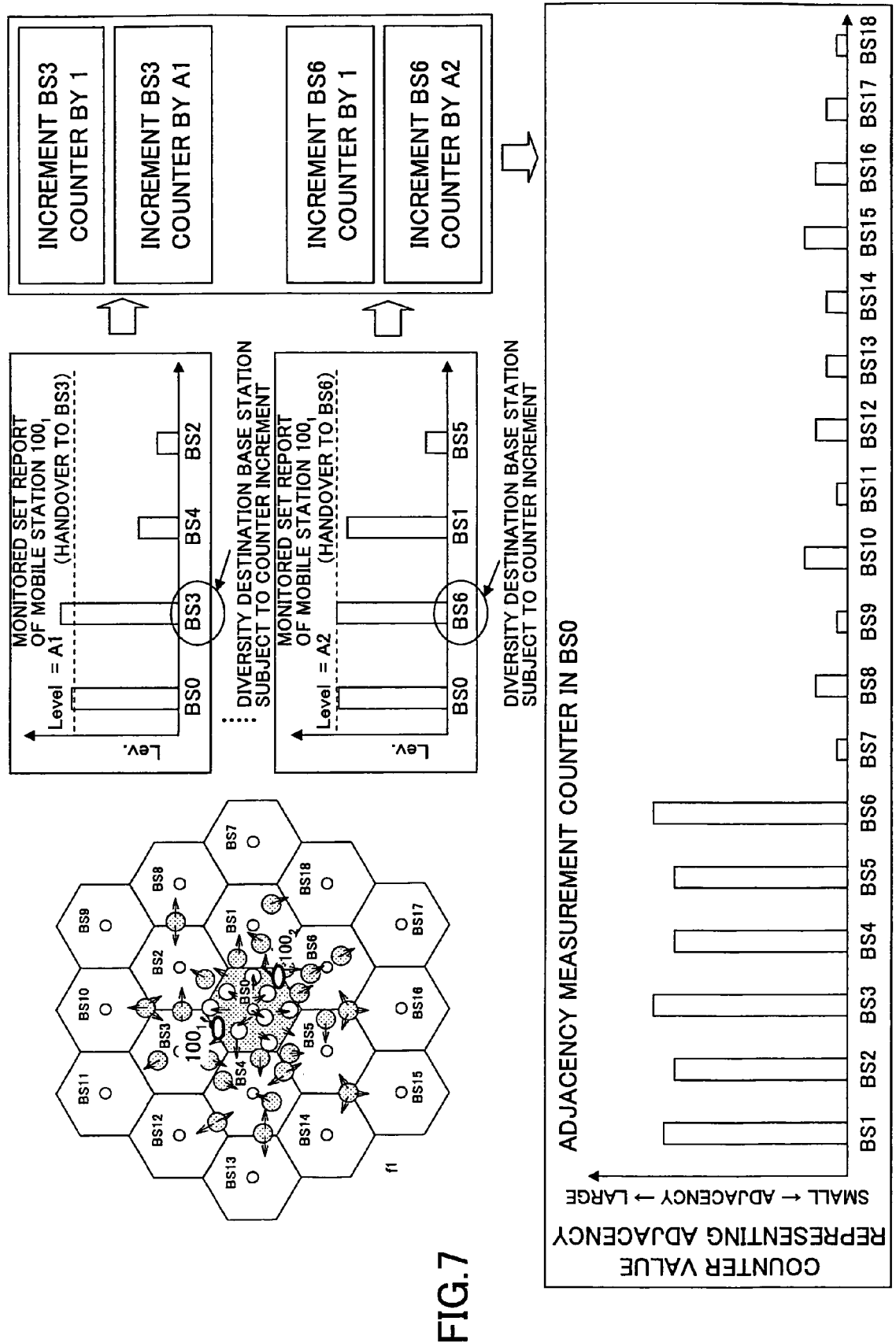
FIG. 7 is a diagram illustrating a communication method according to another embodiment of the present invention.

In the following, an example is described referring to FIG. 7 in which two mobile stations $100_1$ and $100_2$ perform handover from the current cell formed by the base station BS0 to the a neighboring cell.

The main branch of the mobile station $100_1$ is in the process of being switched from base station BS0 to base station BS3, that is, the mobile station $100_1$ is being handed over to the base station BS3. The mobile station $100_1$ transmits a report of its monitored set to the base station BS0.

In turn, the base station BS0 detects the base station BS3 corresponding to the handover destination from the monitored set report, and increments the adjacency counter value for the base station BS3 that is held by the base station BS0. In this case, the adjacency counter value may be incremented by one, or the counter value may be incremented by a value according to the reception level such as A1.

On the other hand, the main branch of the mobile station $100_2$ is being switched from base station BS0 to base station BS6, and the mobile station $100_2$ is being handed over to the base station BS6. The mobile station $100_2$ transmits a report of its monitored set to the base station BS0.

In turn, the base station BS0 detects the base station BS6 corresponding to the handover destination from the report of the monitored set, and increments the BS6 adjacency counter value held by the base station BS0. In this case the counter value may be incremented by one or the counter value may be incremented by a value according to the reception level such as A2.

It is noted that in the present example, A1 represents the reception level measured by the mobile station $100_1$ upon switching from the base station BS0 to the base station BS3, and A2 represents the reception level measured by the mobile station $100_2$ upon switching from the base station BS0 to the base station BS6.

It is noted that there may be other mobile stations that are performing handover to neighboring cells at the present moment as well.

The base station BS0 accumulates the above processes within a predetermined time, and determines based on the accumulated results that a cell has high adjacency with respect to the current cell when the adjacency counter value for the corresponding base station is large, and a cell has low adjacency with respect to the current cell when the adjacency counter value for the corresponding base stations is small.

In the following, another method for calculating the adjacency is described.

In this example, to obtain the adjacency of a neighboring cell with respect to a current cell, when the active set defining the base station forming the current cell as the main branch is changed (e.g., when handover involving main branch switching takes place), a base station forming a neighboring cell that is to be switched to the main branch and other base stations corresponding to the major branch; namely, the base stations corresponding to the active set during handover from the current cell are determined, and one or more adjacency counter values for the corresponding cells of the base stations are incremented by one. That is, in a case where the active set defining the base station forming the current cell as the main branch is changed, the base station forming a neighboring cell included in the active set during handover is determined, and the adjacency counter value indicating the adjacency of the corresponding neighboring cell that is held within the base station of the current cell is incremented by one. Alternatively, the base stations corresponding to the active set during handover from the current cell may be determined, and the adjacency counter values of their corresponding cells may be incremented by a predetermined number such as a value according to reception level measurements.

Figure 8:
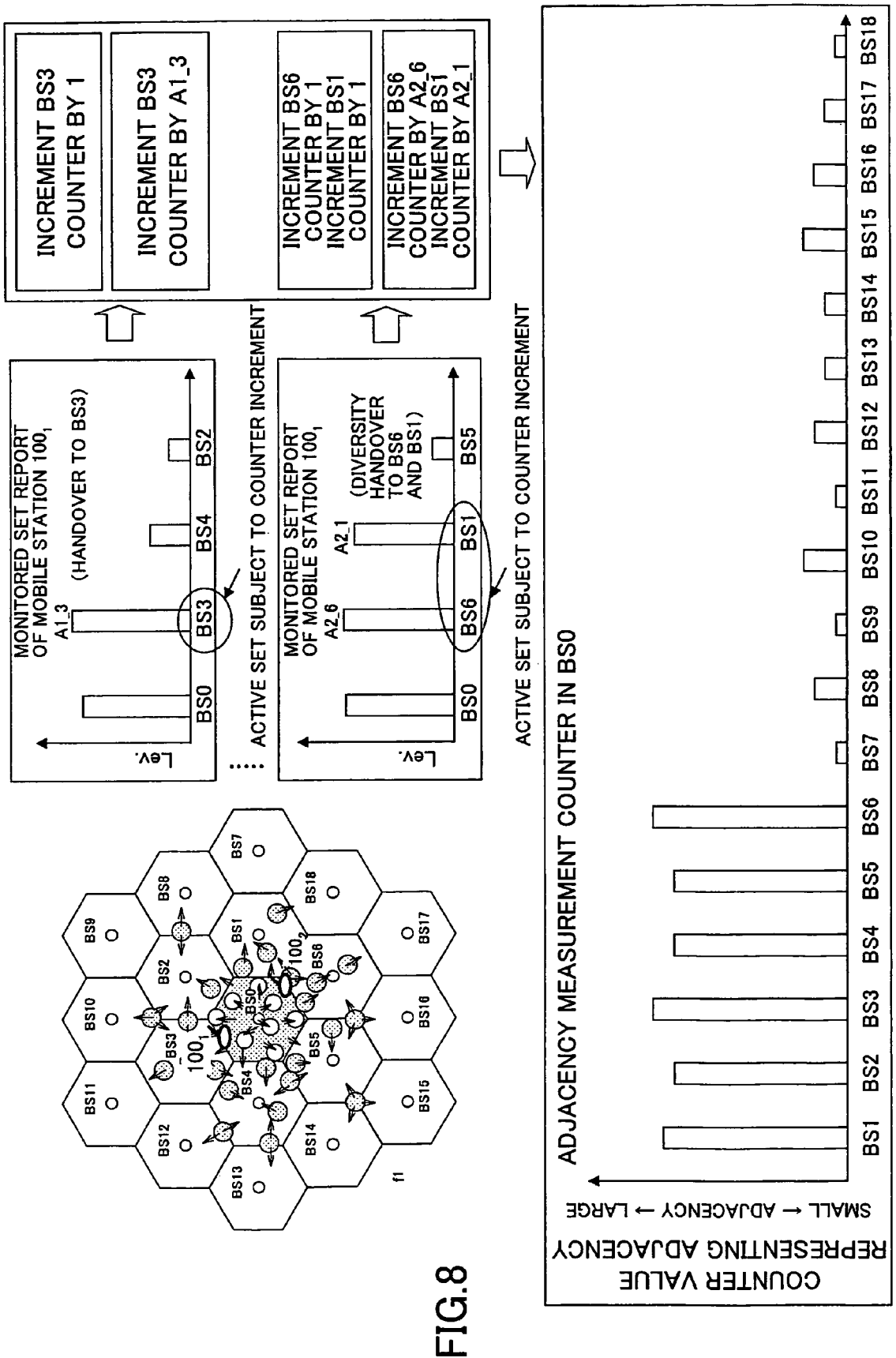
FIG. 8 is a diagram illustrating a communication method according to another embodiment of the present invention.

The above example is described in detail with reference to FIG. 8.

In the illustrated example, the main branch of the mobile station $100_1$ is in the process of being switched from base station BS0 to base station BS3, that is, the mobile station $100_1$ is being handed over to the base station BS3. The mobile station $100_1$ transmits a report of its monitored set to the base station BS0.

In turn, the base station BS0 detects the base station BS3 (level A1_3) as the active set from the monitored set report, and increments the adjacency counter value for the base station BS3 that is held by the base station BS0.

On the other hand, the main branch of the mobile station $100_2$ is being switched from base station BS0 to base station BS6, and the mobile station $100_2$ is being handed over to the base station BS6. The mobile station $100_2$ transmits a report of its monitored set to the base station BS0.

In turn, the base station BS0 detects the base station BS6 (level A2_6) and base station BS1 (level A2_1) as the active set from the report of the monitored set, and increments the adjacency counter value for BS6 and the adjacency counter value for BS1 that are held by the base station BS0. It is noted that there may be other mobile stations that are performing handover to neighboring cells at the present moment as well.

The base station BS0 accumulates the above processes within a predetermined time, and determines based on the accumulated results that a cell has high adjacency with respect to the current cell when the adjacency counter value for the corresponding base station is large, and a cell has low adjacency with respect to the current cell when the adjacency counter value for the corresponding base stations is small.

In the following, another method for calculating the adjacency is described.

In this example, to obtain the adjacency of a neighboring cell with respect to a current cell, when the active set defining the base station forming the current cell as the main branch is changed such as when handover involving main branch switching takes place, a base station forming a neighboring cell that is to be switched to the main branch and other base stations corresponding to the major branch and the minor branch; namely, the base stations corresponding to a monitored set during handover from the current cell are determined, and one or more adjacency counter values for their corresponding cells are incremented by one.

Alternatively, the base stations corresponding to the monitored set during handover from the current cell may be determined and the adjacency counter values for their corresponding cells may be incremented by a predetermined number such as a value according to reception level measurements.

Figure 9:
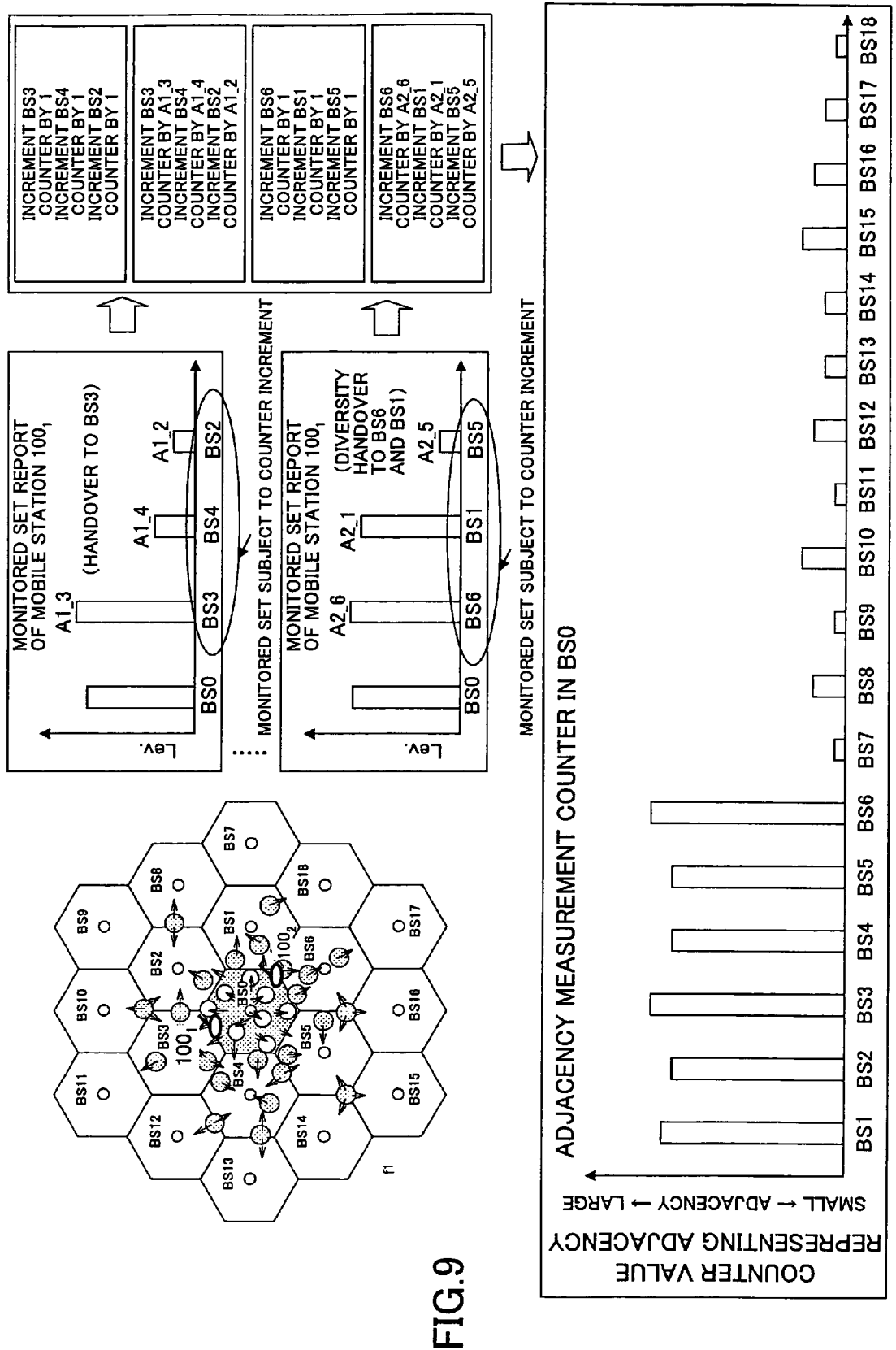
FIG. 9 is a diagram illustrating a communication method according to another embodiment of the present invention.

The above example is described in detail with reference to FIG. 9.

In the illustrated example, the main branch of the mobile station $100_1$ is in the process of being switched from base station BS0 to base station BS3, that is, the mobile station $100_1$ is being handed over to the base station BS3. The mobile station $100_1$ transmits a report of its monitored set to the base station BS0.

In turn, the base station BS0 detects the base station BS3 (level A1_3), the base station BS4 (level A1_4), and base station BS2 (level A1_2) as the monitored set from the monitored set report, and increments the respective adjacency counter values for the base stations BS3, BS4, and BS2 that are held by the base station BS0.

On the other hand, the main branch of the mobile station $100_2$ is being switched from base station BS0 to base station BS6, and the mobile station $100_2$ is being handed over to the base station BS6. The mobile station $100_2$ transmits a report of its monitored set to the base station BS0.

In turn, the base station BS0 detects the base station BS6 (level A2_6), base station BS1 (level A2_1), and base station BS5 (level A2_5) as the monitored set from the report of the monitored set, and increments the respective adjacency counter values for the BS6, BS1, and BS5 that are held by the base station BS0. It is noted that there may be other mobile stations that are performing handover to neighboring cells at the present moment as well.

The base station BS0 accumulates the above processes within a predetermined time, and determines based on the accumulated results that a cell has high adjacency with respect to the current cell when the adjacency counter value for the corresponding base station is large, and a cell has low adjacency with respect to the current cell when the adjacency counter value for the corresponding base stations is small.

In the following, the wireless control apparatus used in the base station according to an embodiment of the present invention is described. The wireless control apparatus 300 of the present embodiment performs the communication method as is described above.

The wireless control apparatus 300 of the present embodiment includes a transceiver unit 302 including an antenna; an uplink wireless channel receiving unit 304 as area formation information gathering means and a downlink wireless channel transmitting unit 310 that are connected to the transceiver unit 302; a cell adjacency calculating unit 306 that is connected to the uplink wireless channel receiving unit 304; a tilt angle changing unit 308 as antenna pattern control means that is connected to the cell adjacency calculating unit 306; and a wireless resource monitoring unit 312 that is connected to the cell adjacency calculating unit 306, the uplink wireless channel receiving unit 304, and the downlink wireless channel transmitting unit 310. It is noted that the uplink wireless channel receiving unit 304 is connected to the downlink wireless channel transmitting unit 310.

The downlink wireless channel transmitting unit 310 converts a downlink channel received from a wireless access network into a downlink wireless channel and transmits the downlink wireless channel to a mobile station 100 via the transceiver unit 302. Also, the downlink wireless channel transmitting unit 310 transmits the common pilot channel and common control channel to cells via the transceiver unit 302.

The uplink wireless channel receiving unit 304 converts an uplink wireless channel received from the mobile station 100 into an uplink channel and transmits the uplink channel to the wireless access network. Also, the uplink wireless channel receiving unit 304 demodulates the monitored set including measurement results obtained by the mobile station 100, and transmits the demodulated data to the cell adjacency calculating unit 306 as is described below. Also, the uplink wireless channel receiving unit 304 receives information indicating the state of wireless resources, and inputs the information to the wireless resource monitoring unit 312.

The wireless resource monitoring unit 312 monitors the state of the wireless resources including the uplink interference power and the downlink total transmission power, for example. Also, the wireless resource monitoring unit 312 transmits the information on the state of the wireless resources to the cell adjacency calculating unit 306. Also, the wireless resource monitoring unit 312 detects the state of the service area by performing threshold value determination on the change in the state of the wireless resources, and inputs the determination result to the cell adjacency calculating unit 306. For example, the wireless resource monitoring unit 312 may input information indicating that the state of the wireless resources has changed to the cell adjacency calculating unit 306.

The cell adjacency calculating unit 306 calculates cell adjacency by accumulating and processing the monitored set, and transmits a tilt angle change command to the tilt angle changing unit 308 based on the cell adjacency and the information transmitted from the wireless resource monitoring unit 312. For example, in a case where the uplink interference increases and/or the downlink interference increases, and the downlink base station total transmission power increases as a result, the cell adjacency calculating unit 306 may direct the tilt angle changing unit 308 to widen the tilt angle of the antenna vertical pattern so that the adjacency between cells with low adjacency may be reduced further.

The tilt angle changing unit 308 changes the tilt angle according to information from the cell adjacency calculating unit 306.

The antenna transmits/receives the downlink wireless channel and the uplink wireless channel based on the tilt angle set by the tilt angle changing unit 308.

The transceiver unit 302 shares the uplink and the downlink in a common antenna.

Figure 11:
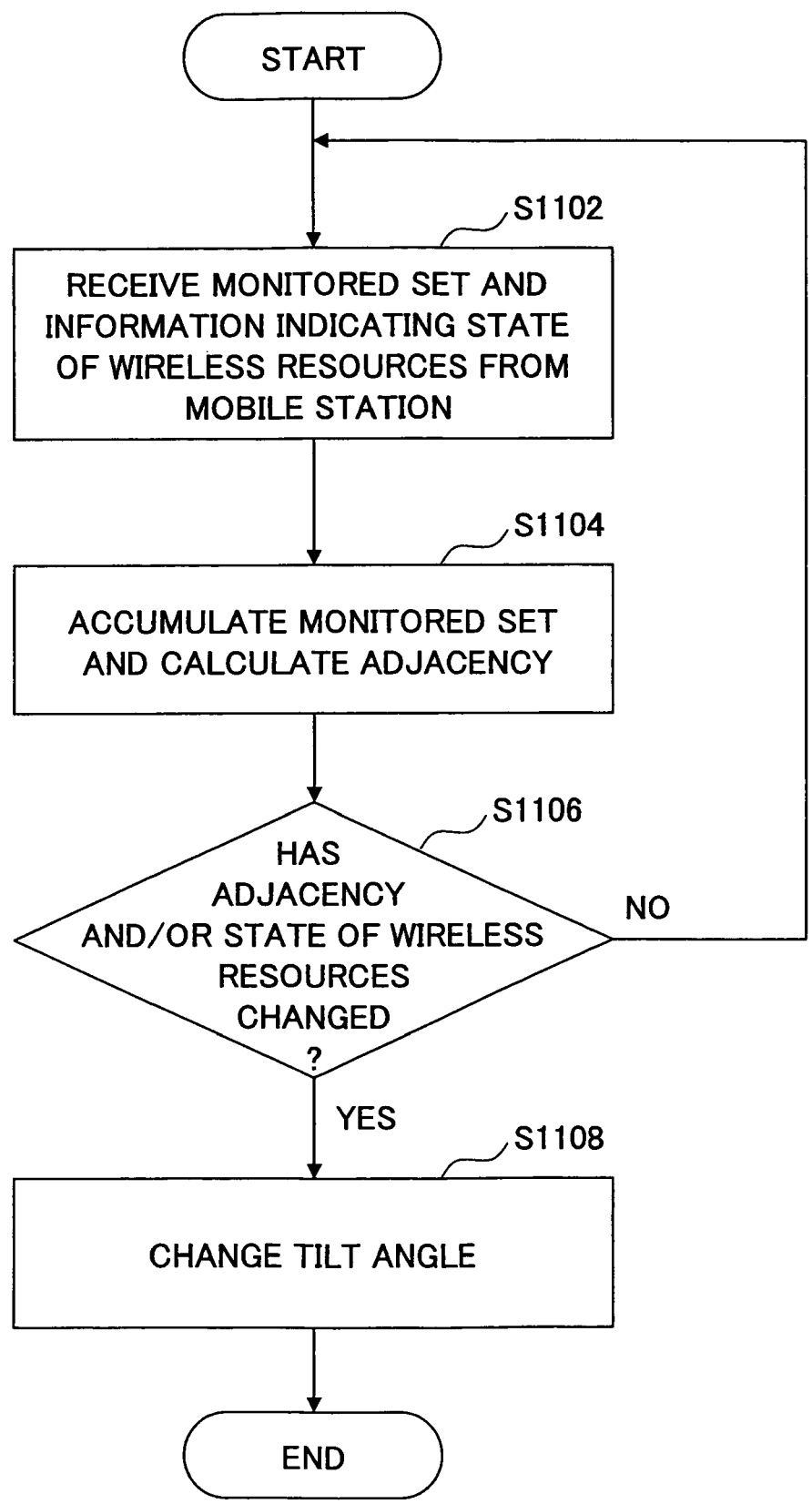
FIG. 11 is a flowchart illustrating operations of the communication apparatus of FIG. 10.

In the following, operations of the wireless control apparatus 300 according to an embodiment of the present invention are described with reference to FIG. 11.

In this example, first, a monitored set and information indicating the state of the wireless resources transmitted from the mobile station 100 are received at the uplink wireless channel receiving unit 304 via the antenna and the transceiver unit 302 (step S1102).

The uplink wireless channel receiving unit 304 inputs the monitored set to the cell adjacency calculating unit 306, and inputs the information indicating the state of the wireless resources to the wireless resource monitoring unit 312.

The cell adjacency calculating unit 306 accumulates the monitored set and calculates the cell adjacency (step S1104).

The cell adjacency calculating unit 306 determines whether the cell adjacency has changed, and the wireless resource monitoring unit 312 determines whether the state of the wireless resources has changed based on the input information indicating the state of the wireless resources (step S1106).

In a case where at least one of the cell adjacency or the state of the wireless resources has changed (step S1106: YES), the cell adjacency calculating unit 306 inputs a tilt angle change command to the tilt angle changing unit 308 to change the tilt angle. The tilt angle changing unit 308 changes the tilt angle of the antenna vertical pattern according to the input tilt angle change command (step S1108). In this way, at least one of the main lobe, the side lobe, or the null point between the main lobe and the side lobe of the antenna pattern may be controlled and directed to reduce frequency interference between the cell formed by the current base station and the cell formed by a neighboring base station using the same frequency.

On the other hand, in a case where the cell adjacency and the state of the wireless resources are not changed (step S1106: NO), the process goes back to step S1102.

Figure 12:
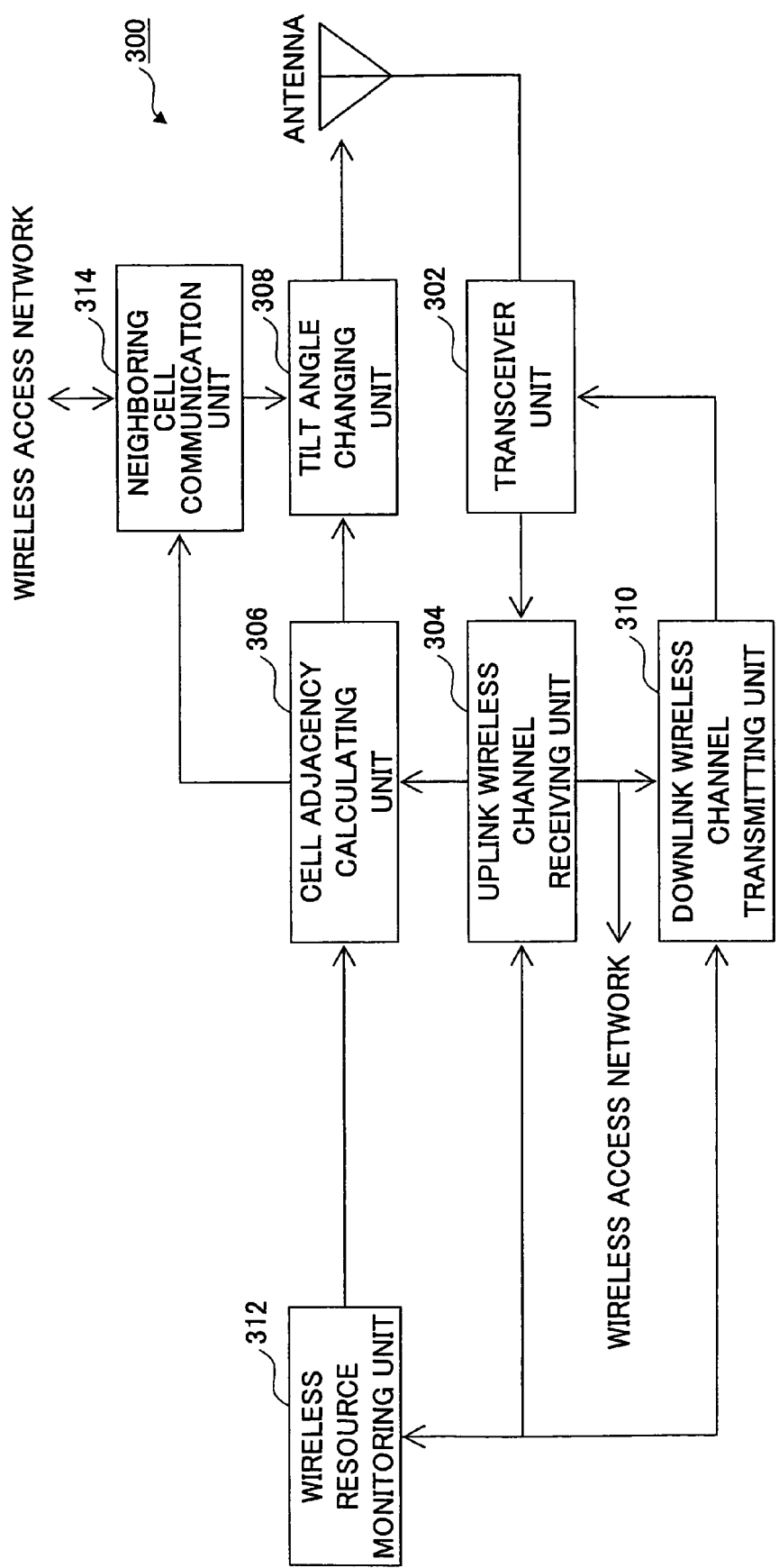
FIG. 12 is a diagram illustrating a communication apparatus according to another embodiment of the present invention.

In the following, the wireless control apparatus 300 according to another embodiment of the present invention is described with reference to FIG. 12.

Figure 10:
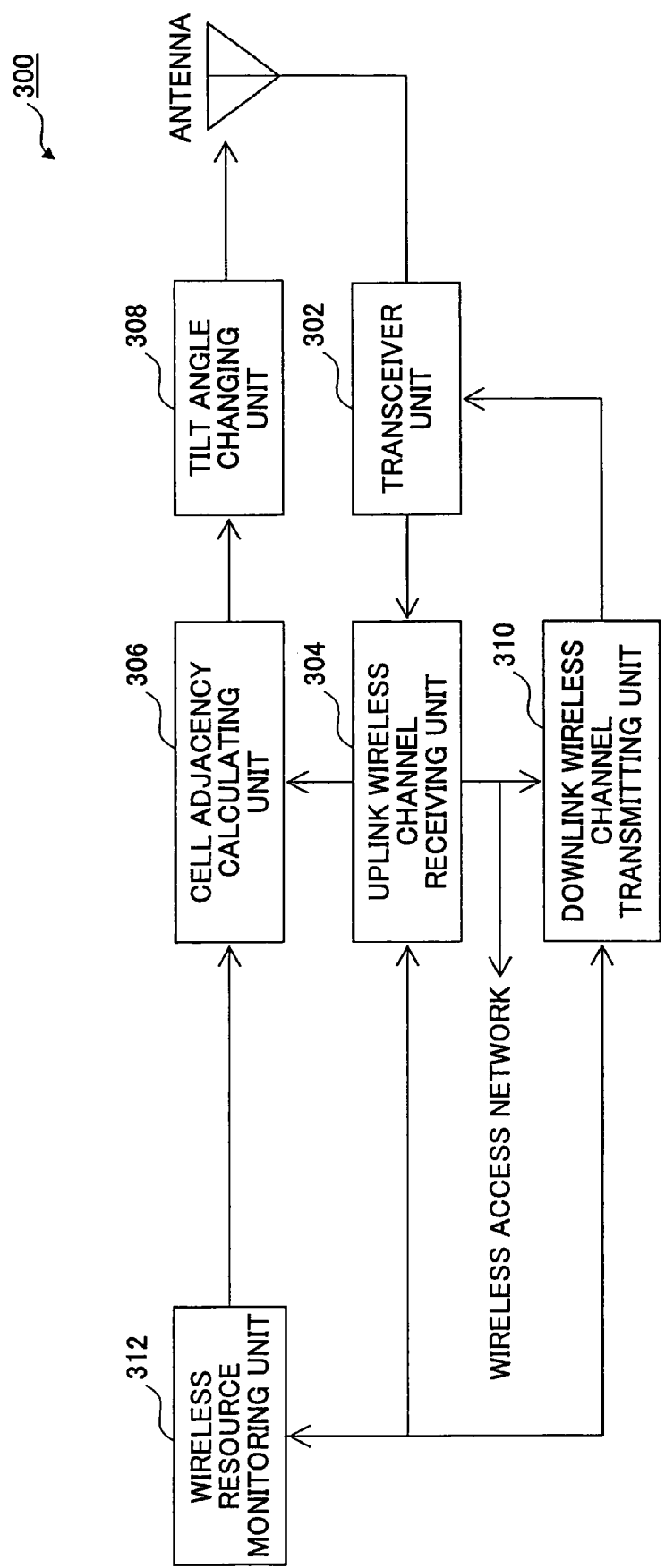
FIG. 10 is a diagram illustrating a communication apparatus according to an embodiment of the present invention.

The wireless control apparatus 300 according to the present embodiment includes the components of the wireless control apparatus of FIG. 10 and a neighboring cell communication unit 314 that is connected to the cell adjacency calculating unit 306 and the tilt angle changing unit 308.

The downlink wireless channel transmitting unit 310 converts a downlink channel received from a wireless access network into a downlink wireless channel and transmits the downlink wireless channel to a mobile station 100 via the transceiver unit 302. Also, the downlink wireless channel transmitting unit 310 transmits the common pilot channel and common control channel to cells via the transceiver unit 302.

The uplink wireless channel receiving unit 304 converts an uplink wireless channel received from the mobile station 100 into an uplink channel and transmits the uplink channel to the wireless access network. Also, the uplink wireless channel receiving unit 304 demodulates the monitored set including measurement results obtained by the mobile station 100, and transmits the demodulated data to the cell adjacency calculating unit 306 as is described below. Also, the uplink wireless channel receiving unit 304 receives information indicating the state of wireless resources, and inputs the information to the wireless resource monitoring unit 312.

The wireless resource monitoring unit 312 monitors the state of the wireless resources including the uplink interference power and the downlink total transmission power, for example. Also, the wireless resource monitoring unit 312 transmits the information on the state of the wireless resources to the cell adjacency calculating unit 306. Also, the wireless resource monitoring unit 312 detects the state of the service area by performing threshold value determination on the change in the state of the wireless resources, and inputs the determination result to the cell adjacency calculating unit 306. For example, the wireless resource monitoring unit 312 may input information indicating that the state of the wireless resources has changed to the cell adjacency calculating unit 306.

The cell adjacency calculating unit 306 calculates cell adjacency by accumulating and processing the monitored set, and transmits a tilt angle change command to the tilt angle changing unit 308 based on the cell adjacency and the information transmitted from the wireless resource monitoring unit 312. For example, in a case where the uplink interference increases and/or the downlink interference increases, and the downlink base station total transmission power increases as a result, the cell adjacency calculating unit 306 may direct the tilt angle changing unit 308 to widen the tilt angle of the antenna vertical pattern so that the adjacency between cells with low adjacency may be reduced further.

The tilt angle changing unit 308 changes the tilt angle according to information from the cell adjacency calculating unit 306.

The neighboring cell communication unit 314 transmits a tilt angle change command transmitted from the cell adjacency calculating unit 306 that is directed to a base station forming a neighboring cell to a neighboring cell communication unit 314 of the base station forming the corresponding neighboring cell via the wireless access network. Also, the neighboring cell communication unit 314 receives a tilt angle change command directed to its base station from a cell adjacency calculating unit 306 of a neighboring cell via the wireless access network and transmits the received command to the tilt angle changing unit 308.

The antenna transmits/receives the downlink wireless channel and the uplink wireless channel based on the tilt angle set by the tilt angle changing unit 308.

The transceiver unit 302 shares the uplink and the downlink in a common antenna.

Figure 13A:
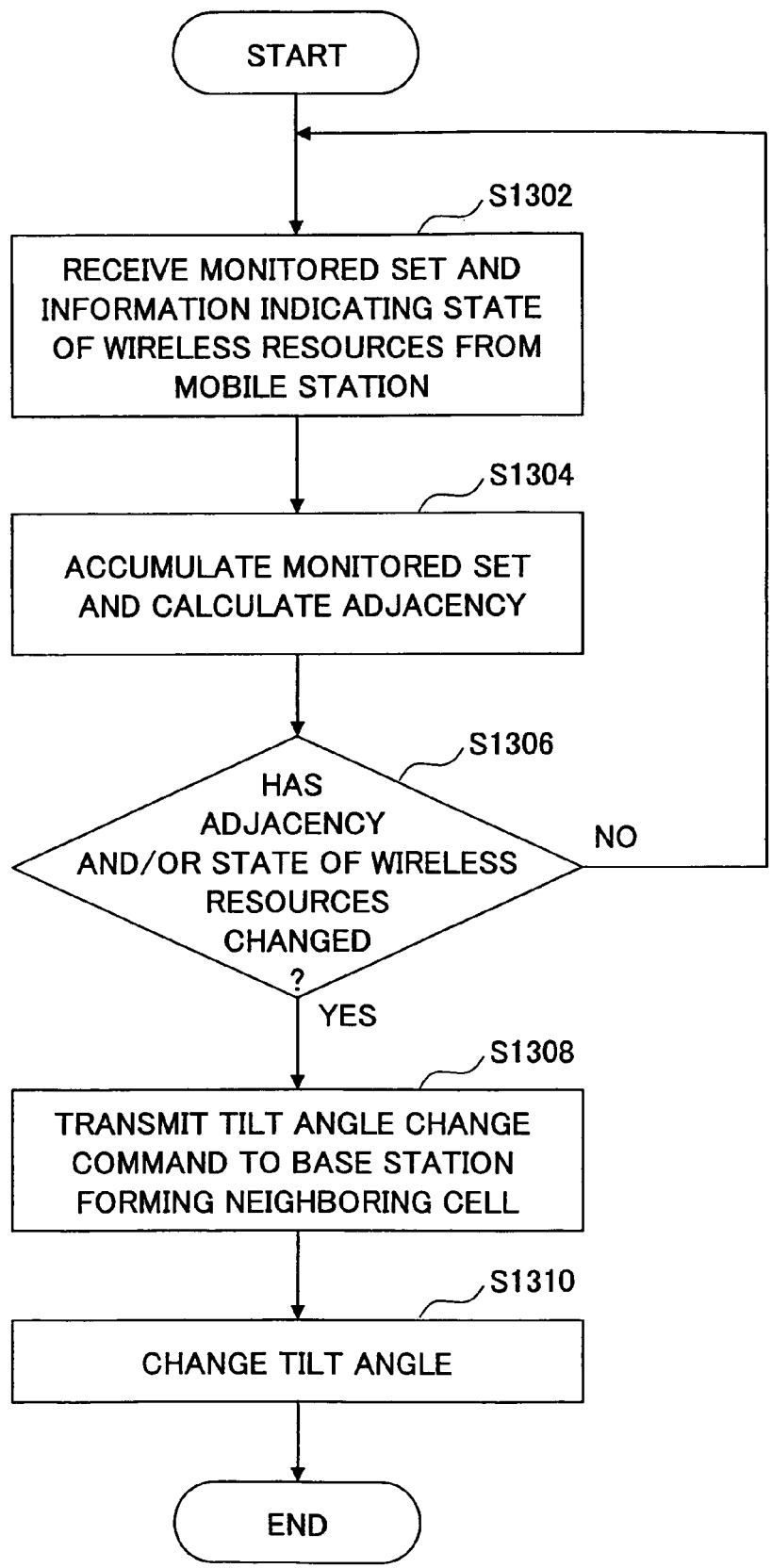
FIGS. 13A and 13B are flowcharts illustrating operations of the communication apparatus of FIG. 12.

In the following, operations of the wireless control apparatus 300 according to an embodiment of the present invention are described with reference to FIG. 13A.

In this example, first, a monitored set and information indicating the state of the wireless resources transmitted from the mobile station 100 are received at the uplink wireless channel receiving unit 304 via the antenna and the transceiver unit 302 (step S1302).

The uplink wireless channel receiving unit 304 inputs the monitored set to the cell adjacency calculating unit 306, and inputs the information indicating the state of the wireless resources to the wireless resource monitoring unit 312.

The cell adjacency calculating unit 306 accumulates the monitored set and calculates the cell adjacency (step S1304).

The cell adjacency calculating unit 306 determines whether the cell adjacency has changed, and the wireless resource monitoring unit 312 determines whether the state of the wireless resources has changed based on the input information indicating the state of the wireless resources (step S1306).

In a case where at least one of the cell adjacency or the state of the wireless resources has changed (step S1306: YES), the cell adjacency calculating unit 306 inputs tilt angle change commands for changing the tilt angle to the tilt angle changing unit 308 and the neighboring cell communication unit 314.

The neighboring cell communication unit 314 transmits the tilt angle change command from the cell adjacency calculating unit 306 to the base station forming the neighboring cell (step S1308).

The tilt angle changing unit 308 changes the tilt angle of the antenna vertical pattern according to the input tilt angle change command (step S1310). In this way, at least one of the main lobe, the side lobe, or the null point between the main lobe and the side lobe of the antenna pattern may be controlled and directed to reduce frequency interference between the cell formed by the current base station and the cell formed by a neighboring base station using the same frequency.

On the other hand, in a case where the cell adjacency and the state of the wireless resources are not changed (step S1306: NO), the process goes back to step S1302.

Figure 13B:
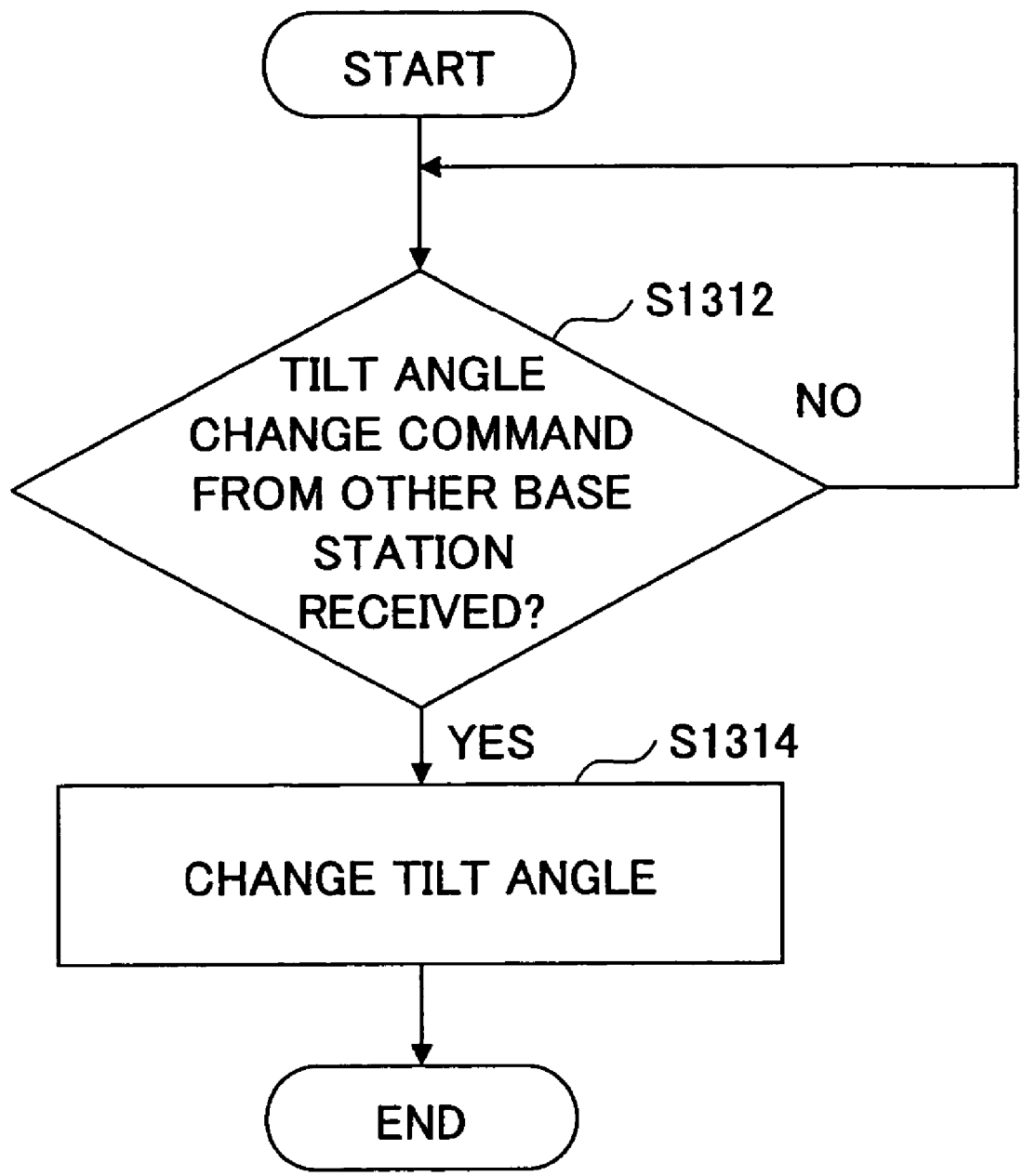

In the following, operations of a wireless control apparatus 300 included in the base station forming a neighboring cell are described with reference to FIG. 13B.

In this example, the neighboring cell communication unit 314 of the base station forming the neighboring cell determines whether tilt angle change command from a wireless control apparatus included in another base station has been received (step S1312).

If such a tilt angle command is received (step S1312:YES), the neighboring cell communication unit 314 inputs the tilt angle change command to the tilt angle changing unit 308.

The tilt angle changing unit 308 changes the tilt angle of the antenna vertical pattern based on the input tilt angle change command (step S1314). In this way, at least one of the main lobe, the side lobe, or the null point between the main lobe and the side lobe of the antenna pattern may be controlled and directed to reduce frequency interference between the cell formed by the current base station and the cell formed by the neighboring base station using the same frequency.

On the other hand, if a tilt angle change command is not received (step S1312: NO), the process goes back to step S1312.

In the following, a wireless control apparatus 300 according to another embodiment of the present invention is described with reference to FIG. 14.

The wireless control apparatus 300 of the present embodiment includes a transceiver unit 302 including an antenna; an uplink wireless channel receiving unit 304 as area formation information gathering means and a downlink wireless channel transmitting unit 310 that are connected to the transceiver unit 302; a cell adjacency calculating unit 306 that is connected to the uplink wireless channel receiving unit 304; an azimuth changing unit 316 as antenna pattern control means that is connected to the cell adjacency calculating unit 306; and a wireless resource monitoring unit 312 that is connected to the cell adjacency calculating unit 306, the uplink wireless channel receiving unit 304, and the downlink wireless channel transmitting unit 310. It is noted that the uplink wireless channel receiving unit 304 is connected to the downlink wireless channel transmitting unit 310.

The downlink wireless channel transmitting unit 310 converts a downlink channel received from a wireless access network into a downlink wireless channel and transmits the downlink wireless channel to a mobile station 100 via the transceiver unit 302. Also, the downlink wireless channel transmitting unit 310 transmits the common pilot channel and common control channel to cells via the transceiver unit 302.

The uplink wireless channel receiving unit 304 converts an uplink wireless channel received from the mobile station 100 into an uplink channel and transmits the uplink channel to the wireless access network. Also, the uplink wireless channel receiving unit 304 demodulates the monitored set including measurement results obtained by the mobile station 100, and transmits the demodulated data to the cell adjacency calculating unit 306 as is described below. Also, the uplink wireless channel receiving unit 304 receives information indicating the state of wireless resources, and inputs the information to the wireless resource monitoring unit 312.

The wireless resource monitoring unit 312 monitors the state of the wireless resources including the uplink interference power and the downlink total transmission power, for example. Also, the wireless resource monitoring unit 312 transmits the information on the state of the wireless resources to the cell adjacency calculating unit 306. Also, the wireless resource monitoring unit 312 detects the state of the service area by performing threshold value determination on the change in the state of the wireless resources, and inputs the determination result to the cell adjacency calculating unit 306. For example, the wireless resource monitoring unit 312 may input information indicating that the state of the wireless resources has changed to the cell adjacency calculating unit 306.

The cell adjacency calculating unit 306 calculates cell adjacency by accumulating and processing the monitored set, and transmits an azimuth change command to the azimuth changing unit 316 based on the cell adjacency and the information transmitted from the wireless resource monitoring unit 312.

The azimuth changing unit 316 changes the azimuth according to the command from the cell adjacency calculating unit 306.

The antenna transmits/receives the downlink wireless channel and the uplink wireless channel based on the azimuth set by the azimuth changing unit 316.

The transceiver unit 302 shares the uplink and the downlink in a common antenna.

Figure 15:
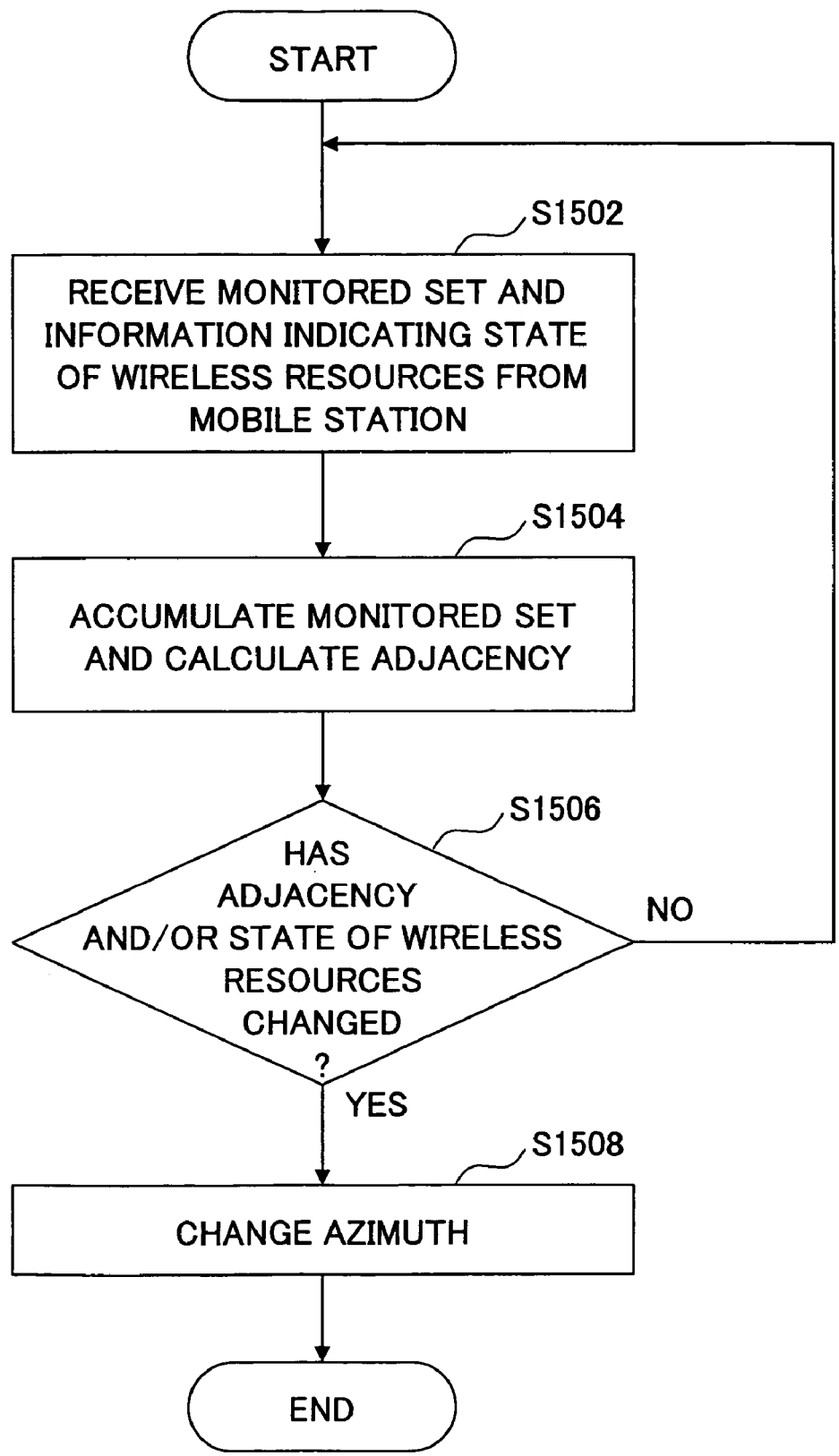
FIG. 15 is a flowchart illustrating operations of the communication apparatus of FIG. 14.

In the following, operations of the wireless control apparatus 300 of the present embodiment are described with reference to FIG. 15.

In this example, first, a monitored set and information indicating the state of the wireless resources transmitted from the mobile station 100 are received at the uplink wireless channel receiving unit 304 via the antenna and the transceiver unit 302 (step S1502).

The uplink wireless channel receiving unit 304 inputs the monitored set to the cell adjacency calculating unit 306, and inputs the information indicating the state of the wireless resources to the wireless resource monitoring unit 312.

The cell adjacency calculating unit 306 accumulates the monitored set and calculates the cell adjacency (step S1504).

The cell adjacency calculating unit 306 determines whether the cell adjacency has changed, and the wireless resource monitoring unit 312 determines whether the state of the wireless resources has changed based on the input information indicating the state of the wireless resources (step S1506).

In a case where at least one of the cell adjacency or the state of the wireless resources has changed (step S1506: YES), the cell adjacency calculating unit 306 inputs an azimuth change command for changing the azimuth to the azimuth changing unit 316. The azimuth changing unit 316 changes the azimuth of the antenna horizontal pattern according to the input azimuth change command (step S1508). In this way, at least one of the main lobe, the side lobe, or the null point between the main lobe and the side lobe of the antenna pattern may be controlled and directed to reduce frequency interference between the cell formed by the current base station and the cell formed by a neighboring base station using the same frequency.

On the other hand, in a case where the cell adjacency and the state of the wireless resources are not changed (step S1506: NO), the process goes back to step S1502.

Figure 16:
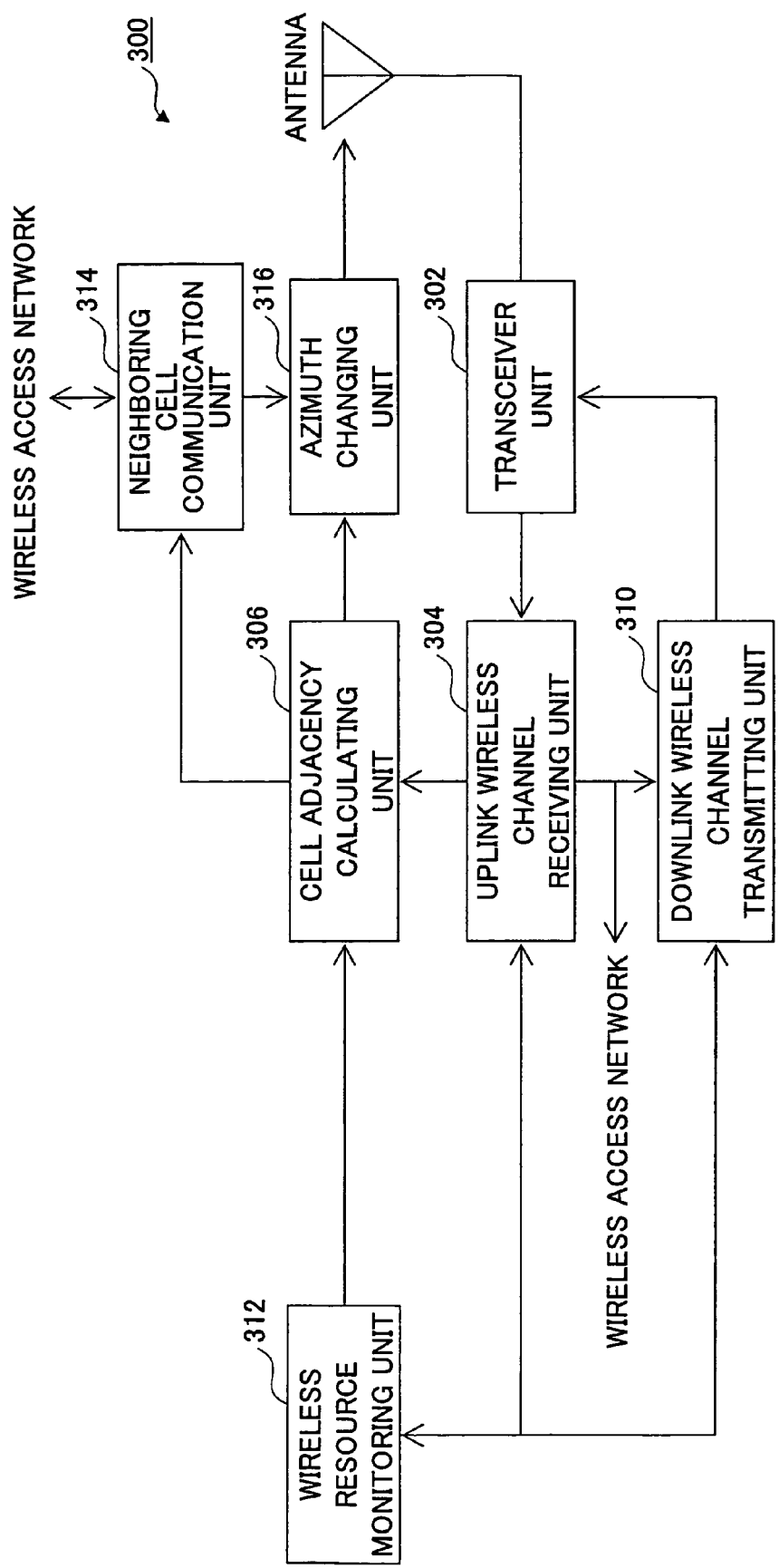
FIG. 16 is a diagram illustrating a communication apparatus according to another embodiment of the present invention.

In the following, the wireless control apparatus 300 according to another embodiment of the present invention is described with reference to FIG. 16.

Figure 14:
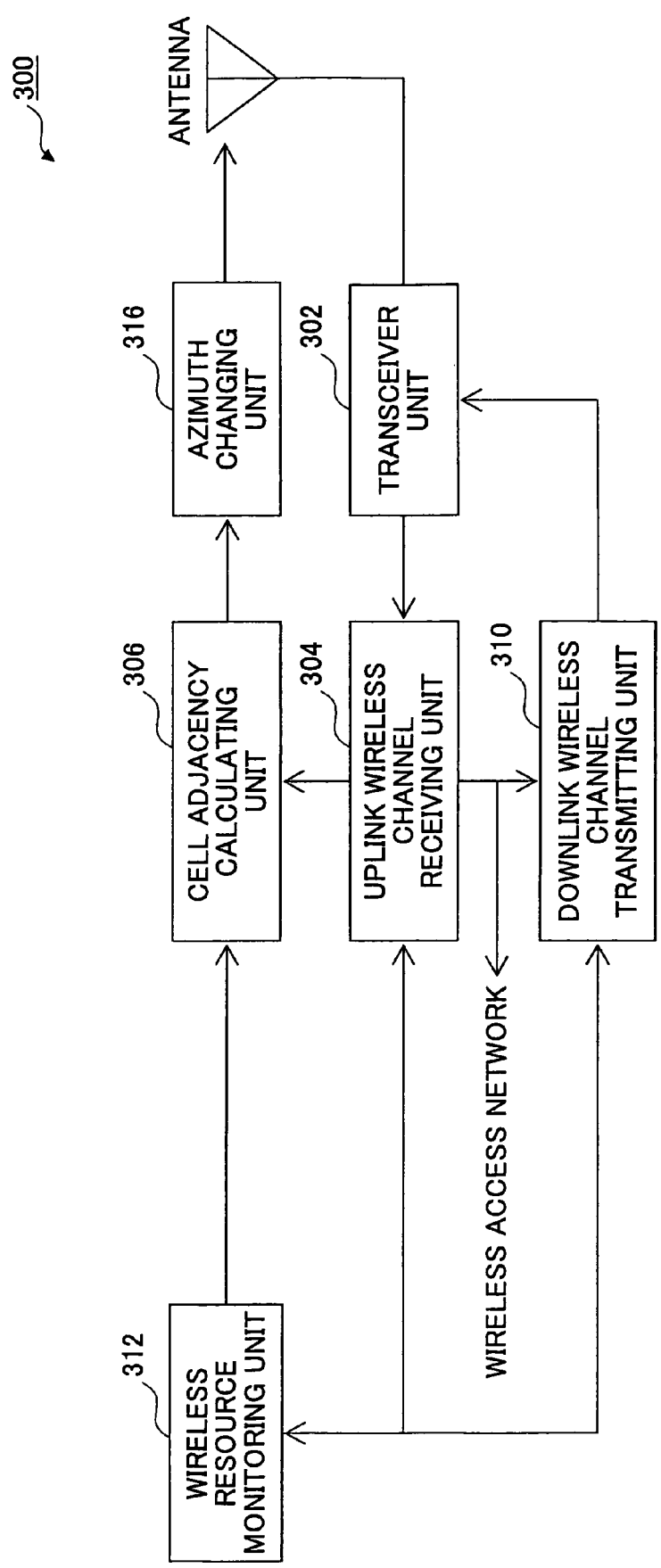
FIG. 14 is a diagram illustrating a communication apparatus according to another embodiment of the present invention.

The wireless control apparatus 300 according to the present embodiment includes the components of the wireless control apparatus of FIG. 14 and a neighboring cell communication unit 314 that is connected to the cell adjacency calculating unit 306 and the azimuth changing unit 316.

The downlink wireless channel transmitting unit 310 converts a downlink channel received from a wireless access network into a downlink wireless channel and transmits the downlink wireless channel to a mobile station 100 via the transceiver unit 302. Also, the downlink wireless channel transmitting unit 310 transmits the common pilot channel and common control channel to cells via the transceiver unit 302.

The uplink wireless channel receiving unit 304 converts an uplink wireless channel received from the mobile station 100 into an uplink channel and transmits the uplink channel to the wireless access network. Also, the uplink wireless channel receiving unit 304 demodulates the monitored set including measurement results obtained by the mobile station 100, and transmits the demodulated data to the cell adjacency calculating unit 306 described below. Also, the uplink wireless channel receiving unit 304 receives information indicating the state of wireless resources, and inputs the information to the wireless resource monitoring unit 312.

The wireless resource monitoring unit 312 monitors the state of the wireless resources including the uplink interference power and the downlink total transmission power, for example. Also, the wireless resource monitoring unit 312 transmits the information on the state of the wireless resources to the cell adjacency calculating unit 306. Also, the wireless resource monitoring unit 312 detects the state of the service area by performing threshold value determination on the change in the state of the wireless resources, and inputs the determination result to the cell adjacency calculating unit 306. For example, the wireless resource monitoring unit 312 may input information indicating that the state of the wireless resources has changed to the cell adjacency calculating unit 306.

The cell adjacency calculating unit 306 calculates cell adjacency by accumulating and processing the monitored set, and transmits an azimuth change command to the azimuth changing unit 316 based on the cell adjacency and the information transmitted from the wireless resource monitoring unit 312.

The azimuth changing unit 316 changes the azimuth according to the command from the cell adjacency calculating unit 306.

The neighboring cell communication unit 314 transmits an azimuth change command transmitted from the cell adjacency calculating unit 306 that is directed to a base station forming a neighboring cell to a neighboring cell communication unit 314 of the base station forming the corresponding neighboring cell via the wireless access network. Also, the neighboring cell communication unit 314 receives an azimuth change command directed to its base station from a cell adjacency calculating unit 306 of a neighboring cell via the wireless access network, and transmits the received command to the azimuth changing unit 316.

The antenna transmits/receives the downlink wireless channel and the uplink wireless channel based on the azimuth set by the azimuth changing unit 308.

The transceiver unit 302 shares the uplink and the downlink in a common antenna.

Figure 17A:
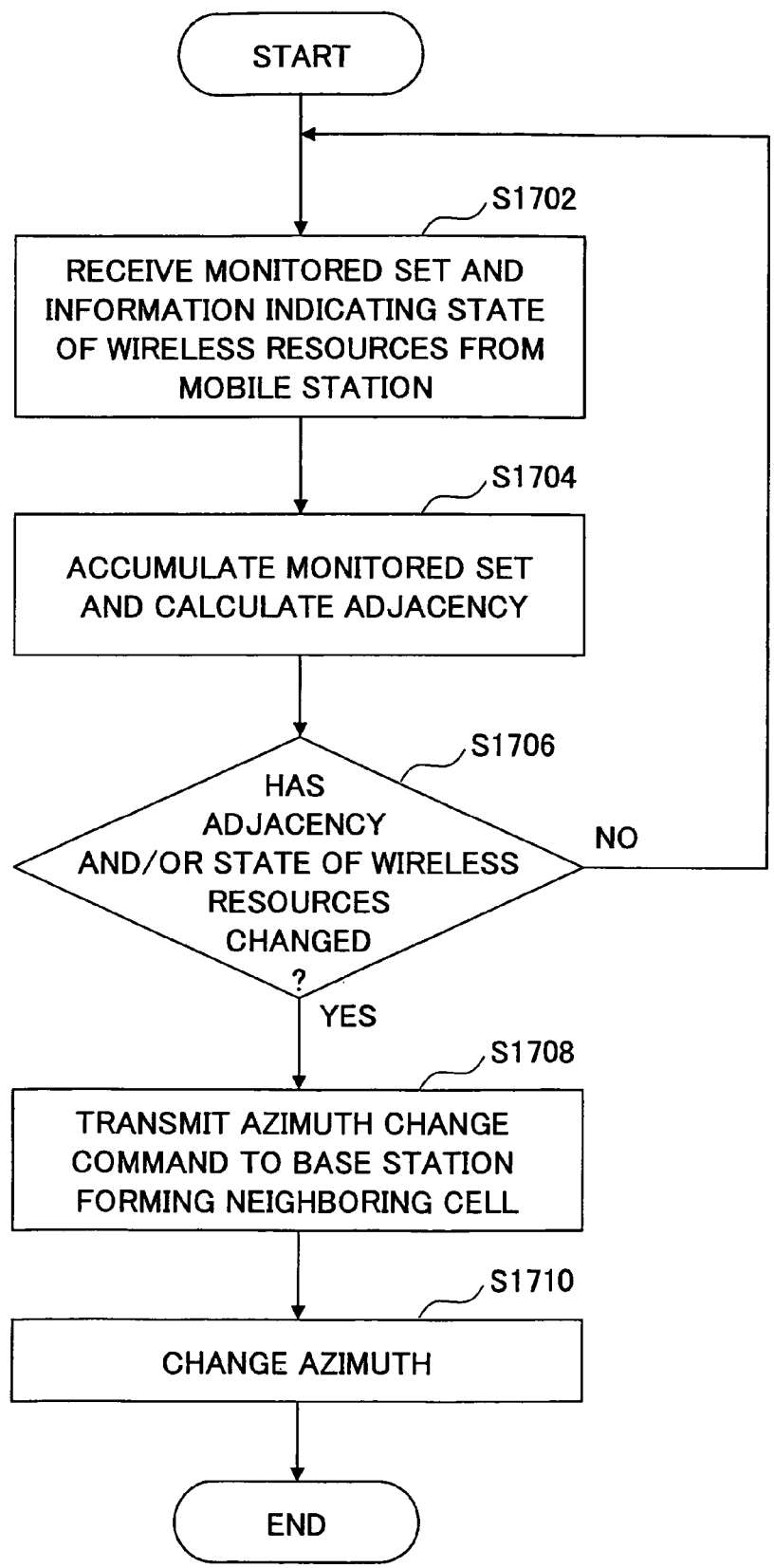
FIGS. 17A and 17B are flowcharts illustrating operations of the communication apparatus of FIG. 16.

In the following, operations of the wireless control apparatus 300 of the present embodiment are described with reference to FIG. 17A.

In this example, first, a monitored set and information indicating the state of the wireless resources transmitted from the mobile station 100 are received at the uplink wireless channel receiving unit 304 via the antenna and the transceiver unit 302 (step S1702).

The uplink wireless channel receiving unit 304 inputs the monitored set to the cell adjacency calculating unit 306, and inputs the information indicating the state of the wireless resources to the wireless resource monitoring unit 312.

The cell adjacency calculating unit 306 accumulates the monitored set and calculates the cell adjacency (step S1704).

The cell adjacency calculating unit 306 determines whether the cell adjacency has changed, and the wireless resource monitoring unit 312 determines whether the state of the wireless resources has changed based on the input information indicating the state of the wireless resources (step S1706).

In a case where at least one of the cell adjacency or the state of the wireless resources has changed (step S1706: YES), the cell adjacency calculating unit 306 inputs azimuth change commands for changing the azimuth to the azimuth changing unit 316 and the neighboring cell communication unit 314.

The neighboring cell communication unit 314 transmits the azimuth change command from the cell adjacency calculating unit 306 to the base station forming the neighboring cell (step S1708).

The azimuth changing unit 316 changes the azimuth of the antenna horizontal pattern according to the input azimuth change command (step S1710). In this way, at least one of the main lobe, the side lobe, or the null point between the main lobe and the side lobe of the antenna pattern may be controlled and directed to reduce frequency interference between the cell formed by the current base station and the cell formed by a neighboring base station using the same frequency.

On the other hand, in a case where the cell adjacency and the state of the wireless resources are not changed (step S1706: NO), the process goes back to step S1702.

Figure 17B:
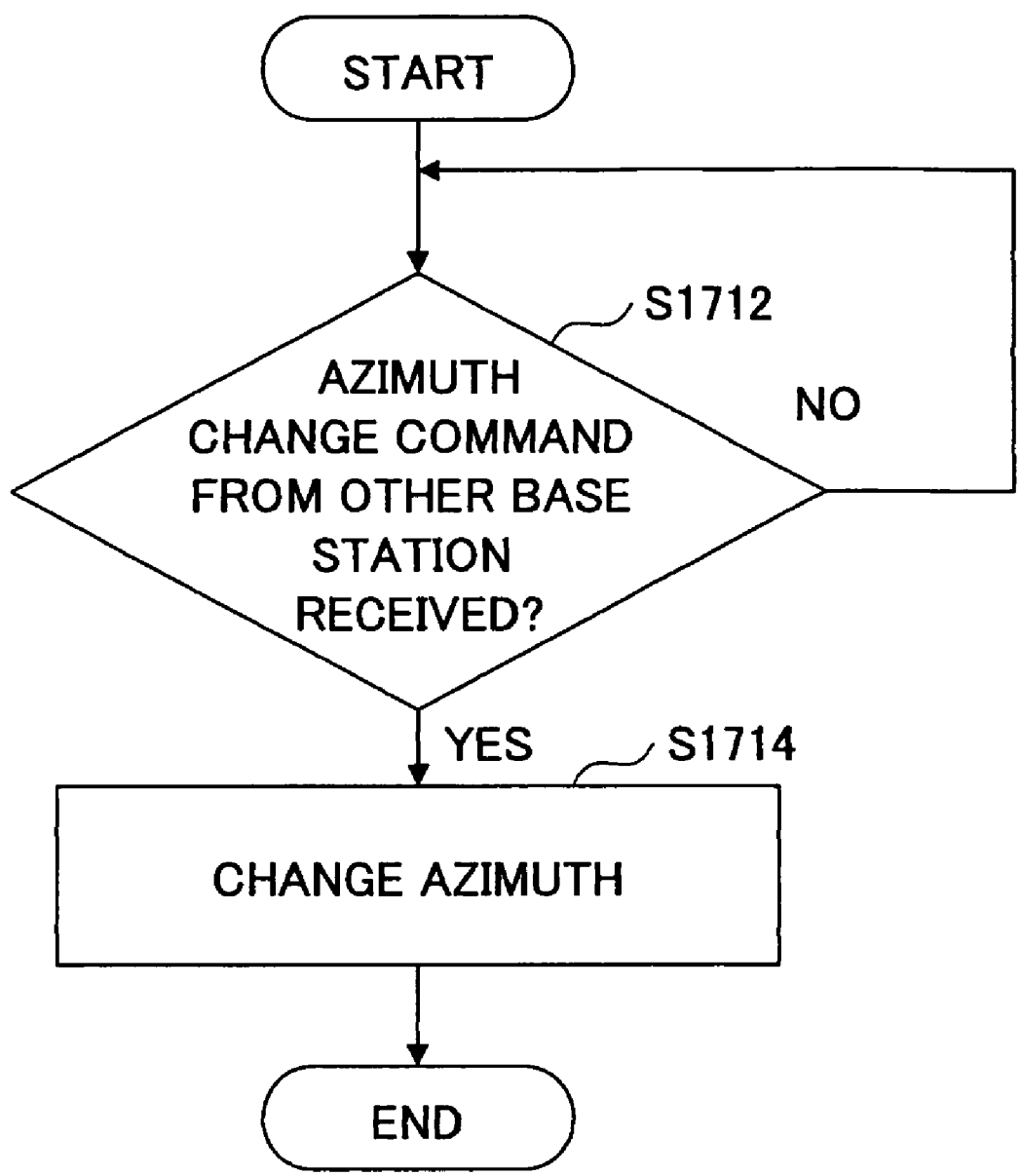

In the following, operations of a wireless control apparatus 300 included in the base station forming a neighboring cell are described with reference to FIG. 17B.

In this example, the neighboring cell communication unit 314 of the base station forming the neighboring cell determines whether an azimuth change command from a wireless control apparatus included in another base station has been received (step S1712).

If such an azimuth change command is received (step S1712: YES), the neighboring cell communication unit 314 inputs the azimuth change command to the azimuth changing unit 316.

The azimuth changing unit 316 changes the azimuth of the antenna horizontal pattern based on the input azimuth change command (step S1714). In this way, at least one of the main lobe, the side lobe, or the null point between the main lobe and the side lobe of the antenna pattern may be controlled and directed to reduce frequency interference between the cell formed by the current base station and the cell formed by the neighboring base station using the same frequency.

On the other hand, if an azimuth change command is not received (step S1712: NO), the process goes back to step S1712.

In the following, a wireless control apparatus 300 according to another embodiment of the present invention is described with reference to FIG. 18.

The wireless control apparatus 300 of the present embodiment includes a transceiver unit 302 including an antenna; an uplink wireless channel receiving unit 304 as area formation information gathering means and a downlink wireless channel transmitting unit 310 that are connected to the transceiver unit 302; a cell adjacency calculating unit 306 that is connected to the uplink wireless channel receiving unit 304; a tilt angle changing unit 308 and an azimuth changing unit 316 as antenna pattern control means that are connected to the cell adjacency calculating unit 306; and a wireless resource monitoring unit 312 that is connected to the cell adjacency calculating unit 306, the uplink wireless channel receiving unit 304, and the downlink wireless channel transmitting unit 310. It is noted that the uplink wireless channel receiving unit 304 is connected to the downlink wireless channel transmitting unit 310.

The downlink wireless channel transmitting unit 310 converts a downlink channel received from a wireless access network into a downlink wireless channel and transmits the downlink wireless channel to a mobile station 100 via the transceiver unit 302. Also, the downlink wireless channel transmitting unit 310 transmits the common pilot channel and common control channel to cells via the transceiver unit 302.

The uplink wireless channel receiving unit 304 converts an uplink wireless channel received from the mobile station 100 into an uplink channel and transmits the uplink channel to the wireless access network. Also, the uplink wireless channel receiving unit 304 demodulates the monitored set including measurement results obtained by the mobile station 100, and transmits the demodulated data to the cell adjacency calculating unit 306 as is described below. Also, the uplink wireless channel receiving unit 304 receives information indicating the state of wireless resources, and inputs the information to the wireless resource monitoring unit 312.

The wireless resource monitoring unit 312 monitors the state of the wireless resources including the uplink interference power and the downlink total transmission power, for example. Also, the wireless resource monitoring unit 312 transmits the information on the state of the wireless resources to the cell adjacency calculating unit 306. Also, the wireless resource monitoring unit 312 detects the state of the service area by performing threshold value determination on the change in the state of the wireless resources, and inputs the determination result to the cell adjacency calculating unit 306. For example, the wireless resource monitoring unit 312 may input information indicating that the state of the wireless resources has changed to the cell adjacency calculating unit 306.

The cell adjacency calculating unit 306 calculates cell adjacency by accumulating and processing the monitored set, and transmits a tilt angle change command and an azimuth change command to the tilt angle changing unit 308 and the azimuth changing unit 316, respectively, based on the cell adjacency and the information transmitted from the wireless resource monitoring unit 312.

The tilt angle changing unit 308 changes the tilt angle according to the tilt angle change command from the cell adjacency calculating unit 306.

The azimuth changing unit 316 changes the azimuth according to the azimuth change command from the cell adjacency calculating unit 306.

The antenna transmits/receives the downlink wireless channel and the uplink wireless channel based on the tilt angel set by the tilt angle changing unit 308 and the azimuth set by the azimuth changing unit 316.

The transceiver unit 302 shares the uplink and the downlink in a common antenna.

Figure 19:
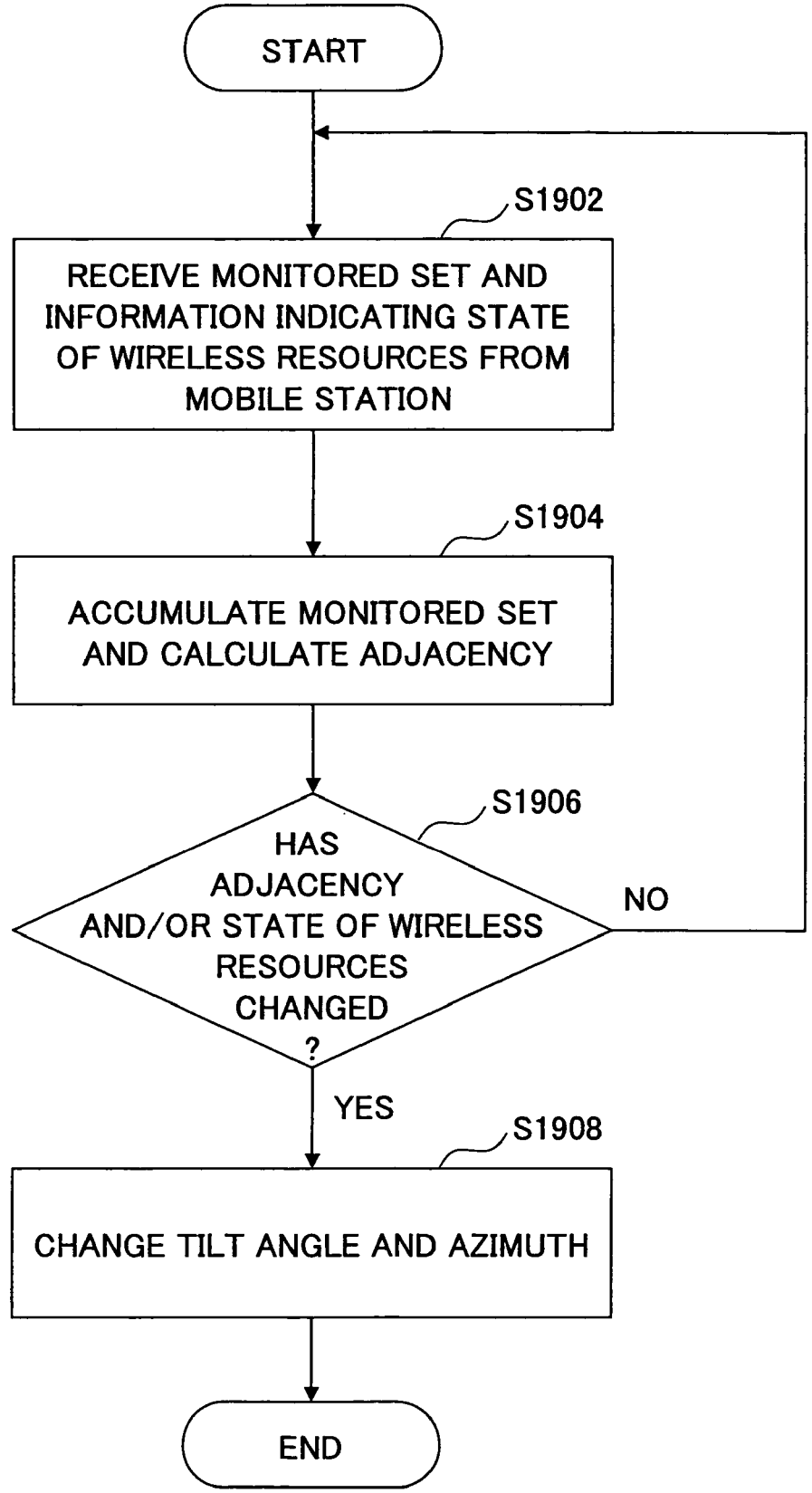
FIG. 19 is a flowchart illustrating operations of the communication apparatus of FIG. 18.

In the following, operations of the wireless control apparatus 300 of the present embodiment are described with reference to FIG. 19.

In this example, first, a monitored set and information indicating the state of the wireless resources transmitted from the mobile station 100 are received at the uplink wireless channel receiving unit 304 via the antenna and the transceiver unit 302 (step S1902).

The uplink wireless channel receiving unit 304 inputs the monitored set to the cell adjacency calculating unit 306, and inputs the information indicating the state of the wireless resources to the wireless resource monitoring unit 312.

The cell adjacency calculating unit 306 accumulates the monitored set and calculates the cell adjacency (step S1904).

The cell adjacency calculating unit 306 determines whether the cell adjacency has changed, and the wireless resource monitoring unit 312 determines whether the state of the wireless resources has changed based on the input information indicating the state of the wireless resources (step S1906).

In a case where at least one of the cell adjacency or the state of the wireless resources has changed (step S1506: YES), the cell adjacency calculating unit 306 inputs a tilt angle change command for changing the tilt angle to the tilt angle changing unit 308 and an azimuth change command for changing the azimuth to the azimuth changing unit 316.

The tilt angle changing unit 308 changes the tilt angle according to the input tilt angle change command, and the azimuth changing unit 316 changes the azimuth according to the input azimuth change command (step S1908).

In this way, at least one of the main lobe, the side lobe, or the null point between the main lobe and the side lobe of the antenna pattern may be controlled and directed to reduce frequency interference between the cell formed by the current base station and the cell formed by a neighboring base station using the same frequency.

On the other hand, in a case where the cell adjacency and the state of the wireless resources are not changed (step S1906: NO), the process goes back to step S1902.

Figure 20:
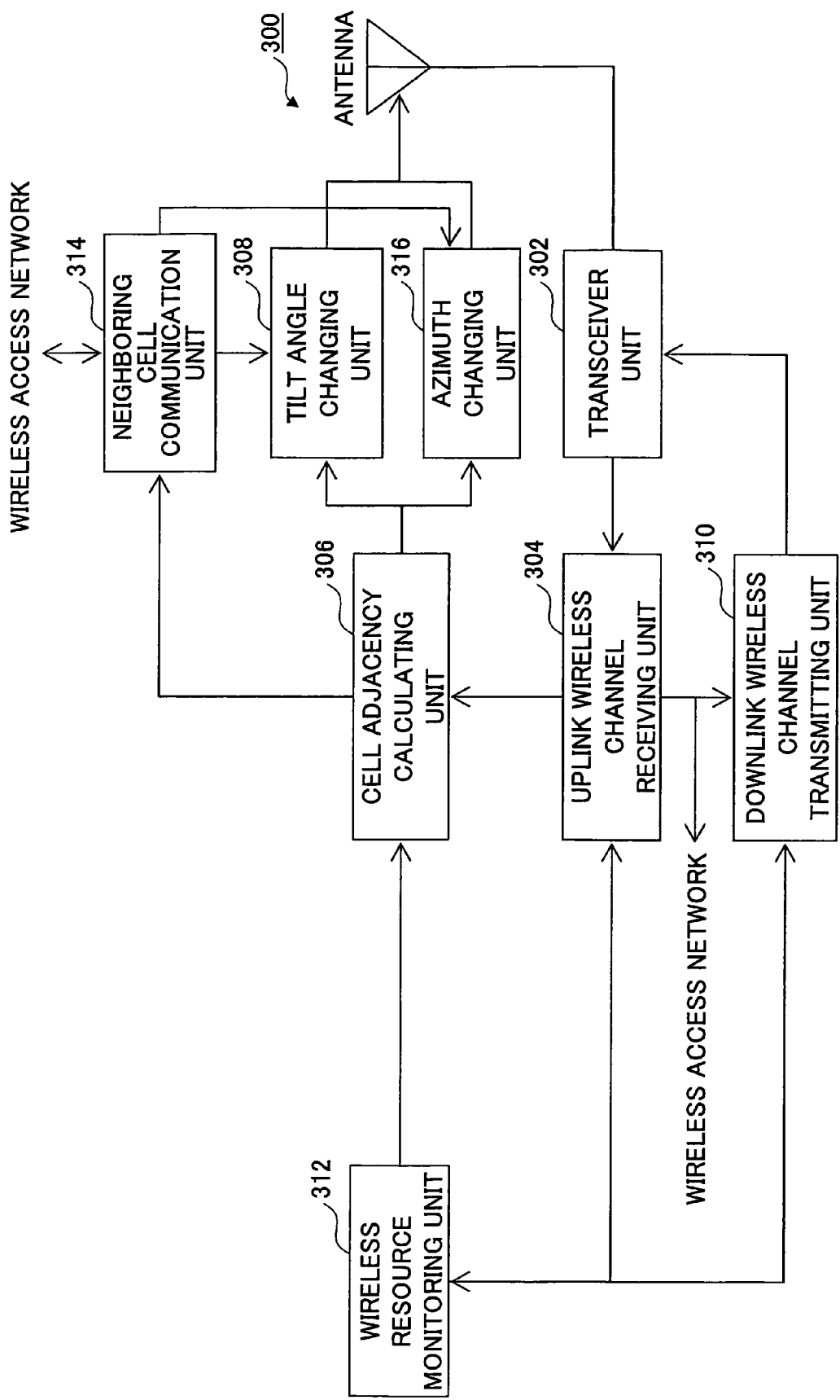
FIG. 20 is a diagram illustrating a communication apparatus according to another embodiment of the present invention.

In the following, a wireless control apparatus 300 according to another embodiment of the present invention is described with reference to FIG. 20.

Figure 18:
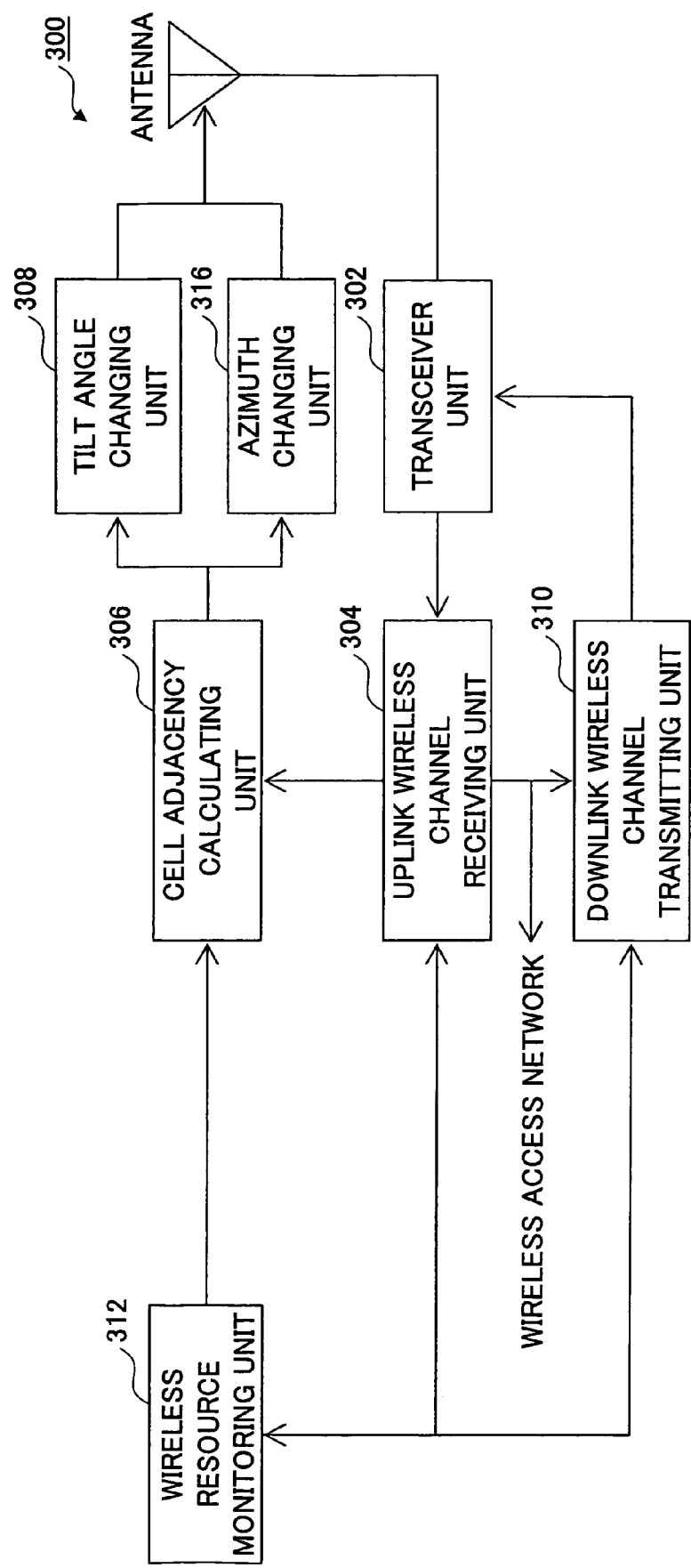
FIG. 18 is a diagram illustrating a communication apparatus according to another embodiment of the present invention.

The wireless control apparatus 300 according to the present embodiment includes the components of the wireless control apparatus of FIG. 18 and a neighboring cell communication unit 314 that is connected to the cell adjacency calculating unit 306, the tilt angle changing unit 308, and the azimuth changing unit 316.

The downlink wireless channel transmitting unit 310 converts a downlink channel received from a wireless access network into a downlink wireless channel and transmits the downlink wireless channel to a mobile station 100 via the transceiver unit 302. Also, the downlink wireless channel transmitting unit 310 transmits the common pilot channel and common control channel to cells via the transceiver unit 302.

The uplink wireless channel receiving unit 304 converts an uplink wireless channel received from the mobile station 100 into an uplink channel and transmits the uplink channel to the wireless access network. Also, the uplink wireless channel receiving unit 304 demodulates the monitored set including measurement results obtained by the mobile station 100, and transmits the demodulated data to the cell adjacency calculating unit 306 described below. Also, the uplink wireless channel receiving unit 304 receives information indicating the state of wireless resources, and inputs the information to the wireless resource monitoring unit 312.

The wireless resource monitoring unit 312 monitors the state of the wireless resources including the uplink interference power and the downlink total transmission power, for example. Also, the wireless resource monitoring unit 312 transmits the information on the state of the wireless resources to the cell adjacency calculating unit 306. Also, the wireless resource monitoring unit 312 detects the state of the service area by performing threshold value determination on the change in the state of the wireless resources, and inputs the determination result to the cell adjacency calculating unit 306. For example, the wireless resource monitoring unit 312 may input information indicating that the state of the wireless resources has changed to the cell adjacency calculating unit 306.

The cell adjacency calculating unit 306 calculates cell adjacency by accumulating and processing the monitored set, and transmits a tilt angle change command to the tilt angle changing unit 308 and an azimuth change command to the azimuth changing unit 316 based on the cell adjacency and the information transmitted from the wireless resource monitoring unit 312.

The tilt angle changing unit 308 changes the tilt angle according to the tilt angle change command from the cell adjacency calculating unit 306.

The azimuth changing unit 316 changes the azimuth according to the azimuth change command from the cell adjacency calculating unit 306.

The neighboring cell communication unit 314 transmits a tilt angle change command and an azimuth change command transmitted from the cell adjacency calculating unit 306 that are directed to a base station forming a neighboring cell to a neighboring cell communication unit 314 of the base station forming the corresponding neighboring cell via the wireless access network. Also, the neighboring cell communication unit 314 receives a tilt angle change command and an azimuth change command directed to its base station from a cell adjacency calculating unit 306 of a neighboring cell via the wireless access network, and transmits the received commands to the tilt angle changing unit 308 and the azimuth changing unit 316.

The antenna transmits/receives the downlink wireless channel and the uplink wireless channel based on the tilt angle set by the tilt angle changing unit 308 and the azimuth set by the azimuth changing unit 308.

The transceiver unit 302 shares the uplink and the downlink in a common antenna.

Figure 21A:
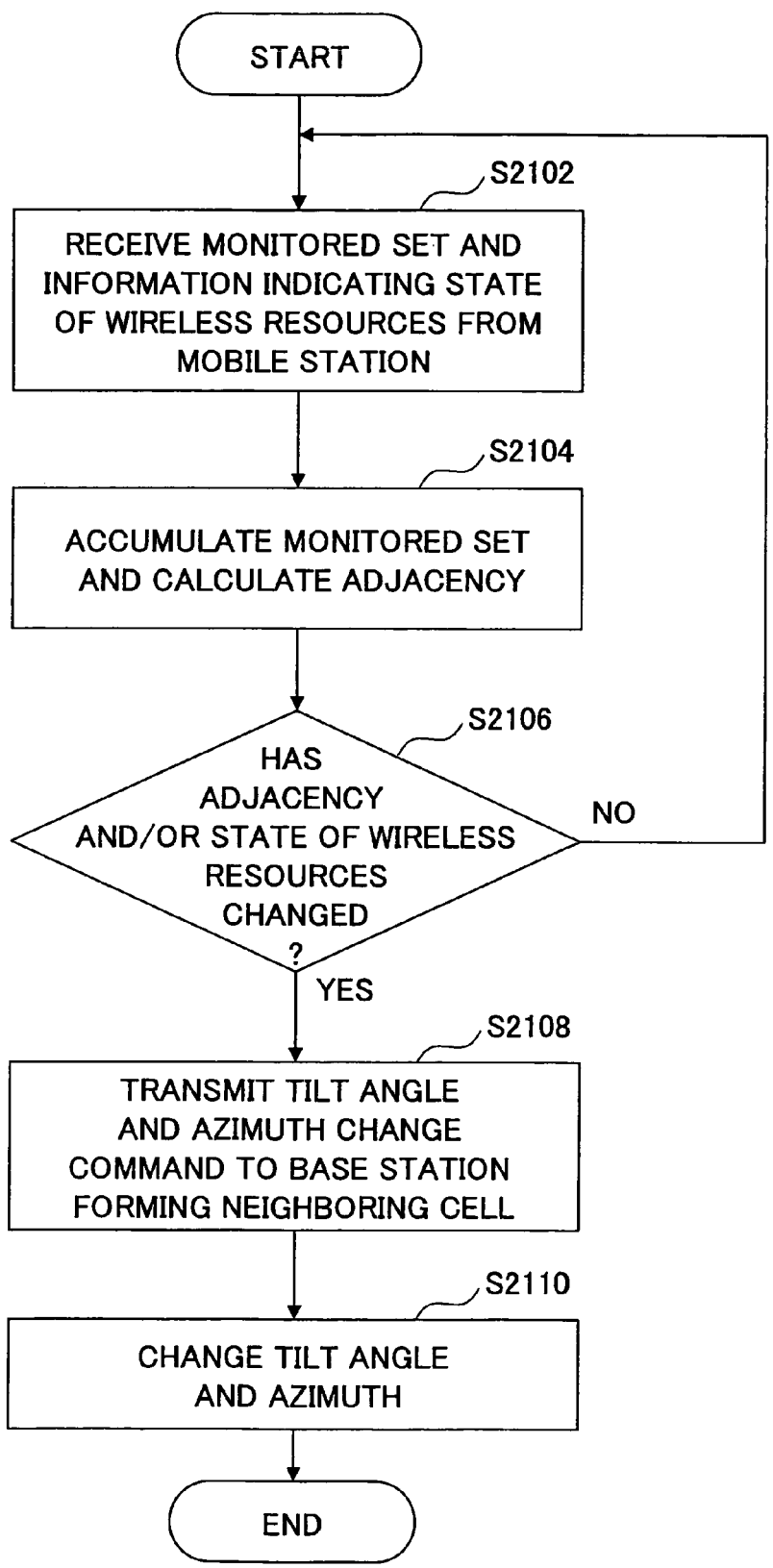
FIGS. 21A and 21B are flowcharts illustrating operations of the communication apparatus of FIG. 20.

In the following, operations of the wireless control apparatus 300 of the present embodiment are described with reference to FIG. 21A.

In this example, first, a monitored set and information indicating the state of the wireless resources transmitted from the mobile station 100 are received at the uplink wireless channel receiving unit 304 via the antenna and the transceiver unit 302 (step S2102).

The uplink wireless channel receiving unit 304 inputs the monitored set to the cell adjacency calculating unit 306, and inputs the information indicating the state of the wireless resources to the wireless resource monitoring unit 312.

The cell adjacency calculating unit 306 accumulates the monitored set and calculates the cell adjacency (step S2104).

The cell adjacency calculating unit 306 determines whether the cell adjacency has changed, and the wireless resource monitoring unit 312 determines whether the state of the wireless resources has changed based on the input information indicating the state of the wireless resources (step S2106).

In a case where at least one of the cell adjacency or the state of the wireless resources has changed (step S2106: YES), the cell adjacency calculating unit 306 inputs a tilt angle change command for changing the tilt command and an azimuth change command for changing the azimuth to the tilt angle changing unit 308 and the azimuth changing unit 316, respectively. Also, the cell adjacency calculating unit 306 inputs a tilt angle change command and an azimuth change command to the neighboring cell communication unit 314.

The neighboring cell communication unit 314 transmits the tilt angle change command and the azimuth change command from the cell adjacency calculating unit 306 to the base station forming the neighboring cell (step S2108).

The tilt angle changing unit 308 changes the tilt angle according to the input tilt angle change command, and the azimuth changing unit 316 changes the azimuth according to the input azimuth change command (step S2110).

In this way, at least one of the main lobe, the side lobe, or the null point between the main lobe and the side lobe of the antenna pattern may be controlled and directed to reduce frequency interference between the cell formed by the current base station and the cell formed by a neighboring base station using the same frequency.

On the other hand, in a case where the cell adjacency and the state of the wireless resources are not changed (step S2106: NO), the process goes back to step S2102.

Figure 21B:
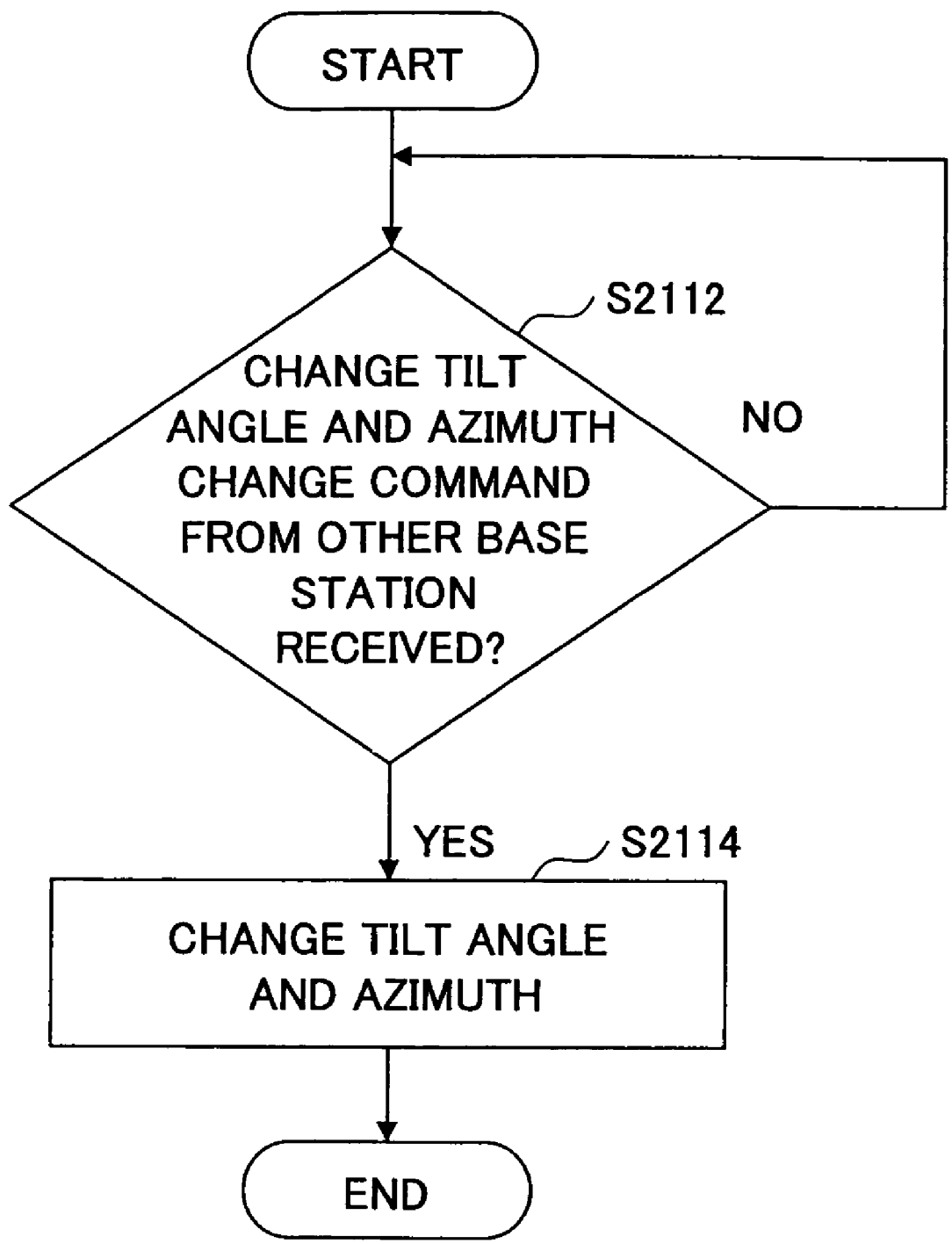

In the following, operations of a wireless control apparatus 300 included in a base station forming a neighboring cell are described with reference to FIG. 21B.

In this example, the neighboring cell communication unit 314 of the base station forming the neighboring cell determines whether a tilt angle change command and an azimuth change command from a wireless control apparatus included in another base station have been received (step S2112).

If such a tilt angle change command and an azimuth change command have been received (step S2112: YES), the neighboring cell communication unit 314 inputs the tilt angle change command and the azimuth change command to the tilt angle changing unit 308 and the azimuth changing unit 316, respectively.

The tilt angle changing unit 308 changes the tilt angle based on the input tilt angle change command, and the azimuth changing unit 316 changes the azimuth based on the input azimuth change command (step S2114). In this way, at least one of the main lobe, the side lobe, or the null point between the main lobe and the side lobe of the antenna pattern may be controlled and directed to reduce frequency interference between the cell formed by the current base station and the cell formed by the neighboring base station using the same frequency.

On the other hand, if a tilt angle change command and an azimuth change command are not received (step S2112: NO), the process goes back to step S2112.

As can be appreciated from the above descriptions, according to an embodiment of the present invention, in a cellular mobile communication system in which plural mobile stations residing within plural cells that are adjacent to each other and base stations forming the cells establish communication with each other by sharing the same frequency band according to a multiple access scheme, the frequency interference between the cells using the same frequency may be reduced, and the antenna pattern of the base station for enabling efficient use of wireless resources may be automatically updated based on measurement reports from the mobile stations residing within cells formed by the current base station or neighboring base stations.

In such an embodiment, a cell designer may be relieved of the burden of manually setting the antenna tilt angle and/or the antenna azimuth using cell design tools that are becoming less effective as the size of cells are reduced, and system efficiency may be improved while reducing the work load of the cell designer.

Also, according to a preferred embodiment of the present invention, the base station directs the main lobe of an antenna vertical pattern toward an area administered by the relevant base station to form a cell so that cell coverage may be improved, and user communication quality may be improved.

According to another preferred embodiment of the present invention, the base station directs a side lobe of an antenna vertical pattern or a null point between the main lobe and a side lobe of the antenna vertical pattern toward an area administered by a neighboring base station so that frequency interference may be reduced and the system capacity per cell as well as the system capacity of the overall service area may be increased.

According to another preferred embodiment of the present invention, the base station directs a side lobe of an antenna horizontal pattern, a null point between the main lobe and a side lobe of the antenna horizontal pattern, or a null point between a side lobe and another side lobe of the antenna horizontal pattern toward an area administered by a neighboring base station so that frequency interference may be reduced and the system capacity per cell as well as the system capacity of the overall service area may be increased.

According to another preferred embodiment of the present invention, measurements of the reception level of a common pilot channel or a common control channel transmitted from a base station forming a neighboring cell such as the Ec/Io, CIR, and/or RSCP which measurements are made by a mobile station upon changing the cell to which it is assigned in accordance with its relocation are associated with an identifier for identifying the corresponding neighboring cell and transmitted to the base station forming the cell to which the mobile station is currently assigned.

The base station accumulates and processes the measurements from the mobile station to determine the degree of adjacency with the neighboring cell. The base station determines the levels of the downlink total transmission power and the uplink interference power corresponding to wireless resources at predetermined time intervals, and when at least one of the above wireless resources exceeds a threshold value that is set beforehand, the base station changes the tilt angle of its antenna vertical pattern so that the adjacency of a neighboring cell having low adjacency with the current cell may be reduced further.

In this way, a change in the state of the service area such as the addition of one or more base stations may be sequentially recognized, and the tilt angle may be changed accordingly based on the recognized change so that system efficiency such as cell coverage, communication quality, and system capacity may be improved.

According to another preferred embodiment of the present invention, measurements of the reception level of a common pilot channel or a common control channel transmitted from a base station forming a neighboring cell such as the Ec/Io, CIR, and/or RSCP which measurements are made by a mobile station upon changing the cell to which it is assigned in accordance with its relocation are associated with an identifier for identifying the corresponding neighboring cell and transmitted to the base station forming the cell to which the mobile station is currently assigned.

The base station accumulates and processes the measurements from the mobile station to determine the degree of adjacency with the neighboring cell. The base station determines the state of the wireless resources such as the levels of the downlink total transmission power and the uplink interference power at predetermined time intervals, and when at least one of the above wireless resources exceeds a threshold value that is set beforehand, the base station changes the tilt angle of the antenna vertical pattern of a base station forming a neighboring cell with low adjacency so that the adjacency of the corresponding neighboring cell may be reduced further.

In this way, a change in the state of the service area such as the addition of one or more base stations may be sequentially recognized, and the tilt angle may be changed accordingly based on the recognized change so that system efficiency such as cell coverage, communication quality, and system capacity may be improved.

According to another preferred embodiment of the present invention, measurements of the reception level of a common pilot channel or a common control channel transmitted from a base station forming a neighboring cell such as the Ec/Io, CIR, and/or RSCP which measurements are made by a mobile station upon changing the cell to which it is assigned in accordance with its relocation are associated with an identifier for identifying the corresponding neighboring cell and transmitted to the base station forming the cell to which the mobile station is currently assigned.

The base station accumulates and processes the measurements from the mobile station to determine the degree of adjacency with the neighboring cell. The base station determines the adjacency of the neighboring cell at predetermined time intervals, and when the adjacency of a neighboring cell previously having relatively high adjacency decreases or disappears, the base station changes the tilt angle of its antenna vertical pattern so that the adjacency of a neighboring cell having low adjacency may be increased.

In this way, a change in the state of the service area such as the removal of one or more base stations may be sequentially recognized, and the tilt angle may be changed accordingly based on the recognized changes so that system efficiency such as cell coverage, communication quality, and system capacity may be improved.

According to another preferred embodiment of the present invention, measurements of the reception level of a common pilot channel or a common control channel transmitted from a base station forming a neighboring cell such as the Ec/Io, CIR, and/or RSCP which measurements are made by a mobile station upon changing the cell to which it is assigned in accordance with its relocation are associated with an identifier for identifying the corresponding neighboring cell and transmitted to the base station forming the cell to which the mobile station is currently assigned.

The base station accumulates and processes the measurements from the mobile station to determine the degree of adjacency with the neighboring cell. The base station determines the adjacency of the neighboring cell at predetermined time intervals, and when the adjacency of a neighboring cell previously having relatively high adjacency decreases or disappears, the base station changes the tilt angle of the antenna vertical pattern of a base station forming a neighboring cell having low adjacency so that the adjacency of the corresponding neighboring cell may be increased.

In this way, a change in the state of the service area such as the removal of one or more base stations may be sequentially recognized, and the tilt angle may be changed accordingly based on the recognized changes so that system efficiency such as cell coverage, communication quality, and system capacity may be improved.

According to another preferred embodiment of the present invention, measurements of the reception level of a common pilot channel or a common control channel transmitted from a base station forming a neighboring cell such as the Ec/Io, CIR, and/or RSCP which measurements are made by a mobile station upon changing the cell to which it is assigned in accordance with its relocation are associated with an identifier for identifying the corresponding neighboring cell and transmitted to the base station forming the cell to which the mobile station is currently assigned.

The base station accumulates and processes the measurements from the mobile station to determine the degree of adjacency with the neighboring cell. The base station determines the reception levels of the downlink total transmission power and the uplink interference power corresponding to wireless resources at predetermined time intervals, and when at least one of the above wireless resources exceeds a threshold value that is set beforehand, the base station changes the azimuth of its antenna horizontal pattern so that the adjacency of a neighboring cell having low adjacency with the current cell may be reduced further.

In this way, a change in the state of the service area such as the addition of one or more base stations may be sequentially recognized, and the tilt angle may be changed accordingly based on the recognized change so that system efficiency such as cell coverage, communication quality, and system capacity may be improved.

According to another preferred embodiment of the present invention, measurements of the reception level of a common pilot channel or a common control channel transmitted from a base station forming a neighboring cell such as the Ec/Io, CIR, and/or RSCP which measurements are made by a mobile station upon changing the cell to which it is assigned in accordance with its relocation are associated with an identifier for identifying the corresponding neighboring cell and transmitted to the base station forming the cell to which the mobile station is currently assigned.

The base station accumulates and processes the measurements from the mobile station to determine the degree of adjacency with the neighboring cell. The base station determines the levels of the downlink total transmission power and the uplink interference power corresponding to wireless resources at predetermined time intervals, and when at least one of the above wireless resources exceeds a threshold value that is set beforehand, the base station changes the azimuth of the antenna horizontal pattern of a base station forming a neighboring cell with low adjacency so that the adjacency of the corresponding neighboring cell may be reduced further.

In this way, a change in the state of the service area such as the addition of one or more base stations may be sequentially recognized, and the tilt angle may be changed accordingly based on the recognized change so that system efficiency such as cell coverage, communication quality, and system capacity may be improved.

According to another preferred embodiment of the present invention, measurements of the reception level of a common pilot channel or a common control channel transmitted from a base station forming a neighboring cell such as the Ec/Io, CIR, and/or RSCP which measurements are made by a mobile station upon changing the cell to which it is assigned in accordance with its relocation are associated with an identifier for identifying the corresponding neighboring cell and transmitted to the base station forming the cell to which the mobile station is currently assigned.

The base station accumulates and processes the measurements from the mobile station to determine the degree of adjacency with the neighboring cell. The base station determines the adjacency of the neighboring cell at predetermined time intervals, and when the adjacency of a neighboring cell previously having relatively high adjacency decreases or disappears, the base station changes the azimuth of its antenna horizontal pattern so that the adjacency of a neighboring cell having low adjacency may be increased.

In this way, a change in the state of the service area such as the removal of one or more base stations may be sequentially recognized, and the tilt angle may be changed accordingly based on the recognized changes so that system efficiency such as cell coverage, communication quality, and system capacity may be improved.

According to another preferred embodiment of the present invention, measurements of the reception level of a common pilot channel or a common control channel transmitted from a base station forming a neighboring cell such as the Ec/Io, CIR, and/or RSCP which measurements are made by a mobile station upon changing the cell to which it is assigned in accordance with its relocation are associated with an identifier for identifying the corresponding neighboring cell and transmitted to the base station forming the cell to which the mobile station is currently assigned.

The base station accumulates and processes the measurements from the mobile station to determine the degree of adjacency with the neighboring cell. The base station determines the adjacency of the neighboring cell at predetermined time intervals, and when the adjacency of a neighboring cell previously having relatively high adjacency decreases or disappears, the base station changes the azimuth of the antenna horizontal pattern of a base station forming a neighboring cell having low adjacency so that the adjacency of the corresponding neighboring cell may be increased.

In this way, a change in the state of the service area such as the removal of one or more base stations may be sequentially recognized, and the tilt angle may be changed accordingly based on the recognized changes so that system efficiency such as cell coverage, communication quality, and system capacity may be improved.

According to another preferred embodiment of the present invention, the adjacency of neighboring cells is managed such that when the main branch is switched from a base station forming a current cell to a base station forming a neighboring cell, an adjacency counter value for the neighboring cell held within the base station of the current cell is incremented by a predetermined value. Then, adjacency counter values for plural neighboring cells that are compiled over a predetermined time are compared with each other, and based on the comparison, a cell with a large counter value is determined to have high adjacency whereas a cell with a small counter value is determined to have low adjacency. In this way, the adjacency of neighboring cells may be accurately determined.

According to another preferred embodiment of the present invention, the adjacency of neighboring cells is managed such that when the main branch is switched from a base station forming a current cell to a base station forming a neighboring cell, an adjacency counter value for the neighboring cell held within the base station of the current cell is incremented according to the level of the branch during the switching. Then, adjacency counter values for plural neighboring cells that are compiled over a predetermined time are compared with each other, and based on the comparison, a cell with a large counter value is determined to have high adjacency whereas a cell with a small counter value is determined to have low adjacency. In this way, the adjacency of neighboring cells may be accurately determined taking into consideration the cell coverage.

According to another preferred embodiment of the present invention, the adjacency of neighboring cells is managed such that when an active set defining a base station forming a current cell as the main branch is changed, an adjacency counter value for a neighboring cell formed by a base station included in the active set held within the base station of the current cell is incremented by a predetermined value. Then, adjacency counter values for plural neighboring cells that are compiled over a predetermined time are compared with each other, and based on the comparison, a cell with a large counter value is determined to have high adjacency whereas a cell with a small counter value is determined to have low adjacency. In this way, the adjacency of neighboring cells may be accurately determined in a short period of time.

According to another preferred embodiment of the present invention, the adjacency of neighboring cells is managed such that when an active set defining a base station forming a current cell as the main branch is changed, an adjacency counter value for a neighboring cell formed by a base station included in the active set held within the base station of the current cell is incremented according to the level of the branch during the switching. Then, adjacency counter values for plural neighboring cells that are compiled over a predetermined time are compared with each other, and based on the comparison, a cell with a large counter value is determined to have high adjacency whereas a cell with a small counter value is determined to have low adjacency. In this way, the adjacency of neighboring cells may be accurately determined in a short period of time taking into consideration the cell coverage.

According to another preferred embodiment of the present invention, the adjacency of neighboring cells is managed such that when an active set defining a base station forming a current cell as the main branch is changed, an adjacency counter value for a neighboring cell formed by a base station included in the monitored set held within the base station of the current cell is incremented by a predetermined value. Then, adjacency counter values for plural neighboring cells that are compiled over a predetermined time are compared with each other, and based on the comparison, a cell with a large counter value is determined to have high adjacency whereas a cell with a small counter value is determined to have low adjacency. In this way, the adjacency of neighboring cells may be accurately determined more comprehensively in a short period of time.

According to another preferred embodiment of the present invention, the adjacency of neighboring cells is managed such that when an active set defining a base station forming a current cell as the main branch is changed, an adjacency counter value for a neighboring cell formed by a base station included in the monitored set held within the base station of the current cell is incremented according to the level of the branch during the switching. Then, adjacency counter values for plural neighboring cells that are compiled over a predetermined time are compared with each other, and based on the comparison, a cell with a large counter value is determined to have high adjacency whereas a cell with a small counter value is determined to have low adjacency. In this way, the adjacency of neighboring cells may be accurately determined more comprehensively in a short period of time taking into consideration the cell coverage.

According to another preferred embodiment of the present invention, in a case where the base station antenna vertical pattern is adapted for narrow beam radiation, the tilt angle of the corresponding base station may be automatically set so that beam tilting and area formation may be optimized, and frequency interference from the use of the same frequency or adjacent frequencies between cells may be reduced while enabling efficient use of wireless resources.

According to another preferred embodiment of the present invention, in a case where the base station antenna vertical pattern is adapted for narrow beam radiation, the tilt angles of the corresponding base station and its neighboring base station(s) may be automatically set so that beam tilting and area formation may be optimized, and frequency interference from the use of the same frequency or adjacent frequencies between cells may be reduced while enabling efficient use of wireless resources.

According to another preferred embodiment of the present invention, in a case where the base station antenna horizontal pattern is adapted for beam radiation, the azimuth of the corresponding base station may be automatically set so that beam directing and area formation may be optimized, and frequency interference from the use of the same frequency or adjacent frequencies between cells may be reduced while enabling efficient use of wireless resources.

According to another preferred embodiment of the present invention, in a case where the base station antenna horizontal pattern is adapted for beam radiation, the azimuths of the corresponding base station and neighboring base station(s) may be automatically set so that beam directing and area formation may be optimized, and frequency interference from the use of the same frequency or adjacent frequencies between cells may be reduced while enabling efficient use of wireless resources.

According to another preferred embodiment of the present invention, in a case where the base station antenna vertical pattern is adapted for narrow beam radiation, and the base station antenna horizontal pattern is adapted for beam radiation, the tilt angle and the azimuth of the corresponding base station may be automatically set so that beam tilting, beam directing, and area formation may be optimized, and frequency interference from the use of the same frequency or adjacent frequencies between cells may be reduced while enabling efficient use of wireless resources.

According to another preferred embodiment of the present invention, in a case where the base station vertical pattern is adapted for narrow beam radiation, and the base station antenna horizontal pattern is adapted for beam radiation, the tilt angles and the azimuths of the corresponding base station and neighboring base station(s) may be automatically set so that beam tilting, beam directing, and area formation may be optimized, and frequency interference from the use of the same frequency or adjacent frequencies between cells may be reduced while enabling efficient use of wireless resources.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

This patent application is based on and claims the benefit of the earlier filing date of Japanese Patent Application No. 2005-214873 filed on Jul. 25, 2005, the entire contents of which are hereby incorporated by reference.

What is claimed is:

1. A wireless control apparatus of a wireless communication system including a base station and a mobile station, the mobile station configured to perform handover for changing the base station for communication in response to the mobile station moving from one cell to another cell, the wireless control apparatus forming and controlling an area of the base station according to an antenna pattern, the apparatus comprising:

a receiving unit that receives information from the mobile station, the information relating to a neighboring base station corresponding to a handover destination candidate;

an adjacency calculating part that calculates adjacency between a current cell and a neighboring cell by accumulating the information of the neighboring base station corresponding to the handover destination candidate, the information being received by the receiving unit; and an antenna pattern control part that controls and directs at least one of a main lobe, a side lobe, and a null point between the main lobe and the side lobe of the antenna pattern based on the adjacency to reduce frequency interference between a current cell formed by a current base station and a neighboring cell formed by the neighboring base station, wherein the adjacency calculating part increases an adjacency counter value by a predetermined value in response to an active set including a cell of the base station as a main branch being changed, the adjacency counter value indicating the adjacency between the cell of the base station and the cell of the corresponding neighboring base station, the base station being included in the information that is received by the receiving unit and that relates to the neighboring base station corresponding to a handover destination candidate, the main branch being the base station transmitting a common pilot channel or a common control channel with the highest reception level, the active set referring to a combination of the main branch and a certain number of major branches having small differences from the highest reception level, and wherein the antenna pattern control part controls at least one of an antenna pattern tilt angle and an antenna pattern azimuth of at least one of the current base station and the neighboring base stations based on a comparison of the adjacency counter values.

2. The wireless control apparatus as claimed in claim 1, wherein the adjacency represents an extent to which an electromagnetic space is shared between the current cell and the neighboring cell, and the antenna pattern control part controls and directs at least one of the main lobe, the side lobe, and the null point between the main lobe and the side lobe of the antenna pattern based on the adjacency to reduce frequency interference between the current cell and the neighboring cell.

3. A communication method implemented using a wireless control apparatus of a mobile communication system including a base station and a mobile station, the mobile station configured to perform handover for changing the base station for communication in response to the mobile station moving from one cell to another cell, the wireless control apparatus forming and controlling an area of a base station according to an antenna pattern, the method comprising the steps of:

receiving an uplink wireless channel from the mobile station;

receiving information from the mobile station, the information relating to a neighboring base station corresponding to a handover destination candidate;

calculating adjacency between a current cell and a neighboring cell by accumulating the information of the neighboring base station corresponding to the handover destination candidate, the information being received from the mobile station;

controlling and directing at least one of a main lobe, a side lobe, and a null point between the main lobe and the side lobe of the antenna pattern to reduce frequency interference between the current cell formed by a current base station and the neighboring cell formed by the neighboring base station;

increasing an adjacency counter value by a predetermined value in response to an active set including a cell of the base station as a main branch being changed, the adjacency counter value indicating the adjacency between the cell of the base station and the cell of the corresponding neighboring base station, the base station being included in the information that is received by the receiving and that relates to the neighboring base station corresponding to a handover destination candidate, the main branch being the base station transmitting a common pilot channel or a common control channel with the highest reception level, the active set referring to a combination of the main branch and a certain number of major branches having small differences from the highest reception level, and controlling at least one of an antenna pattern tilt angle and an antenna pattern azimuth of at least one of the current base station and the neighboring base stations based on a comparison of the adjacency counter values.

4. The communication method as claimed in claim 3, wherein the adjacency represents an extent to which an electromagnetic space is shared between the current cell and the neighboring cell, and the controlling step includes controlling and directing at least one of the main lobe, the side lobe, and the null point of the antenna pattern based on the adjacency.

5. The wireless control apparatus as claimed in claim 2, wherein the adjacency calculating part calculates the adjacency based on the adjacency counter value.

6. The wireless control apparatus as claimed in claim 5, further comprising:

a wireless resource monitoring part that determines a state of wireless resources;

wherein the antenna pattern control part controls and directs at least one of the main lobe, the side lobe, and the null point between the main lobe and the side lobe of the antenna pattern based on the state of wireless resources to reduce frequency interference between the current cell and the neighboring cell.

7. The wireless control apparatus as claimed in claim 6, wherein the antenna pattern control part controls an antenna pattern tilt angle of at least one of the current base station and the neighboring base station based on at least one of the adjacency and the state of wireless resources.

8. The wireless control apparatus as claimed in claim 7, wherein the antenna pattern control part controls an antenna pattern azimuth of at least one of the current base station and the neighboring base station based on at least one of the adjacency and the state of wireless resources.

9. The wireless control apparatus as claimed in claim 8, wherein the adjacency calculating part determines the main branch forming a corresponding neighboring cell from the neighboring base stations; and the antenna pattern control part controls each of the antenna pattern tilt angle and the antenna pattern azimuth of at least one of the current base station and the neighboring base stations based on the adjacency counter values.

10. The wireless control apparatus as claimed in claim 8, wherein the adjacency calculating part identifies a change in an active set including the main branch and the major branch forming one or more corresponding neighboring cells; and the antenna pattern control part controls each of the antenna pattern tilt angle and the antenna pattern azimuth of at least one of the current base station and the neighboring base stations based on the adjacency counter values.

11. The wireless control apparatus as claimed in claim 8, wherein the adjacency calculating part determines a change in a monitored set including the main branch and one or more of the neighboring base stations as handover destination candidates forming one or more corresponding neighboring cells; and the antenna pattern control part controls each of the antenna pattern tilt angle and the antenna pattern azimuth of at least one of the current base station and the neighboring base stations based on the adjacency counter values.

12. The communication method as claimed in claim 4, wherein in the step of calculating the adjacency, the calculation is based on the adjacency counter value.

13. The communication method as claimed in claim 12, further comprising the step of:

determining and monitoring a state of wireless resources;

wherein the controlling step includes controlling and directing at least one of the main lobe, the side lobe, and the null point of the antenna pattern based on the state of the wireless resources.

14. The communication method as claimed in claim 13, further comprising the step of:

controlling an antenna pattern tilt angle of at least one of the current base station and the neighboring base station based on at least one of the adjacency and the state of wireless resources.

15. The communication method as claimed in claim 14, further comprising the step of:

controlling an antenna pattern azimuth of at least one of the current base station and the neighboring base station based on at least one of the adjacency and the state of the wireless resources.

* * * * *